United States Patent
Jung et al.

(10) Patent No.: US 9,426,387 B2
(45) Date of Patent: *Aug. 23, 2016

(54) IMAGE ANONYMIZATION

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US)

(73) Assignee: Invention Science Fund I, LLC, Bellevue, WA (US)

(*) Notice: Subject to any disclaimer, the term of this patent is extended or adjusted under 35 U.S.C. 154(b) by 1217 days.

This patent is subject to a terminal disclaimer.

(21) Appl. No.: 11/701,527

(22) Filed: Jan. 31, 2007

(65) Prior Publication Data

US 2008/0180538 A1    Jul. 31, 2008

Related U.S. Application Data

(63) Continuation-in-part of application No. 11/701,167, filed on Jan. 31, 2007, now Pat. No. 8,126,190, and a continuation-in-part of application No. 11/701,524, filed on Jan. 31, 2007, now Pat. No. 8,203,609, and a (Continued)

(51) Int. Cl.
*H04N 5/228* (2006.01)
*H04N 5/272* (2006.01)
*G06K 9/32* (2006.01)
*G06T 11/00* (2006.01)

(Continued)

(52) U.S. Cl.
CPC .......... *H04N 5/272* (2013.01); *G06K 9/00771* (2013.01); *G06K 9/3241* (2013.01); *G06T 11/00* (2013.01); *G11B 27/034* (2013.01); *G06K 9/00228* (2013.01)

(58) Field of Classification Search
USPC ........................................................ 348/143
See application file for complete search history.

(56) References Cited

U.S. PATENT DOCUMENTS 3,278,676 A    10/1966   Becker
3,713,148 A     1/1973   Cardullo et al.

(Continued)

FOREIGN PATENT DOCUMENTS

JP     2002108578 A    4/2002
JP     2005-005960 A   1/2005

(Continued)

OTHER PUBLICATIONS

Wang, Ching-Te et al.; "Detecting and restoring the tampered images based on iteration-free fractal compression"; The Journal of Systems and Software; bearing a date of 2003; pp. 131-140; vol. 67; © 2002 Elsevier Inc.

(Continued)

*Primary Examiner* — Thomas Dailey

(57) ABSTRACT

Embodiments include a system, a device, an apparatus, a method, and a computer program product. An embodiment provides a system that includes an imaging device operable to acquire an image of a subject. The system also includes an anonymizer circuit operable to generate an anonymized image that includes a decreased fidelity of a property of a subject of the acquired image in response to an anonymization policy. The system further includes a display operable to provide a human-perceivable indication of the anonymization policy.

41 Claims, 32 Drawing Sheets

Related U.S. Application Data continuation-in-part of application No. 11/174,432, filed on Jul. 1, 2005, and a continuation-in-part of application No. 11/173,990, filed on Jul. 1, 2005, and a continuation-in-part of application No. 11/195,358, filed on Aug. 2, 2005, now Pat. No. 7,860,342, and a continuation-in-part of application No. 11/195,346, filed on Aug. 2, 2005, now abandoned.

(51) Int. Cl.
*G11B 27/034* (2006.01)
*G06K 9/00* (2006.01)

(56) References Cited

U.S. PATENT DOCUMENTS

| | | |
|---|---|---|
| 4,467,349 A | 8/1984 | Maloomian |
| 4,872,056 A | 10/1989 | Hicks et al. |
| 5,029,014 A | 7/1991 | Lindstrom |
| 5,060,171 A | 10/1991 | Steir et al. |
| 5,220,657 A | 6/1993 | Bly et al. |
| 5,343,386 A | 8/1994 | Barber |
| 5,345,313 A | 9/1994 | Blank |
| 5,428,732 A | 6/1995 | Hancock et al. |
| 5,469,536 A | 11/1995 | Blank |
| 5,481,664 A | 1/1996 | Hiroya et al. |
| 5,623,587 A | 4/1997 | Bulman |
| 5,629,736 A | 5/1997 | Haskell et al. |
| 5,629,980 A | 5/1997 | Stefik et al. |
| 5,640,560 A | 6/1997 | Smith |
| 5,675,738 A | 10/1997 | Suzuki et al. |
| 5,680,619 A | 10/1997 | Gudmundson et al. |
| 5,682,326 A | 10/1997 | Klingler et al. |
| 5,708,709 A | 1/1998 | Rose |
| 5,708,766 A | 1/1998 | Goto |
| 5,712,964 A | 1/1998 | Kamada et al. |
| 5,742,816 A | 4/1998 | Barr et al. |
| 5,748,956 A | 5/1998 | Lafer et al. |
| 5,796,948 A | 8/1998 | Cohens |
| 5,819,086 A | 10/1998 | Kroenke |
| 5,828,402 A | 10/1998 | Collings |
| 5,859,662 A | 1/1999 | Cragun et al. |
| 5,861,880 A | 1/1999 | Shimizu et al. |
| 5,892,509 A | 4/1999 | Jakobs et al. |
| 5,892,900 A | 4/1999 | Ginter et al. |
| 5,898,430 A | 4/1999 | Matsuzawa et al. |
| 5,903,317 A | 5/1999 | Sharir et al. |
| 5,917,553 A | 6/1999 | Honey et al. |
| 5,933,498 A | 8/1999 | Schneck et al. |
| 5,945,989 A | 8/1999 | Freishtat et al. |
| 5,990,901 A | 11/1999 | Lawton et al. |
| 5,991,782 A | 11/1999 | Miyagawa et al. |
| 6,018,744 A | 1/2000 | Mamiya et al. |
| 6,047,128 A | 4/2000 | Zander |
| 6,067,399 A | 5/2000 | Berger |
| 6,084,590 A | 7/2000 | Robotham et al. |
| 6,135,646 A | 10/2000 | Kahn et al. |
| 6,154,172 A | 11/2000 | Piccionelli et al. |
| 6,181,336 B1 | 1/2001 | Chiu et al. |
| 6,189,146 B1 | 2/2001 | Misra et al. |
| 6,216,228 B1 | 4/2001 | Chapman et al. |
| 6,226,793 B1 | 5/2001 | Kwoh |
| 6,236,971 B1 | 5/2001 | Stefik et al. |
| 6,253,193 B1 | 6/2001 | Ginter et al. |
| 6,297,853 B1 | 10/2001 | Sharir et al. |
| 6,314,569 B1 | 11/2001 | Chernock et al. |
| 6,317,795 B1 | 11/2001 | Malkin et al. |
| 6,363,488 B1 | 3/2002 | Ginter et al. |
| 6,385,592 B1 | 5/2002 | Angles et al. |
| 6,388,682 B1 | 5/2002 | Kurtzberg et al. |
| 6,389,402 B1 | 5/2002 | Ginter et al. |
| 6,394,356 B1 | 5/2002 | Zagami |
| 6,400,374 B2 | 6/2002 | Lanier |
| 6,418,439 B1 | 7/2002 | Papierniak et al. |
| 6,427,140 B1 | 7/2002 | Ginter et al. |
| 6,446,093 B2 | 9/2002 | Tabuchi |
| 6,466,956 B1 | 10/2002 | Cho et al. |
| 6,493,744 B1 | 12/2002 | Emens et al. |
| 6,505,169 B1 | 1/2003 | Bhagavath et al. |
| 6,519,770 B2 | 2/2003 | Ford |
| 6,542,925 B2 | 4/2003 | Brown et al. |
| 6,567,569 B1 | 5/2003 | Claessens |
| 6,574,609 B1 | 6/2003 | Downs et al. |
| 6,574,793 B1 | 6/2003 | Ngo et al. |
| 6,577,746 B1 | 6/2003 | Evans et al. |
| 6,628,811 B1 | 9/2003 | Nagao et al. |
| 6,654,814 B1 | 11/2003 | Britton et al. |
| 6,675,387 B1 | 1/2004 | Boucher et al. |
| 6,704,930 B1 | 3/2004 | Eldering et al. |
| 6,705,781 B2 | 3/2004 | Iwazaki |
| 6,719,565 B1 | 4/2004 | Saita et al. |
| 6,745,226 B1 | 6/2004 | Guedalia |
| 6,772,340 B1 | 8/2004 | Peinado et al. |
| 6,775,381 B1 | 8/2004 | Nelson et al. |
| 6,779,117 B1 | 8/2004 | Wells |
| 6,801,642 B2 * | 10/2004 | Gorday et al. ............... 382/118 |
| 6,807,534 B1 | 10/2004 | Erickson |
| 6,816,628 B1 | 11/2004 | Sarachik et al. |
| 6,825,859 B1 | 11/2004 | Severenuk et al. |
| 6,829,368 B2 | 12/2004 | Meyer et al. |
| 6,829,582 B1 | 12/2004 | Braness |
| 6,829,780 B2 | 12/2004 | Kraft et al. |
| 6,847,992 B1 | 1/2005 | Haitsuka et al. |
| 6,850,252 B1 | 2/2005 | Hoffberg |
| 6,883,009 B2 | 4/2005 | Yoo |
| 6,903,756 B1 | 6/2005 | Giannini |
| 6,912,571 B1 | 6/2005 | Serena |
| 6,937,730 B1 | 8/2005 | Buxton |
| 6,959,099 B2 | 10/2005 | Gutta et al. |
| 6,970,602 B1 | 11/2005 | Smith et al. |
| 6,973,130 B1 | 12/2005 | Wee et al. |
| 7,006,155 B1 | 2/2006 | Agarwala et al. |
| 7,006,993 B1 | 2/2006 | Cheong et al. |
| 7,032,014 B2 | 4/2006 | Thiyagarajan et al. |
| 7,034,848 B2 * | 4/2006 | Sobol ............................ 345/620 |
| 7,092,568 B2 | 8/2006 | Eaton |
| 7,106,887 B2 | 9/2006 | Kinjo |
| 7,109,993 B2 | 9/2006 | Peleg et al. |
| 7,110,570 B1 | 9/2006 | Berenz et al. |
| 7,120,250 B2 | 10/2006 | Candelore |
| 7,133,845 B1 | 11/2006 | Ginter et al. |
| 7,134,130 B1 | 11/2006 | Thomas |
| 7,139,031 B1 | 11/2006 | Bray |
| 7,162,690 B2 | 1/2007 | Gupta et al. |
| 7,181,686 B1 | 2/2007 | Bahrs |
| 7,181,758 B1 | 2/2007 | Chan |
| 7,184,047 B1 | 2/2007 | Crampton |
| 7,200,801 B2 | 4/2007 | Agassi et al. |
| 7,212,650 B2 | 5/2007 | Sumi |
| 7,216,351 B1 | 5/2007 | Maes |
| 7,251,048 B2 | 7/2007 | Cheatle et al. |
| 7,284,040 B2 | 10/2007 | Kobayashi et al. |
| 7,290,285 B2 | 10/2007 | McCurdy et al. |
| 7,293,017 B2 | 11/2007 | Hurst-Hiller et al. |
| 7,313,810 B1 | 12/2007 | Bell et al. |
| 7,333,957 B2 | 2/2008 | Levy et al. |
| 7,334,017 B2 | 2/2008 | Hawkes et al. |
| 7,334,249 B1 | 2/2008 | Byers |
| 7,346,585 B1 | 3/2008 | Alabraba et al. |
| 7,360,230 B1 | 4/2008 | Paz et al. |
| 7,370,343 B1 | 5/2008 | Ellis |
| 7,380,258 B2 | 5/2008 | Durden et al. |
| 7,391,432 B2 | 6/2008 | Terada |
| 7,406,434 B1 | 7/2008 | Chang et al. |
| 7,406,658 B2 | 7/2008 | Brassell et al. |
| 7,456,871 B2 | 11/2008 | Iida et al. |
| 7,505,621 B1 | 3/2009 | Agrawal et al. |
| 7,543,068 B2 | 6/2009 | Aaron et al. |
| 7,548,794 B2 | 6/2009 | Vandergriff et al. |
| 7,564,476 B1 | 7/2009 | Coughlan et al. |
| 7,571,385 B2 | 8/2009 | Miller et al. |
| 7,657,529 B2 | 2/2010 | Kaura et al. |
| 7,668,242 B2 | 2/2010 | Sullivan et al. |
| 7,668,345 B2 * | 2/2010 | Kiyohara et al. ............. 382/115 |

(56) References Cited

U.S. PATENT DOCUMENTS

| | | |
|---|---|---|
| 7,673,013 B2 | 3/2010 | Rudolph et al. |
| 7,680,819 B1 | 3/2010 | Mellmer et al. |
| 7,707,642 B1 | 4/2010 | Herbach et al. |
| 7,725,812 B1 | 5/2010 | Balkus et al. |
| 7,735,144 B2 | 6/2010 | Pravetz et al. |
| 7,752,548 B2 | 7/2010 | Mercer |
| 7,755,645 B2 | 7/2010 | Sun et al. |
| 7,761,922 B1 | 7/2010 | Baum et al. |
| 7,769,416 B2 | 8/2010 | Wei et al. |
| 7,770,220 B2 | 8/2010 | Fernstrom |
| 7,782,993 B2 | 8/2010 | Lesser et al. |
| 7,805,678 B1 | 9/2010 | Niles et al. |
| 7,847,815 B2 | 12/2010 | Patel et al. |
| 7,860,342 B2 | 12/2010 | Levien et al. |
| 7,882,107 B2 | 2/2011 | Baader et al. |
| 7,890,368 B2 | 2/2011 | Lambert et al. |
| 7,895,617 B2 | 2/2011 | Pedlow, Jr. |
| 7,895,620 B2 | 2/2011 | Haberman et al. |
| 7,903,904 B1 | 3/2011 | Loeb et al. |
| 7,913,273 B2 | 3/2011 | Del Beccaro et al. |
| 7,917,924 B2 | 3/2011 | Haberman et al. |
| 7,945,926 B2 | 5/2011 | Dempski et al. |
| 7,974,970 B2 | 7/2011 | Leung et al. |
| 8,006,186 B2 | 8/2011 | Kellock et al. |
| 8,031,060 B2 | 10/2011 | Hoffberg et al. |
| 8,099,660 B1 | 1/2012 | O'Sullivan et al. |
| 8,126,938 B2 | 2/2012 | Cohen et al. |
| 8,136,028 B1 | 3/2012 | Loeb et al. |
| 8,180,826 B2 | 5/2012 | Hua et al. |
| 8,224,950 B2 | 7/2012 | Humes |
| 8,259,995 B1 | 9/2012 | Schendel et al. |
| 8,281,339 B1 | 10/2012 | Walker et al. |
| 8,285,070 B2 | 10/2012 | Panetta et al. |
| 8,312,485 B2 | 11/2012 | Robson et al. |
| 8,345,918 B2 | 1/2013 | Fleisher |
| 8,347,396 B2 | 1/2013 | Grigsby et al. |
| 8,363,890 B2 | 1/2013 | Ihara |
| 8,375,302 B2 | 2/2013 | Oakley et al. |
| 8,437,567 B2 | 5/2013 | Jeong et al. |
| 8,459,807 B2 | 6/2013 | Herbert et al. |
| 8,478,959 B1 | 7/2013 | Wyatt |
| 8,498,413 B2 | 7/2013 | Kita et al. |
| 8,553,928 B2 | 10/2013 | Kiya et al. |
| 8,584,002 B2 | 11/2013 | Cave et al. |
| 8,635,198 B1 | 1/2014 | McBrian |
| 8,689,261 B2 | 4/2014 | Austin |
| 8,694,604 B2 | 4/2014 | Cummins et al. |
| 8,732,087 B2 | 5/2014 | Cohen et al. |
| 8,739,017 B2 | 5/2014 | Glazer et al. |
| 8,745,068 B2 | 6/2014 | Colombino et al. |
| 8,755,058 B1 | 6/2014 | Jackson |
| 8,775,918 B2 | 7/2014 | Livshin et al. |
| 8,782,726 B1 | 7/2014 | Cox |
| 2001/0014897 A1 | 8/2001 | Hata et al. |
| 2001/0016820 A1 | 8/2001 | Tanaka et al. |
| 2001/0023436 A1 | 9/2001 | Srinivasan et al. |
| 2001/0033661 A1 | 10/2001 | Prokoski |
| 2001/0033671 A1 | 10/2001 | Kearey |
| 2001/0033674 A1 | 10/2001 | Chen et al. |
| 2001/0034740 A1 | 10/2001 | Kerne |
| 2001/0034742 A1 | 10/2001 | Stinson |
| 2001/0041050 A1 | 11/2001 | Iwata et al. |
| 2001/0044781 A1 | 11/2001 | Shutes |
| 2002/0010757 A1 | 1/2002 | Granik et al. |
| 2002/0015514 A1 | 2/2002 | Kinjo |
| 2002/0033842 A1 | 3/2002 | Zetts |
| 2002/0073121 A1 | 6/2002 | Sano et al. |
| 2002/0077986 A1 | 6/2002 | Kobata et al. |
| 2002/0081003 A1 | 6/2002 | Sobol |
| 2002/0081040 A1 | 6/2002 | Uchida |
| 2002/0091725 A1 | 7/2002 | Skok |
| 2002/0109707 A1 | 8/2002 | Lao et al. |
| 2002/0129273 A1 | 9/2002 | Noonan |
| 2002/0138843 A1 | 9/2002 | Samaan et al. |
| 2002/0143972 A1 | 10/2002 | Christopoulos et al. |
| 2002/0144262 A1 | 10/2002 | Plotnick et al. |
| 2002/0146123 A1 | 10/2002 | Tian |
| 2002/0146238 A1 | 10/2002 | Sugahara |
| 2002/0147782 A1 | 10/2002 | Dimitrova et al. |
| 2002/0162120 A1 | 10/2002 | Mitchell |
| 2002/0169793 A1 | 11/2002 | Sweeney |
| 2002/0178077 A1 | 11/2002 | Katz et al. |
| 2002/0184183 A1 | 12/2002 | Cherry et al. |
| 2002/0194195 A1 | 12/2002 | Fenton et al. |
| 2002/0194595 A1 | 12/2002 | Miller et al. |
| 2002/0198909 A1 | 12/2002 | Huynh et al. |
| 2002/0199189 A1 | 12/2002 | Prijatel et al. |
| 2003/0007700 A1 | 1/2003 | Gutta et al. |
| 2003/0018966 A1 | 1/2003 | Cook et al. |
| 2003/0023598 A1 | 1/2003 | Janakiraman et al. |
| 2003/0028432 A1 | 2/2003 | Troyansky et al. |
| 2003/0028543 A1 | 2/2003 | Dusberger |
| 2003/0028873 A1 | 2/2003 | Lemmons |
| 2003/0033202 A1 | 2/2003 | Ogawa et al. |
| 2003/0039464 A1 | 2/2003 | Davis et al. |
| 2003/0058939 A1 | 3/2003 | Lee et al. |
| 2003/0061111 A1 | 3/2003 | Dutta et al. |
| 2003/0070167 A1 | 4/2003 | Holtz et al. |
| 2003/0076321 A1 | 4/2003 | Clavadetscher |
| 2003/0078828 A1 | 4/2003 | Basson et al. |
| 2003/0093790 A1 | 5/2003 | Logan et al. |
| 2003/0108240 A1 | 6/2003 | Gutta et al. |
| 2003/0123701 A1 | 7/2003 | Dorrell et al. |
| 2003/0126267 A1 | 7/2003 | Gutta et al. |
| 2003/0128343 A1 | 7/2003 | Crasnianski et al. |
| 2003/0135464 A1 | 7/2003 | Mourad et al. |
| 2003/0145323 A1 | 7/2003 | Hendricks et al. |
| 2003/0156134 A1 | 8/2003 | Kim |
| 2003/0174837 A1 | 9/2003 | Candelore et al. |
| 2003/0184653 A1 | 10/2003 | Ohkubo |
| 2003/0184798 A1 | 10/2003 | Enomoto et al. |
| 2003/0191816 A1 | 10/2003 | Landress et al. |
| 2003/0195863 A1 | 10/2003 | Marsh |
| 2003/0196164 A1 | 10/2003 | Gupta et al. |
| 2003/0202124 A1 | 10/2003 | Alden |
| 2003/0208466 A1 | 11/2003 | Stern |
| 2003/0208469 A1 | 11/2003 | Stern |
| 2003/0210828 A1 | 11/2003 | Georgiev et al. |
| 2003/0214727 A1 | 11/2003 | Min et al. |
| 2003/0222994 A1 | 12/2003 | Dawson |
| 2003/0229549 A1 | 12/2003 | Wolinsky et al. |
| 2003/0233438 A1 | 12/2003 | Hutchinson et al. |
| 2003/0236886 A1 | 12/2003 | Oren et al. |
| 2004/0012540 A1 | 1/2004 | Treibitz et al. |
| 2004/0012601 A1 | 1/2004 | Sang, Jr. et al. |
| 2004/0017390 A1 | 1/2004 | Knowlton et al. |
| 2004/0031062 A1 | 2/2004 | Lemmons |
| 2004/0046868 A1 | 3/2004 | Anderson et al. |
| 2004/0054923 A1 | 3/2004 | Seago et al. |
| 2004/0060067 A1 | 3/2004 | Yi |
| 2004/0073430 A1 | 4/2004 | Desai et al. |
| 2004/0073916 A1 | 4/2004 | Petrovic et al. |
| 2004/0078238 A1 | 4/2004 | Thomas et al. |
| 2004/0081338 A1 | 4/2004 | Takenaka |
| 2004/0111467 A1 | 6/2004 | Willis |
| 2004/0111468 A1 | 6/2004 | Enomoto |
| 2004/0120584 A1 | 6/2004 | Jang et al. |
| 2004/0128309 A1 | 7/2004 | Gurney et al. |
| 2004/0139480 A1 | 7/2004 | Delpuch et al. |
| 2004/0158858 A1 | 8/2004 | Paxton et al. |
| 2004/0164996 A1 | 8/2004 | Criminisi et al. |
| 2004/0184073 A1 | 9/2004 | Shahindoust |
| 2004/0190767 A1 | 9/2004 | Tedesco et al. |
| 2004/0194128 A1 | 9/2004 | McIntyre et al. |
| 2004/0201609 A1 | 10/2004 | Obrador |
| 2004/0202382 A1 | 10/2004 | Pilu |
| 2004/0204967 A1 | 10/2004 | Lee et al. |
| 2004/0204985 A1 | 10/2004 | Gibson et al. |
| 2004/0205508 A1 | 10/2004 | Wecker et al. |
| 2004/0213437 A1 | 10/2004 | Howard et al. |
| 2004/0218100 A1 | 11/2004 | Staker et al. |
| 2004/0222904 A1 | 11/2004 | Ciolli |
| 2004/0230659 A1 | 11/2004 | Chase |
| 2004/0230891 A1 | 11/2004 | Pravetz et al. |

(56) References Cited

U.S. PATENT DOCUMENTS

| | | |
|---|---|---|
| 2004/0239681 A1 | 12/2004 | Robotham et al. |
| 2004/0249864 A1 | 12/2004 | Laumen et al. |
| 2004/0250272 A1 | 12/2004 | Durden et al. |
| 2005/0008242 A1 | 1/2005 | Liege et al. |
| 2005/0008246 A1 | 1/2005 | Kinjo |
| 2005/0011959 A1 | 1/2005 | Grosvenor |
| 2005/0028191 A1 | 2/2005 | Sullivan et al. |
| 2005/0028193 A1 | 2/2005 | Candelore et al. |
| 2005/0028217 A1 | 2/2005 | Marler et al. |
| 2005/0057689 A1 | 3/2005 | Sakagami |
| 2005/0071888 A1 | 3/2005 | Girouard et al. |
| 2005/0076359 A1 | 4/2005 | Pierson et al. |
| 2005/0078944 A1 | 4/2005 | Risan et al. |
| 2005/0086069 A1 | 4/2005 | Watson et al. |
| 2005/0086703 A1 | 4/2005 | Gupta et al. |
| 2005/0108754 A1 | 5/2005 | Carhart et al. |
| 2005/0114214 A1 | 5/2005 | Itoh |
| 2005/0123172 A1 | 6/2005 | Henson |
| 2005/0129196 A1 | 6/2005 | Creamer et al. |
| 2005/0129272 A1 | 6/2005 | Rottman |
| 2005/0131607 A1 | 6/2005 | Breed |
| 2005/0144635 A1 | 6/2005 | Boortz |
| 2005/0154636 A1 | 7/2005 | Hildinger et al. |
| 2005/0160368 A1 | 7/2005 | Liu et al. |
| 2005/0161368 A1 | 7/2005 | Gillespie et al. |
| 2005/0177844 A1 | 8/2005 | Levi et al. |
| 2005/0198686 A1 | 9/2005 | Krause et al. |
| 2005/0201565 A1 | 9/2005 | Choi et al. |
| 2005/0204287 A1 | 9/2005 | Wang |
| 2005/0204381 A1 | 9/2005 | Ludvig et al. |
| 2005/0209999 A1 | 9/2005 | Jou |
| 2005/0225566 A1 | 10/2005 | Kojo |
| 2005/0240661 A1 | 10/2005 | Heller et al. |
| 2005/0270372 A1* | 12/2005 | Henninger, III ............... 348/143 |
| 2005/0273470 A1 | 12/2005 | Heigold |
| 2005/0278256 A1 | 12/2005 | Vandewater et al. |
| 2005/0278333 A1 | 12/2005 | Daniels et al. |
| 2005/0278731 A1 | 12/2005 | Cameron et al. |
| 2005/0282140 A1 | 12/2005 | Knight |
| 2005/0283617 A1 | 12/2005 | Davis |
| 2006/0015904 A1 | 1/2006 | Marcus |
| 2006/0020962 A1 | 1/2006 | Stark et al. |
| 2006/0041431 A1 | 2/2006 | Maes |
| 2006/0041591 A1 | 2/2006 | Rhoads |
| 2006/0045372 A1 | 3/2006 | Wang et al. |
| 2006/0047956 A1 | 3/2006 | Calvin |
| 2006/0053365 A1 | 3/2006 | Hollander et al. |
| 2006/0064384 A1 | 3/2006 | Mehrotra et al. |
| 2006/0064716 A1 | 3/2006 | Sull et al. |
| 2006/0069798 A1 | 3/2006 | Li et al. |
| 2006/0069987 A1 | 3/2006 | Jones et al. |
| 2006/0089160 A1 | 4/2006 | Othmer |
| 2006/0089969 A1 | 4/2006 | Brown et al. |
| 2006/0092043 A1 | 5/2006 | Lagassey |
| 2006/0098943 A1 | 5/2006 | Scott, III et al. |
| 2006/0104480 A1 | 5/2006 | Fleisher |
| 2006/0123246 A1 | 6/2006 | Vantalon et al. |
| 2006/0123462 A1 | 6/2006 | Lunt et al. |
| 2006/0125930 A1 | 6/2006 | Mindrum et al. |
| 2006/0129908 A1 | 6/2006 | Markel |
| 2006/0130118 A1 | 6/2006 | Damm |
| 2006/0130119 A1 | 6/2006 | Candelore et al. |
| 2006/0130121 A1 | 6/2006 | Candelore et al. |
| 2006/0143560 A1 | 6/2006 | Gupta et al. |
| 2006/0155613 A1 | 7/2006 | Foran et al. |
| 2006/0156219 A1 | 7/2006 | Haot et al. |
| 2006/0161838 A1 | 7/2006 | Nydam et al. |
| 2006/0161850 A1 | 7/2006 | Seaberg |
| 2006/0168285 A1 | 7/2006 | Nielsen et al. |
| 2006/0170767 A1* | 8/2006 | Brassil ............... 348/143 |
| 2006/0171423 A1 | 8/2006 | Helms et al. |
| 2006/0171453 A1 | 8/2006 | Rohlfing et al. |
| 2006/0171752 A1 | 8/2006 | Tanaka et al. |
| 2006/0178997 A1 | 8/2006 | Schneck et al. |
| 2006/0179403 A1 | 8/2006 | Kirkpatrick |
| 2006/0195789 A1 | 8/2006 | Rogers et al. |
| 2006/0212805 A1 | 9/2006 | Allen et al. |
| 2006/0222213 A1 | 10/2006 | Kiyohara et al. |
| 2006/0234765 A1 | 10/2006 | Herberger et al. |
| 2006/0238380 A1 | 10/2006 | Kimchi et al. |
| 2006/0248592 A1 | 11/2006 | Agrawal et al. |
| 2006/0251338 A1 | 11/2006 | Gokturk et al. |
| 2006/0253330 A1 | 11/2006 | Maggio et al. |
| 2006/0253783 A1 | 11/2006 | Vronay et al. |
| 2006/0271980 A1 | 11/2006 | Mankovitz |
| 2006/0277454 A1 | 12/2006 | Chen |
| 2006/0282319 A1 | 12/2006 | Maggio |
| 2006/0282847 A1 | 12/2006 | Gupte |
| 2006/0287916 A1 | 12/2006 | Starr et al. |
| 2006/0287930 A1 | 12/2006 | Wolf et al. |
| 2007/0002360 A1 | 1/2007 | Levien et al. |
| 2007/0006077 A1 | 1/2007 | Grubbs |
| 2007/0016847 A1 | 1/2007 | Reichardt et al. |
| 2007/0027844 A1 | 2/2007 | Toub et al. |
| 2007/0044011 A1 | 2/2007 | Cottrille et al. |
| 2007/0050718 A1 | 3/2007 | Moore et al. |
| 2007/0055986 A1 | 3/2007 | Gilley et al. |
| 2007/0056034 A1 | 3/2007 | Fernstrom |
| 2007/0061838 A1 | 3/2007 | Grubbs et al. |
| 2007/0083571 A1 | 4/2007 | Meller et al. |
| 2007/0094418 A1 | 4/2007 | Reisman |
| 2007/0097955 A1 | 5/2007 | Li et al. |
| 2007/0098267 A1 | 5/2007 | Lee et al. |
| 2007/0100648 A1 | 5/2007 | Borquez et al. |
| 2007/0100698 A1 | 5/2007 | Neiman et al. |
| 2007/0101247 A1 | 5/2007 | Matsuki et al. |
| 2007/0101271 A1 | 5/2007 | Hua et al. |
| 2007/0113184 A1 | 5/2007 | Haot et al. |
| 2007/0153091 A1 | 7/2007 | Watlington et al. |
| 2007/0162842 A1 | 7/2007 | Ambachtsheer et al. |
| 2007/0168853 A1 | 7/2007 | Jarman |
| 2007/0198744 A1 | 8/2007 | Wensley et al. |
| 2007/0199025 A1 | 8/2007 | Angiolillo et al. |
| 2007/0208751 A1 | 9/2007 | Cowan et al. |
| 2007/0234214 A1 | 10/2007 | Lovejoy et al. |
| 2007/0237358 A1 | 10/2007 | Tseng et al. |
| 2007/0250506 A1 | 10/2007 | Stevens et al. |
| 2007/0263865 A1 | 11/2007 | Cohen et al. |
| 2007/0266049 A1 | 11/2007 | Cohen et al. |
| 2007/0274519 A1 | 11/2007 | Cohen et al. |
| 2007/0276757 A1 | 11/2007 | Cohen et al. |
| 2007/0294305 A1 | 12/2007 | Cohen et al. |
| 2007/0294720 A1 | 12/2007 | Cohen et al. |
| 2007/0299877 A1 | 12/2007 | Cohen et al. |
| 2008/0005576 A1 | 1/2008 | Weiss |
| 2008/0010083 A1 | 1/2008 | Cohen et al. |
| 2008/0013859 A1 | 1/2008 | Cohen et al. |
| 2008/0019576 A1 | 1/2008 | Senftner et al. |
| 2008/0021997 A1 | 1/2008 | Hinton |
| 2008/0028422 A1 | 1/2008 | Cohen et al. |
| 2008/0034401 A1* | 2/2008 | Wang ............... 726/1 |
| 2008/0037826 A1 | 2/2008 | Sundstrom et al. |
| 2008/0052104 A1 | 2/2008 | Cohen et al. |
| 2008/0052161 A1 | 2/2008 | Cohen et al. |
| 2008/0059530 A1 | 3/2008 | Cohen et al. |
| 2008/0077595 A1 | 3/2008 | Leebow |
| 2008/0077954 A1 | 3/2008 | Cohen et al. |
| 2008/0086380 A1 | 4/2008 | Cohen et al. |
| 2008/0109306 A1 | 5/2008 | Maigret et al. |
| 2008/0112683 A1 | 5/2008 | Lin et al. |
| 2008/0117295 A1 | 5/2008 | Ebrahimi et al. |
| 2008/0120154 A1 | 5/2008 | Dellovo |
| 2008/0124056 A1 | 5/2008 | Concotelli |
| 2008/0127298 A1 | 5/2008 | Reeves et al. |
| 2008/0134282 A1 | 6/2008 | Fridman et al. |
| 2008/0154633 A1* | 6/2008 | Ishibashi et al. ............... 705/1 |
| 2008/0163365 A1 | 7/2008 | Austin et al. |
| 2008/0172689 A1 | 7/2008 | Feder et al. |
| 2008/0178068 A1 | 7/2008 | Chaudhri |
| 2008/0184098 A1 | 7/2008 | Chen et al. |
| 2008/0189591 A1 | 8/2008 | Lection |
| 2008/0195938 A1 | 8/2008 | Tischer et al. |
| 2008/0215420 A1 | 9/2008 | Angelica |
| 2008/0244755 A1 | 10/2008 | Cohen et al. |

(56) References Cited

U.S. PATENT DOCUMENTS

| | | | |
|---|---|---|---|
| 2008/0255920 A1 | 10/2008 | Vandergriff et al. | |
| 2008/0267403 A1* | 10/2008 | Boult | 380/255 |
| 2008/0270161 A1 | 10/2008 | Cohen et al. | |
| 2008/0313233 A1 | 12/2008 | Cohen et al. | |
| 2008/0319723 A1 | 12/2008 | Smith et al. | |
| 2009/0001154 A1 | 1/2009 | Wang | |
| 2009/0037243 A1 | 2/2009 | Cohen et al. | |
| 2009/0037278 A1 | 2/2009 | Cohen et al. | |
| 2009/0049467 A1 | 2/2009 | Robson et al. | |
| 2009/0063496 A1 | 3/2009 | Cunningham et al. | |
| 2009/0067820 A1 | 3/2009 | Walker et al. | |
| 2009/0113279 A1 | 4/2009 | Monro et al. | |
| 2009/0144829 A1 | 6/2009 | Grigsby et al. | |
| 2009/0150199 A1 | 6/2009 | Cohen et al. | |
| 2009/0150444 A1 | 6/2009 | Cohen et al. | |
| 2009/0151004 A1 | 6/2009 | Cohen et al. | |
| 2009/0151008 A1 | 6/2009 | Cohen et al. | |
| 2009/0154806 A1 | 6/2009 | Chang et al. | |
| 2009/0177542 A1 | 7/2009 | Haberman et al. | |
| 2009/0180025 A1 | 7/2009 | Dawson | |
| 2009/0204580 A1 | 8/2009 | Seamon et al. | |
| 2009/0222489 A1 | 9/2009 | Sudoh et al. | |
| 2009/0248692 A1 | 10/2009 | Tsukagoshi et al. | |
| 2009/0249482 A1 | 10/2009 | Sarathy | |
| 2009/0327848 A1 | 12/2009 | Glazer et al. | |
| 2010/0030746 A1 | 2/2010 | Steelberg et al. | |
| 2010/0042503 A1 | 2/2010 | Farmer | |
| 2010/0083077 A1 | 4/2010 | Paulsen et al. | |
| 2010/0094868 A1 | 4/2010 | Leung et al. | |
| 2010/0131833 A1 | 5/2010 | Chaudhri | |
| 2010/0153994 A1 | 6/2010 | Alexander | |
| 2010/0177978 A1 | 7/2010 | Jeong et al. | |
| 2010/0192175 A1 | 7/2010 | Bachet et al. | |
| 2011/0047487 A1 | 2/2011 | Deweese et al. | |
| 2011/0103706 A1 | 5/2011 | Jeong et al. | |
| 2011/0271116 A1 | 11/2011 | Martinez | |
| 2011/0273553 A1 | 11/2011 | Spatharis | |
| 2011/0289579 A1 | 11/2011 | Davis et al. | |
| 2012/0005034 A1 | 1/2012 | Jarman et al. | |
| 2012/0109727 A1 | 5/2012 | Ben-Yaacov et al. | |
| 2012/0179432 A1 | 7/2012 | Wivell et al. | |
| 2012/0195789 A1 | 8/2012 | Huang et al. | |
| 2012/0201418 A1 | 8/2012 | Bellwood et al. | |
| 2012/0218297 A1 | 8/2012 | Ur | |
| 2012/0331371 A1 | 12/2012 | Larson et al. | |
| 2013/0013705 A1 | 1/2013 | White et al. | |
| 2013/0117131 A1 | 5/2013 | Robinson et al. | |
| 2013/0226974 A1 | 8/2013 | Cosic | |
| 2014/0032547 A1 | 1/2014 | Webster et al. | |
| 2014/0040946 A1 | 2/2014 | Gates, III et al. | |
| 2014/0068661 A1 | 3/2014 | Gates, III et al. | |
| 2014/0073427 A1 | 3/2014 | Sitrick | |
| 2014/0089507 A1 | 3/2014 | Prakash et al. | |
| 2014/0259092 A1 | 9/2014 | Boucher et al. | |

FOREIGN PATENT DOCUMENTS

| | | |
|---|---|---|
| KR | 2001068106 A | 7/2001 |
| KR | 20020011279 A | 2/2002 |
| KR | 10-2007-0102360 A | 10/2007 |
| WO | WO 02/17234 A1 | 2/2002 |
| WO | WO 02/085018 A1 | 10/2002 |
| WO | WO 2005/078597 A1 | 8/2005 |
| WO | WO 2006/112822 A1 | 10/2006 |

OTHER PUBLICATIONS

U.S. Appl. No. 11/701,527, Jung et al.
U.S. Appl. No. 11/701,524, Jung et al.
U.S. Appl. No. 11/701,167, Jung et al.
U.S. Appl. No. 11/195,358, Levien et al.
U.S. Appl. No. 11/195,346, Levien et al.
Raskar, Ramesh; Ilie, Adrian; Yu, Jingyi; "Image Fusion for Context Enhancement and Video Surrealism"; pp. 1-9.
Vibrant Media—Advertisers; "Products"; Bearing a date of 2004; p. 1; located at http://www.vibrantmedia.com/site/advertisers_01.html; Vibrant Media Inc.; printed on Jun. 28, 2005.
Vibrant Media—Advertisers; "Products—IntellitTXT Overview"; Bearing a date of 2004; p. 1; located at http://www.vibrantmedia.com/site/advertisers_01a.html; Vibrant Media Inc.; printed on Jun. 28, 2005.
Vibrant Media; "IntelliTXT Demo"; p. 1; located at http://www.vibrantmedia.com/site/IntelliTXT_Demo.html; printed on Jun. 29, 2005.
Vibrant Media—Advertisers; "Products—SmartAD Overview"; Bearing a date of 2004; p. 1; located at http://www.vibrantmedia.com/site/advertisers_01b.html; Vibrant Media Inc.; printed on Jun. 28, 2005.
Vibrant Media; "SmartAD Demo"; p. 1; located at http://www.vibrantmedia.com/site/SmartAD_Demo.html; printed on Jun. 29, 2005.
Lin, Eugene T., et al.; "Detection of Image Alterations Using Semi-Fragile Watermarks"; bearing a date of 2000; Google 2000; pp. 1-12.
Maes, Frederik, et al.; "Multimodality Image Registration by Maximization of Mutual Information"; IEEE Transactions on Medical Imaging; bearing a date of Apr. 1997; pp. 187-198; vol. 16.; No. 2.
"BA cuts Branson from Bond movie"; BBC News; bearing a date of Apr. 21, 2007; p. 1; located at http://news.bbc.co.uk/go/pr/fr/-/2/hi/entertainment/6579839.stm; printed on Apr. 21, 2007.
"Robust video transmission using MPEG Markup Language and adaptive error correction codes"— (abstract); bearing a date of 2007; p. 1; located http://ieeexplore.ieee.org/xpls/absprintfjsp?arnumber=1394682; printed on Jan. 7, 2008.
Sun, Xiaoming; Kuo, C.-C. Jay; "Robust video transmission using MPEG Markup Language and adaptive error correction codes"; IEEE International Conference on Multimedia and Expo; bearing a date of Jun. 27-30, 2004; pp. 2107-2110; vol. 3; IEEE.
Zhou, Tina T.; Jin, Jesse S.; "Principles of Video Annotation Markup Language (VAML)"; Pan-Sydney Area Workshop on Visual Information Processing; bearing a date of 2004; pp. 123-127; Australian Computer Society, Inc.
Dionisio et al.; "A Unified Data Model for Representing Multimedia, Timeline, and Simulation Data"; IEEE; Sep./Oct. 1998; pp. 746-767; vol. 10, No. 5.
"Face Recognition Homepage—Algorithms"; bearing a date of Mar. 21, 2006; pp. 1-8; printed on Nov. 16, 2006; located at http://www.face-rec.org/algorithms/; VCL.
U.S. Appl. No. 12/455,301, Cohen et al.
U.S. Appl. No. 12/384,217, Cohen et al.
U.S. Appl. No. 12/384,213, Cohen et al.
U.S. Appl. No. 12/380,570, Cohen et al.
U.S. Appl. No. 12/322,605, Cohen et al.
U.S. Appl. No. 12/322,372, Cohen et al.
U.S. Appl. No. 11/728,729, Jung et al.
Boll et al.; "A Cross-Media Adaption Strategy for Multimedia Presentations"; ACM Multimedia; bearing a date of 1999; pp. 37-46.
Smith et al.; "Scalable Multimedia Delivery for Pervasive Computing"; ACM Multimedia; bearing a date of 1999; pp. 131-140.
White, Ron; "How Computers Work, Millennium Edition"; Sep. 1999; pp. 1-284; Que Corp.; Indianapolis, IN.
Oomoto et al.; "OVID: Design and Implementation of a Video-Object Database System"; IEEE Transactions on Knowledge and Data Engineering; Aug. 1993; pp. 629-643; vol. 5, No. 4; IEEE.
"Premiere Screenshots" (Adobe Premiere Pro 1.5, Adobe Systems Inc., Mar. 2004, screenshots taken by Examiner); total of 7 pages.
Rosenberg, Jacob; "Adobe ® Premiere Pro ® 1.5 Studio Techniques"; Jun. 28, 2004; total of 8 pages; Adobe Press.
Manovich, Lev; "Post-Media Aesthetics"; Google; bearing a date of 2005; pp. 1-18.
Lamay, Craig; "Public Service Advertising, Broadcasters, and the Public Interest, Regulatory Background and the Digital Future"; Shouting to be Heard, Public Service Advertising in a New Media Age; bearing a date of 2002 (provided by examiner); pp. 7-13.
Franklin et al.; "Web 2.0 for Content for Learning and Teaching in Higher Education"; bearing a date of May 28, 2007; pp. 1-29.

(56) References Cited

OTHER PUBLICATIONS

Tanaka, Yuzuru; "A Meme Media Architecture for Fine-Grain Component Software"; Division of Electronics and Information Engineering, Hokkaido University; 1996; pp. 190-214; Sapporo, Japan.

Duan et al.; "Adult Image Detection Method Base-on Skin Color Model and Support Vector Machine"; ACCV2002: The $5^{th}$ Asian Conference on Computer Vision; Jan. 23-25, 2002; pp. 1-4; Melbourne, Australia.

Ap-Apid, Rigan; "An Algorithm for Nudity Detection"; College of Computer Studies De La Salle University; pp. 1-6; As provided by Examiner: Google 2006; created on May 9, 2014; Manila Philippines.

Berghel, Hal et al.; "Protecting ownership rights through digital watermarking"; bearing a date of Jul. 1996; vol. 29, Issue 7; pp. 101-103 (as provided by examiner); IEEE.

Seldon et al.; "Media Substitution and Economies of Scale in Advertising"; International Journal of Industrial Organization; bearing a date of Jan. 1, 1998; pp. 1153-1180; vol. 18; Elsevier Science B.V.

Ventura et al.; "Search and Replace of 2-D Objects in Digital Images"; Visual Form; Bearing a date of 1992; pp. 205-212; Springer.

"Truth-table reduction"; Wikipedia; bearing a date of Jun. 4, 2015; printed on Jul. 14, 2015; pp. 1-2; located at https://en.wikipedia.org/w/index.php?title=Truth-table_reduction&oldid=665496395.

\* cited by examiner

FIG. 13

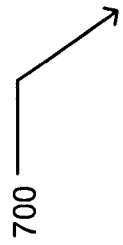

710 A computer-readable signal bearing medium.

720 Program instructions operable to perform a process in a computing device, the process includes:
a) receiving an image of a subject;
b) reducing a fidelity of a property of the subject in the captured image in response to an ambiguity policy; and
c) broadcasting an indication of the ambiguity policy.

722 Saving data representative of the received image of a subject having the reduced fidelity of the property.

712 A computer storage medium.

714 A communications medium.

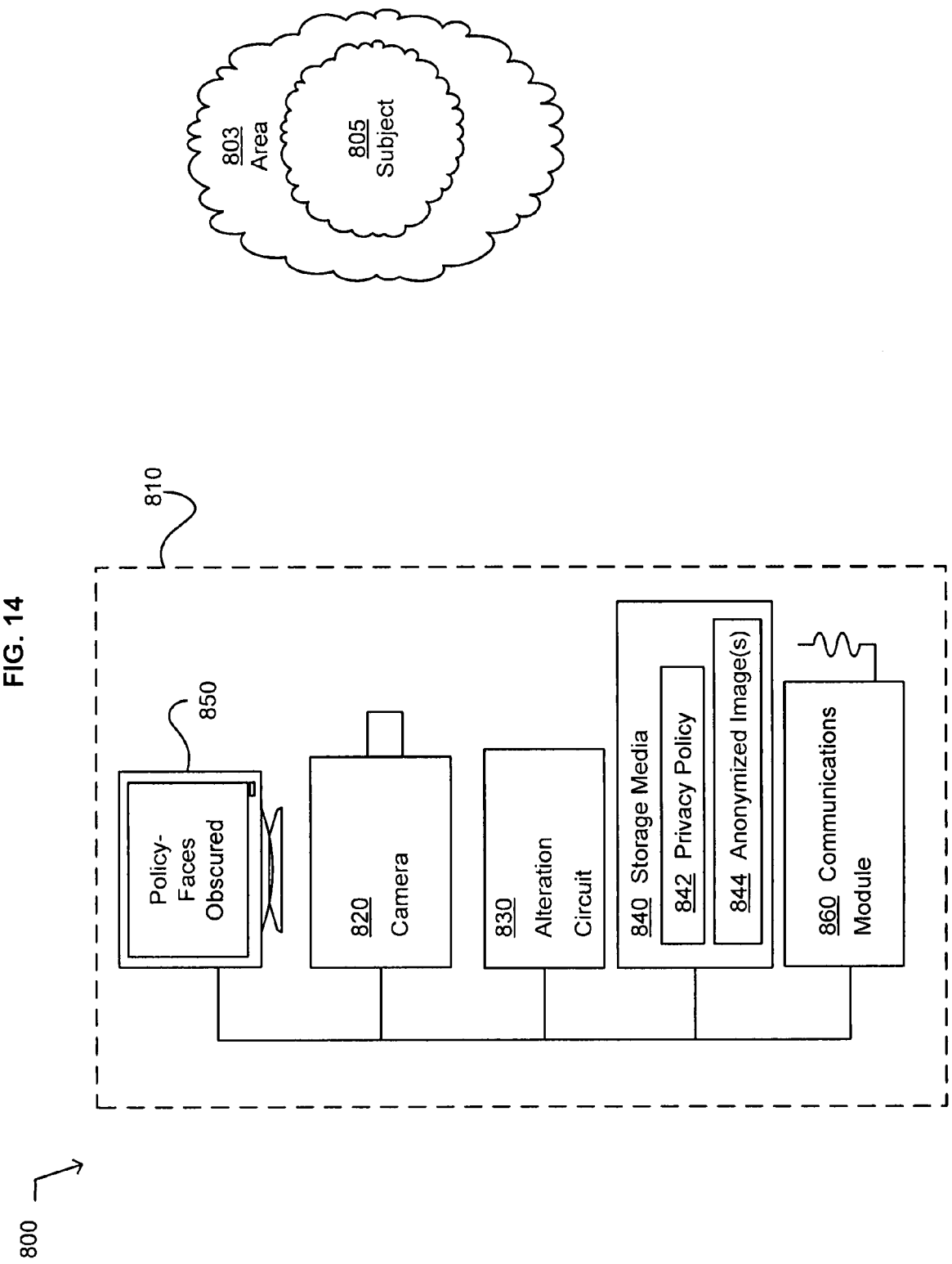

1510 A computer-readable signal bearing medium.

1520 Program instructions operable to perform a process in a computing device, the process comprising:
a) sending a signal indicative of a privacy policy; and
b) obscuring a property of a subject depicted in a received image in response to the privacy policy.

1522 Causing a displayed indication of the privacy policy perceivable by a human proximate to the subject and near in time to a capture of the received image.

1524 Receiving the image depicting the subject.

1526 Saving digital data representative of the subject depicted in the received image with the property obscured in response to the privacy policy.

1512 A computer storage medium.

1514 A communications medium.

IMAGE ANONYMIZATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/701,167, entitled TARGETED OBSTRUFICATION OF AN IMAGE, naming EDWARD K. Y. JUNG; ROYCE A. LEVIEN; ROBERT W. LORD; MARK A. MALAMUD; WILLIAM HENRY MANGIONE-SMITH; JOHN D. RINALDO, JR. as inventors, filed 31 Jan. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/701,524, entitled ANONYMIZATION PURSUANT TO A BROADCASTED POLICY, naming EDWARD K. Y. JUNG; ROYCE A. LEVIEN; ROBERT W. LORD; MARK A. MALAMUD; WILLIAM HENRY MANGIONE-SMITH; JOHN D. RINALDO, JR. as inventors, filed 31 Jan. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/174,432 entitled PROVIDING PROMOTIONAL CONTENT, naming ROYCE A. LEVIEN; ROBERT W. LORD; MARK A. MALAMUD; JOHN D. RINALDO, JR. as inventors, filed 1 Jul. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/173,990 entitled TECHNIQUES FOR IMAGE GENERATION, naming ROYCE A. LEVIEN; ROBERT W. LORD; MARK A. MALAMUD; JOHN D. RINALDO, JR. as inventors, filed 1 Jul. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,358 entitled MODIFYING RESTRICTED IMAGES, naming ROYCE A. LEVIEN; ROBERT W. LORD; MARK A. MALAMUD; JOHN D. RINALDO, JR. as inventors, filed 2 Aug. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,346 entitled RESTORING MODIFIED ASSETS, naming ROYCE A. LEVIEN; ROBERT W. LORD; MARK A. MALAMUD; JOHN D. RINALDO, JR. as inventors, filed 2 Aug. 2005, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides a system. The system includes an imaging device operable to acquire an image of a subject. The system also includes an anonymizer circuit operable to generate an anonymized image that includes a decreased fidelity of a property of a subject of the acquired image in response to an anonymization policy. The system further includes a display operable to provide a human-perceivable indication of the anonymization policy. In an embodiment, the system further includes a storage media configurable by data corresponding to the anonymized image. In addition to the foregoing, other system embodiments are described in the claims, drawings, and text that form a part of the present application.

Another embodiment provides a method. The method includes capturing an image of a subject. The method also includes producing an obscured digital image of the subject by reducing a fidelity of a property of the subject in the captured image in response to an ambiguity policy. The method further includes broadcasting an indication of the ambiguity policy. The method may include saving the obscured image. In addition to the foregoing, other method embodiments are described in the claims, drawings, and text that form a part of the present application.

A further embodiment provides a device. The device includes means for capturing a digital image of a subject. The device also includes means for producing an obscured digital image of the subject by reducing a fidelity of a property of the subject in the captured image in response to an ambiguity policy. The device further includes means for broadcasting an indication of the ambiguity policy. The device may include means for saving the obscured digital image in a digital storage medium. In addition to the foregoing, other device embodiments are described in the claims, drawings, and text that form a part of the present application.

An embodiment provides a computer program product. The computer program product includes program instructions operable to perform a process in a computing device. The process includes receiving an image of a subject, and reducing a fidelity of a property of the subject in the captured image in response to an ambiguity policy. The process also includes broadcasting an indication of the ambiguity policy. The process may further include saving data representative of the received image of a subject having the reduced fidelity of the property. The computer program product further includes a computer-readable signal bearing medium bearing the program instructions. In addition to the foregoing, other computer program product embodiments are described in the claims, drawings, and text that form a part of the present application.

Another embodiment provides a system. The system includes an imaging device operable to capture an image of a subject. The system also includes an alteration circuit operable to generate an anonymized image by obscuring a property of the captured image of a subject in response to a privacy policy. The system further includes a computer-readable storage media configurable by the anonymized image, and a display operable to provide a human-perceivable indication of the privacy policy. In addition to the foregoing, other system embodiments are described in the claims, drawings, and text that form a part of the present application.

A further embodiment provides a system. The system includes a sensor device operable to capture from a subject information corresponding to the subject. The system also includes an anonymizer circuit operable to generate an anonymized image that includes a decreased fidelity of a property of a subject of the captured information in response to an anonymization policy. The anonymizer circuit is also operable to inform a display device of the anonymization policy. The system further includes the display device operable to broadcast an indication of the anonymization policy perceivable by a human at least nearby the subject. The system may further include a non-volatile computer storage media configurable by data corresponding to the anonymized image. In addition to the foregoing, other system embodiments are described in the claims, drawings, and text that form a part of the present application.

An embodiment provides a method. The method includes capturing information corresponding to a subject from the subject. The method also includes generating an anonymized image that includes a decreased fidelity of a property of a subject of the captured information in response to an anonymization policy. The method further includes broadcasting an indication of the anonymization policy perceivable by the subject. The method may further include informing a display device of the anonymization policy. In addition to the foregoing, other method embodiments are described in the claims, drawings, and text that form a part of the present application.

Another embodiment provides a device. The device includes means for capturing information corresponding to a subject from the subject. The device also includes means for generating an anonymized image that includes a decreased fidelity of a property of a subject of the captured information in response to an anonymization policy. The device further includes means for broadcasting an indication of the anonymization policy perceivable by a person proximate to the subject. The device may include means for informing a display device of the anonymization policy. In addition to the foregoing, other device embodiments are described in the claims, drawings, and text that form a part of the present application.

A further embodiment provides a device. The device includes an anonymization module operable to produce in response to an anonymization policy an anonymized image by causing a reduction in fidelity of a feature of a subject depicted in a received image. The device further includes a communications module operable to send a signal indicative of the anonymization policy. The device may include a selector module operable to designate the anonymization policy. The device may include a selector module operable to choose the anonymization policy from at least two anonymization policies. The device may include a digital storage media configurable by the anonymized image. The device may include a computing device. The computing device may include the anonymization module. In addition to the foregoing, other device embodiments are described in the claims, drawings, and text that form a part of the present application.

An embodiment provides a method. The method includes obscuring a property of a subject depicted in a received image in response to a privacy policy. The method also includes sending a signal indicative of the privacy policy. The method may include displaying an indication of the privacy policy perceivable by a human proximate to the subject and near in time to a capture of the received image. The method may include displaying an indication of the privacy policy perceivable by a human proximate to the subject and prior to a capture of the received image. The method may include receiving the image depicting the subject. The method may include saving digital data representative of the subject depicted in the received image with the property obscured in response to the privacy policy. In addition to the foregoing, other method embodiments are described in the claims, drawings, and text that form a part of the present application.

Another embodiment provides a device. The device includes means for obscuring in response to a privacy policy a property of a subject depicted in a received image. The device also includes means for sending a signal indicative of the privacy policy receivable by a human-perceivable display. The device may include means for displaying an indication of the privacy policy perceivable by a human proximate to the subject and near in time to a capture of the received image. The device may include means for displaying an indication of the privacy policy perceivable by a human proximate to the subject and prior to a capture of the received image. The device may include means for saving digital data representative of the subject depicted in the received image with the property obscured in response to the privacy policy. In addition to the foregoing, other device embodiments are described in the claims, drawings, and text that form a part of the present application.

A further embodiment provides a computer-program product. The computer program product includes program instructions operable to perform a process in a computing device, and a computer-readable signal bearing medium bearing the program instructions. The process includes sending a signal indicative of a privacy policy, and obscuring a property of a subject depicted in a received image in response to the privacy policy. The process may further include displaying an indication of the privacy policy perceivable by a human proximate to the subject and near in time to a capture of the received image. The process may further include receiving the image depicting the subject. The process may further include data representative of the subject depicted in the received image with the property obscured in response to the privacy policy. In addition to the foregoing, other computer-program product embodiments are described in the claims, drawings, and text that form a part of the present application.

An embodiment provides a system. The system includes an imaging device operable to capture an image depicting a member of a class of subjects that may have a temporal presence in an area. The system also includes an anonymization device having a selector circuit operable to select an anonymization policy, the anonymization policy includes obscuring a property of the class of subjects depicted in the captured image. The system further includes a broadcast device operable to display a human-perceivable indication of the selected anonymization policy to at least a portion of the area. The system also includes an anonymization circuit operable to generate an anonymized image by applying the selected anonymization policy to an image captured by the imaging device and depicting a member of the class of subjects. The system may include a persistent storage media configurable by a digital file representative of the anonymized image. In addition to the foregoing, other system embodiments are described in the claims, drawings, and text that form a part of the present application.

Another embodiment provides a method. The method includes receiving an anonymization policy in an image capture device operable to capture an image of a class of subjects having a temporal presence in an area. The anonymization policy includes obscuring a property of a class of subjects depicted in an image. The method also includes broadcasting a human-perceivable indication of the anonymization policy to at least a portion of the area. The method further includes generating an obscured image of a member of the class of subjects by applying the selected anonymization policy to an image captured by the image capture device and depicting the member of the class of subjects. The method may include selecting the anonymization policy. The method may include configuring a persistent computer-readable storage media with data representative of the obscured image. In addition to the foregoing, other method embodiments are described in the claims, drawings, and text that form a part of the present application.

A further embodiment provides a system. The system includes means for wirelessly receiving an anonymization policy in an image capture device operable to capture an image of a class of subjects having a temporal presence in an area. The anonymization policy including obscuring a property of a class of subjects depicted in an image. The system also includes means for broadcasting a human-perceivable indication of the anonymization policy to at least a portion of the area. The system further includes means for generating an obscured image of a member of the class of subjects by applying the selected anonymization policy to an image captured by the image capture device and depicting the member of the class of subjects. The system may include means for selecting the anonymization policy from at least two anonymization policies. The system may include means for configuring a persistent computer-readable storage media with a file representative of the obscured image. In addition to the foregoing, other system embodiments are described in the claims, drawings, and text that form a part of the present application.

Another embodiment provides a method. The method includes receiving a signal corresponding to an anonymization policy. The anonymization policy includes obscuring a property of a class of subjects depicted in an image. The method also includes broadcasting a human-perceivable indication of the anonymization policy to at least a portion of an area. The method further includes capturing an image depicting a member of the class of subjects having a presence in an area. The method also includes generating an obscured image of the member of the class of subjects by applying the anonymization policy to the captured image depicting the member of the class of subjects.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 13 illustrates an exemplary embodiment of a computer program product;

FIG. 14 illustrates an exemplary embodiment of a system;

FIG. 23 illustrates an exemplary embodiment of an computer-program product;

DETAILED DESCRIPTION

Figure 1:
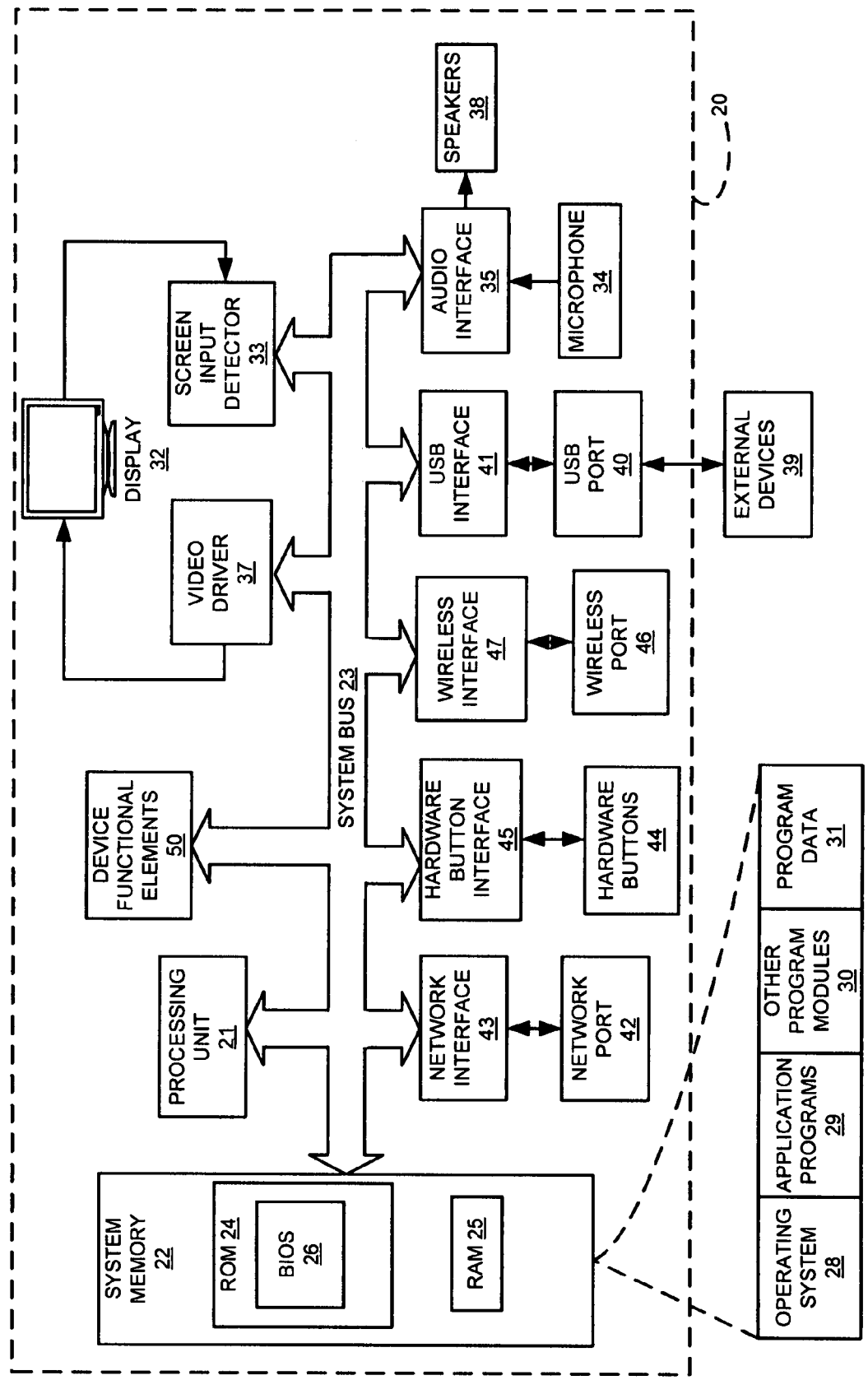
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
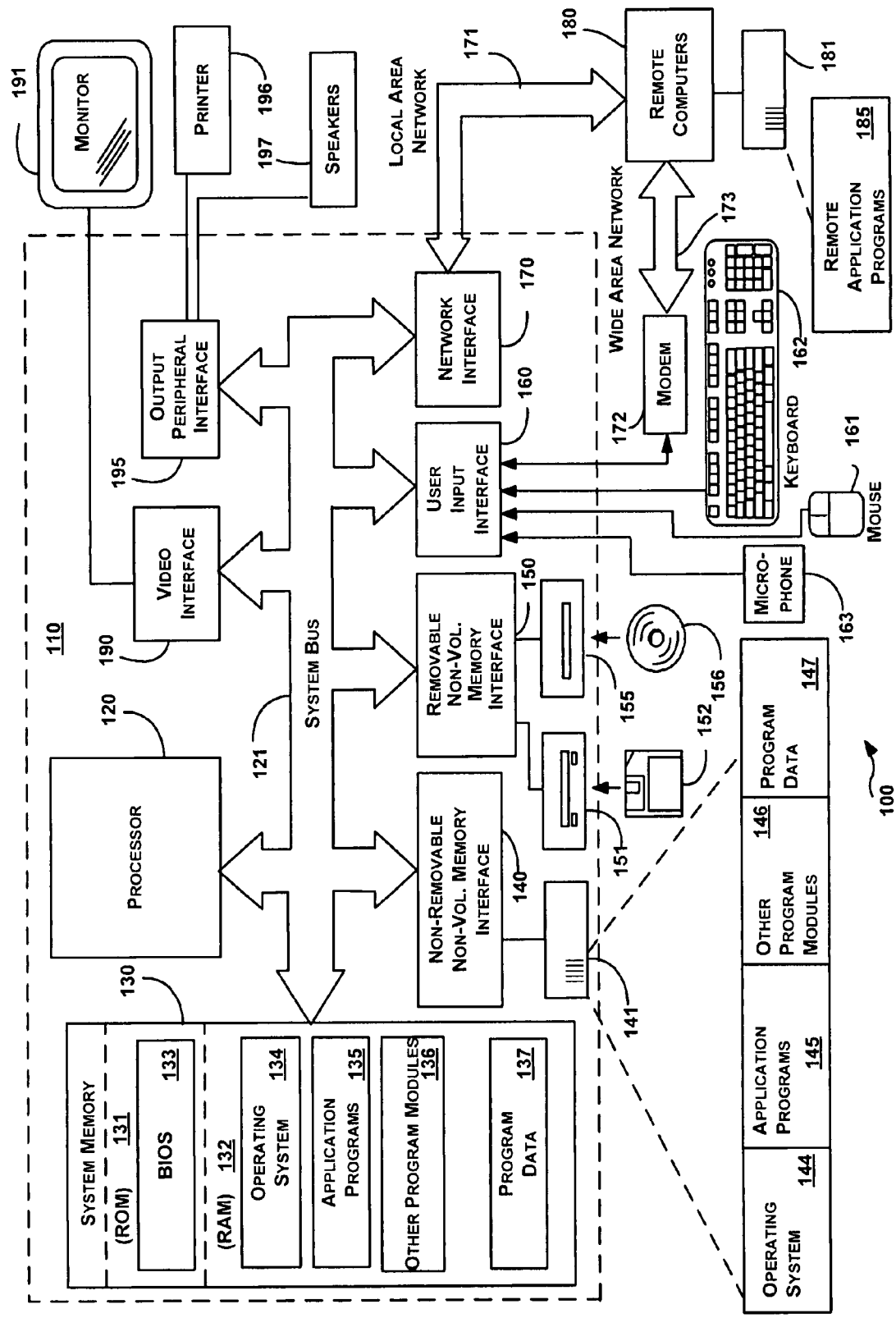
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, an information store may include a computer storage media. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The logical connections depicted in FIG. 2 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing a communications link between the computers may be used.

FIGS. 1 and 2 are intended to provide a brief, general description of an illustrative and/or suitable exemplary environment in which embodiments may be implemented. An exemplary system may include the thin computing device 20 of FIG. 1 and/or the computing system environment 100 of FIG. 2. FIGS. 1 and 2 are examples of a suitable environment and is not intended to suggest any limitation as to the structure, scope of use, or functionality of an embodiment. A particular environment should not be interpreted as having any dependency or requirement relating to any one or combination of components illustrated in an exemplary environment. For example, in certain instances, one or more elements of an environment may be deemed not necessary and omitted. In other instances, one or more other elements may be deemed necessary and added. Further, it will be appreciated that device(s) and/or environment(s) described herein may include numerous electrical, mechanical, and/or digital components that may necessary to operate the device, but are not needed to illustrate the subject matter described herein. As such, some of these electrical, mechanical, and/or digital components may be omitted from the specification for clarity.

In the description that follows, certain embodiments may be described with reference to acts and symbolic representations of operations that are performed by one or more computing devices, such as the computing device 110 of FIG. 2. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 3:
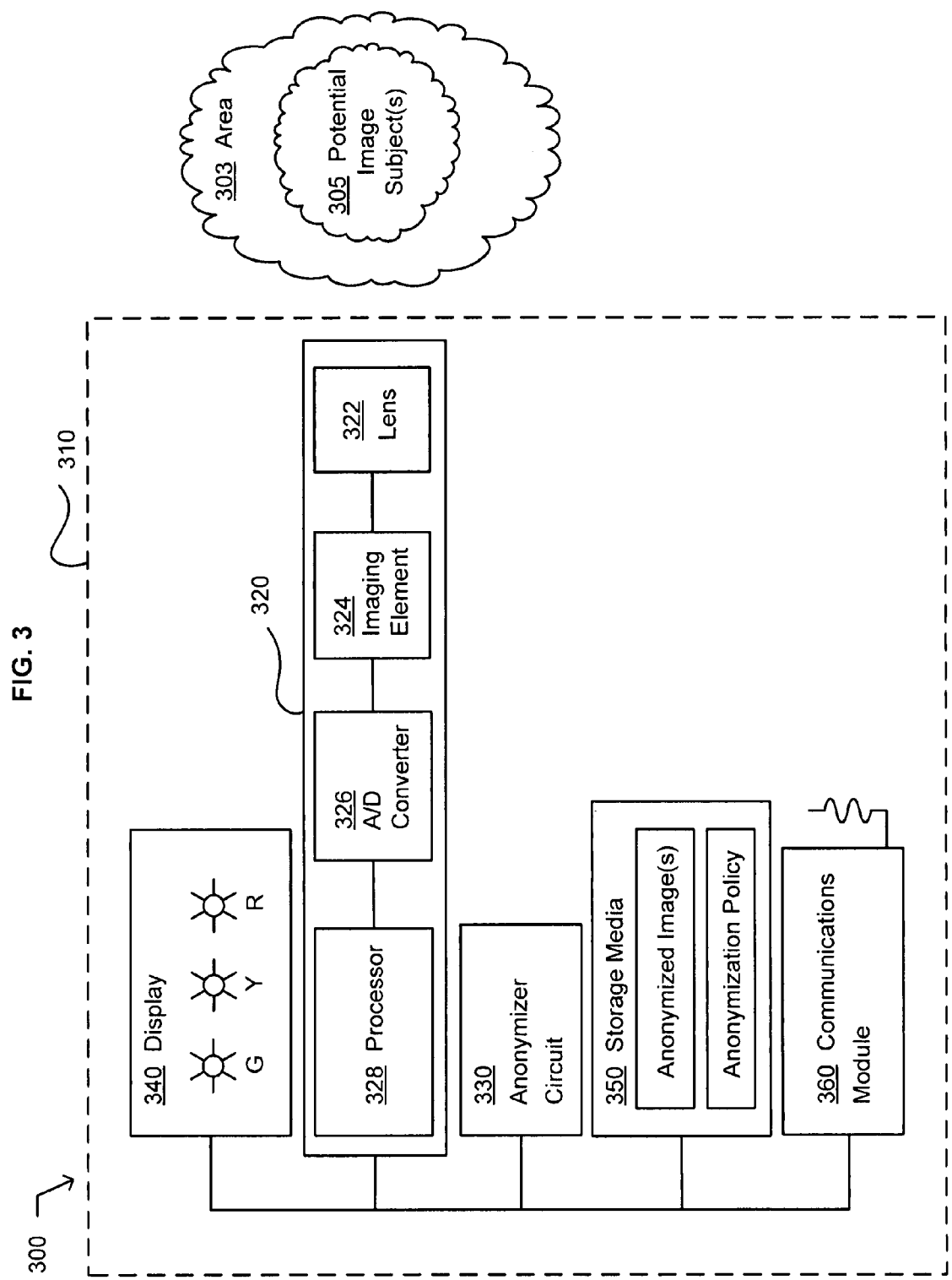
FIG. 3 illustrates an exemplary embodiment of an environment in which an embodiment may be implemented.

FIG. 3 illustrates an exemplary embodiment of an environment 300 in which an embodiment may be implemented. The exemplary environment includes an area 303 that includes, or that may include, one or more subjects 305 whose image may be acquired by an imaging device. The environment also includes a system 310 that includes an imaging device 320, an anonymizer circuit 330, and a display 340. The imaging device is operable to acquire an image of a subject. The anonymizer circuit is operable to generate an anonymized image that includes a decreased fidelity of a property of a subject of the acquired image in response to an anonymization policy. The display is operable to provide a human-perceivable indication of the anonymization policy. In an embodiment, the display includes colored lights indicating the anonymization policy then in effect. For example, in FIG. 3, the colored lights include a green light (G), a yellow light (Y), and a red light (R) that respectively may indicate a green, a yellow, and a red anonymization policy. Continuing with the example, a "green" anonymization policy decreases a fidelity of facial properties and of license plate properties depicted in acquired images. For example, the fidelity may be decreased to a point where facial properties are indistinguishable and license plate properties are indistinguishable. A "yellow" anonymization policy decreases a fidelity of facial properties depicted in acquired images, and a "red" anonymization policy does not decrease a fidelity of facial properties and a fidelity of license plate properties. For example, decreasing a fidelity of a facial property may include removing all facial features from an acquired image. In another example, decreasing a fidelity of a license plate may include obscuring a license plate number.

In an embodiment, the imaging device 320 operable to acquire an image of a subject further includes a digital imaging device operable to acquire an image of a subject of the potential image subject(s) 305. In another embodiment, the imaging device operable to acquire an image of a subject further includes a digital camera operable to acquire an image of a subject. For example, the digital camera may include a lens 322, an imaging element 324, an analog to digital converter 326, and/or a processor 328. In a further embodiment, the imaging device operable to acquire an image of a subject further includes an imaging device operable to capture an image of a subject of the potential image subject(s) 305.

In an embodiment, the imaging device 320 operable to acquire an image of a subject further includes an imaging device operable to receive an image of a subject of the of the potential image subject(s) 305. In another embodiment, the imaging device operable to acquire an image of a subject further includes an imaging device operable to acquire at least one of a digital and/or an analog image of a subject. In a further embodiment, the imaging device operable to acquire an image of a subject further includes an imaging device operable to acquire a digital image of a subject, the digital image including a representation of a dimensional image as a finite set of digital values called picture elements or pixels. In an embodiment, the imaging device operable to acquire an image of a subject further includes an imaging device operable to acquire at least one of a still and/or a streaming image of a subject. In a further embodiment, the imaging device operable to acquire an image of a subject further includes an imaging device operable to acquire an image of at least one of a person, a patron, a shopper, a spectator, a car, a truck, a ship, and/or an aircraft. In another embodiment, the imaging device operable to acquire an image of a subject further includes an imaging device operable to capture an image of a subject and to create a digital signal representative of the acquired image.

In an embodiment, the anonymizer circuit 330 operable to generate an anonymized image that includes a decreased fidelity of a property of the subject of the acquired image in response to an anonymization policy further includes an anonymizer circuit operable to: generate an anonymized image that includes a decreased fidelity of a property of the subject of the acquired image in response to an anonymization policy; and restrict a dissemination of the acquired image. For example, a restriction of a dissemination of the acquired image may include blocking a dissemination of the image where the image does not include the decreased fidelity of a property of a subject of the acquired image in response to an anonymization policy. By way of further example, a restriction of a dissemination of the acquired image may include requiring a special permission before a dissemination of the image where the image does not include the decreased fidelity of a property of a subject of the acquired image in response to an anonymization policy. In another embodiment, the anonymizer circuit operable to generate an anonymized image that includes a decreased fidelity of a property of the subject of the acquired image in response to an anonymization policy further includes an anonymizer circuit operable to generate an anonymized digital image that includes a decreased fidelity of a property of the subject of the acquired image in response to an anonymization policy. In a further embodiment, the anonymizer circuit operable to generate an anonymized image that includes a decreased fidelity of a property of the subject of the acquired image in response to an anonymization policy further includes an anonymizer circuit operable to generate an anonymized image that includes a decreased at least one of accuracy in describing or reporting facts or details, and/or faithfulness in a depiction of a property of the subject of the acquired image in response to an anonymization policy.

In an embodiment, the anonymizer circuit 330 operable to generate an anonymized image that includes a decreased fidelity of a property of the subject of the acquired image in response to an anonymization policy further includes an anonymizer circuit operable to generate an anonymized image that includes at least one of a decreased resolution of a property, an obscuring of a property, a blackout of a property, and/or a removal of a property of the subject of the acquired image in response to an anonymization policy. In a further embodiment, the anonymizer circuit further includes an anonymizer circuit operable to generate an anonymized image that includes a decreased fidelity of an aspect, a property, and/or an attribute of the subject of the acquired image in response to an anonymization policy. In another embodiment, the anonymizer circuit further includes an anonymizer circuit operable to generate an anonymized image that includes a decreased fidelity of at least one of a face, a license plate, a label, and/or a recognizable property associated with the subject of the acquired image in response to an anonymization policy.

In an embodiment, the anonymizer circuit 330 operable to generate an anonymized image that includes a decreased fidelity of a property of the subject of the acquired image in response to an anonymization policy further includes an anonymizer circuit operable to generate an anonymized image that includes a decreased fidelity of a property of the subject of the acquired image in response to an anonymization policy. The anonymization policy being selected from among at least two anonymization policies. In another embodiment, the anonymizer circuit further includes an anonymizer circuit operable to generate an anonymized image that includes a decreased fidelity of a property of the subject of the acquired image in response to an anonymization policy. The anonymization policy being selected in response to at least one of a received human-initiated input, in response to a signal received from a remote device, and/or a selection algorithm. In a further embodiment, the anonymizer circuit further includes an anonymizer circuit operable to generate an anonymized image that includes a decreased fidelity of a property of the subject of the acquired image in response to an anonymization policy, the anonymization policy persisting for a predetermined time.

In an embodiment, the anonymizer circuit 330 operable to generate an anonymized image that includes a decreased fidelity of a property of the subject of the acquired image in response to an anonymization policy further includes an anonymizer circuit operable to generate an anonymized image that includes a decreased fidelity of a property of the subject of the acquired image in response to an anonymization policy. The decreased fidelity including a non-storage, a temporary storage, and/or other rule and/or behavior that results in the property not being savable and/or transmittable. For example, the anonymization policy may block transmittal of recognizable face portions of an image to a remote location and/or to an image storage device. In another embodiment, the anonymizer circuit further includes an anonymizer circuit operable to generate an anonymized image that includes a decreased fidelity of a property of the subject of the acquired image in response to an anonymization policy. The anonymization policy including a set of rules or behaviors that characterize the way properties are handled that results in a reduction of fidelity.

In an embodiment, the display 340 operable to provide a human-perceivable indication of the anonymization policy further includes a display operable to provide a human-perceivable visual indication of the anonymization policy. In another embodiment, the display further includes a display operable to provide a human-perceivable indication of the anonymization policy at least close in time to the acquisition of the image. In a further embodiment, the display further includes a display operable to provide a color-based visual indication of the anonymization policy. In another embodiment, the display further includes a display operable to provide a human-perceivable audio indication of the anonymization policy.

In an embodiment, the system 300 further includes a storage media 350 configurable by data corresponding to the anonymized image. In another embodiment, the storage media configurable by data corresponding to the anonymized image further includes at least one of a quantum, an atomic, a magnetic, and/or an optical storage media configurable by digital data corresponding to the anonymized image.

Figure 4:
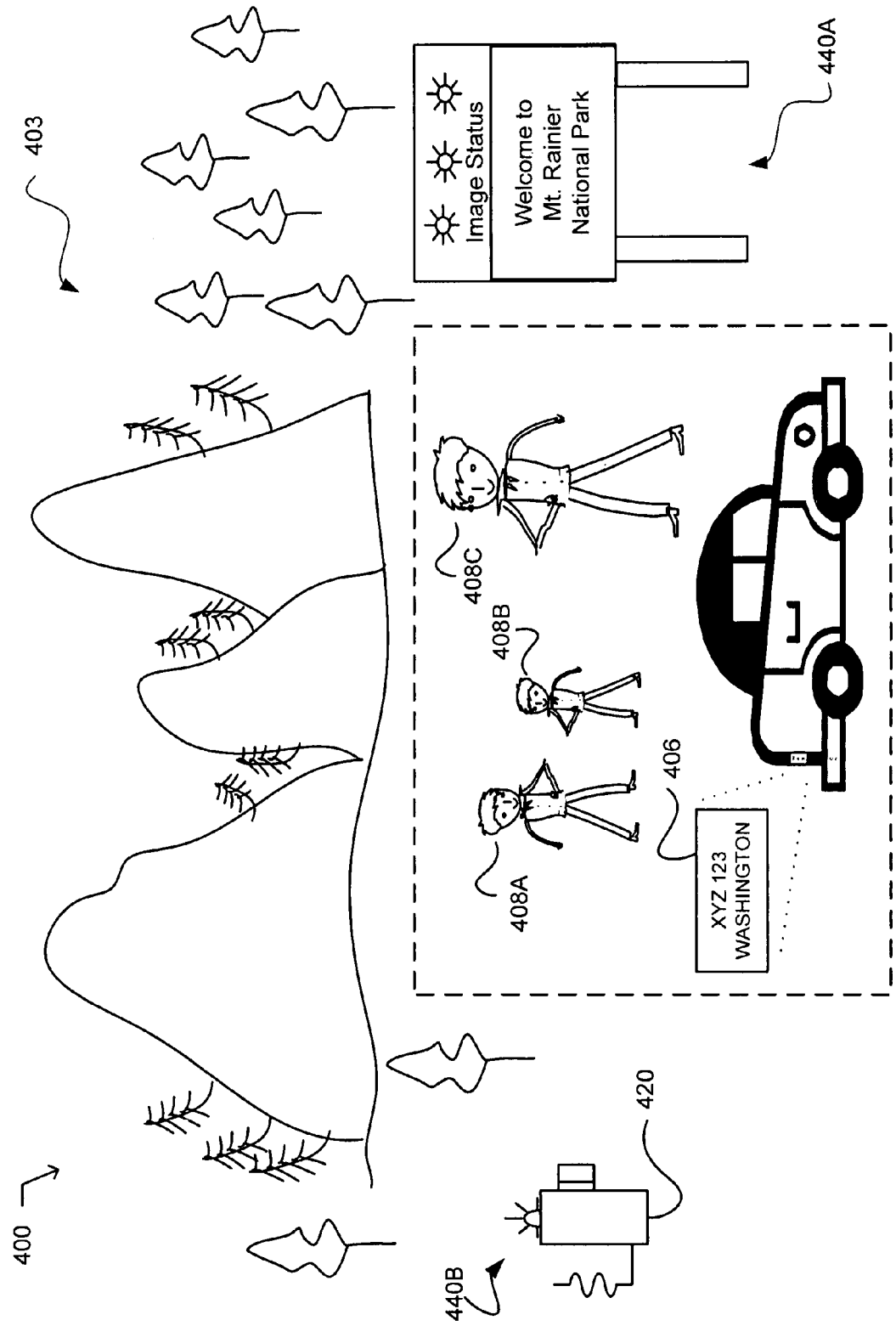
FIG. 4 illustrates an exemplary embodiment of an environment in which embodiments may be implemented.

FIG. 4 illustrates an exemplary embodiment of an environment 400 in which embodiments may be implemented. The environment includes an area 403 (not delineated), illustrated as a portion of Mt. Rainier National Park. The area may include any locale, a portion of which may be depicted in an image captured by an image capture device 420. For example, in an embodiment, the area may include at least one of a single room, a building, a geographic locale, a mall, a park, an intersection, two or more spaced apart intersections, and/or a stadium. The environment also includes at least one subject 406, 408A-C each respectively having at least one common property. In an embodiment, the at least one subject includes at least two human subjects, illustrated as an adult and two children. In another embodiment, the at least one subject includes a car having a license plate with properties that include an identification number and an issuing state, illustrated as a Washington State license plate bearing identification number "XYZ 123." The environment also includes display operable to provide a human-perceivable indication of an anonymization policy in effect for the area. In an embodiment, the display includes a display 440A. In an embodiment, the display 440A may include at least two visual indicator lights, such as the red, yellow, and green lights described in conjunction with the display 340 of FIG. 3. In another embodiment, the display includes a display 440B coupled with the image capture device 420 and perceivable by humans in at least a portion of the area.

Figure 5:
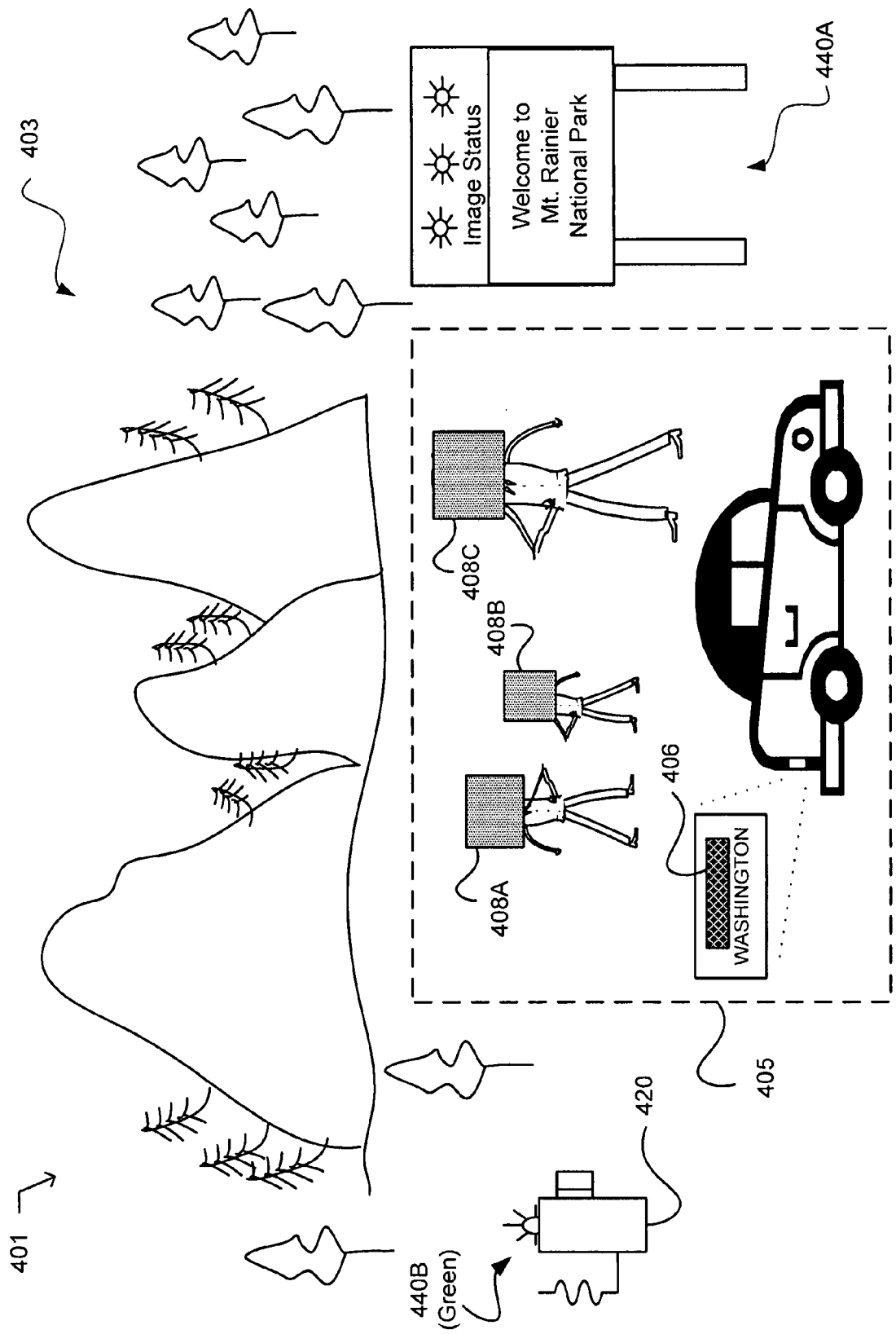
FIG. 5 illustrates an image of the exemplary embodiment of an environment of FIG. 4 with a decreased fidelity of a property of a subject.

FIG. 5 illustrates an image of 401 the exemplary embodiment of an environment 400 of FIG. 4 with a decreased fidelity of a property of a subject. In an embodiment, the decreased fidelity may be implemented and/or practiced using systems, devices, apparatus, and/or methods disclosed herein. For example, the system 300 described in conjunction with FIG. 3 may be used to implement and/or practice the decreased fidelity of a property of a subject depicted in an image 405. For example, FIG. 5 illustrates an embodiment where the display 440B of the image capture device 420 indicating a "Green" color-based visual indication of the anonymization policy, corresponding to decreasing a fidelity of facial properties and license plate properties depicted in acquired images to be indistinguishable. The decreased fidelity of the illustrated embodiment includes a decreased fidelity of facial properties of human subjects 408A, 408B, and 408C implemented by obscuring portions of their faces and/or heads. The faces and/or heads of human subjects may be located in the image using techniques known to those skilled in the art, including artificial intelligence, and/or facial recognition techniques. FIG. 5 also illustrates a decreased fidelity of the identification number "XYZ 123" property of a license plate of a car subject 406 in the image that was implemented by an obscuring portion over the license identification number. In an embodiment, the image 401 may be used to study human and/or vehicle traffic patterns in the area 403 while preserving the anonymity of human subjects and/or registered owners of vehicles.

In another embodiment, instead of decreasing a fidelity of a property of a subject by obscuring or blacking out the property, a fidelity of a property may decreased by extracting information corresponding to the property from a raw image acquired by the imaging device 320 of FIG. 3, and then saving only the image post information extraction.

Figure 6:
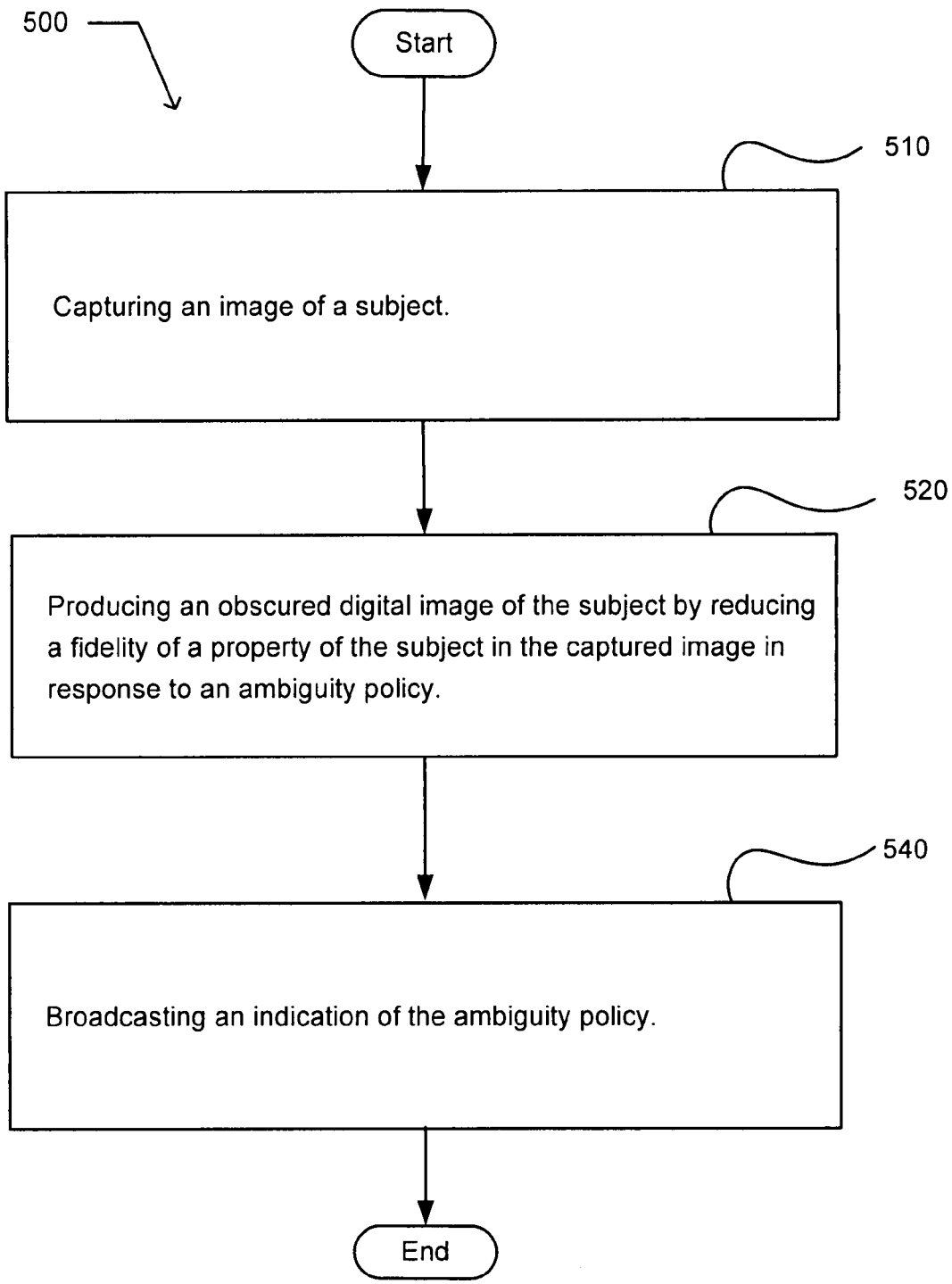
FIG. 6 illustrates an exemplary embodiment of an operational flow.

FIG. 6 illustrates an exemplary embodiment of an operational flow 500. After a start operation, the operational flow moves to a depiction operation 510. The depiction operation captures an image of a subject. A masking operation 520 produces an obscured digital image of the subject by reducing a fidelity of a property of the subject in the captured image in response to an ambiguity policy. A dissemination operation 540 broadcasts an indication of the ambiguity policy. The operational flow then moves to an end operation.

Figure 7:
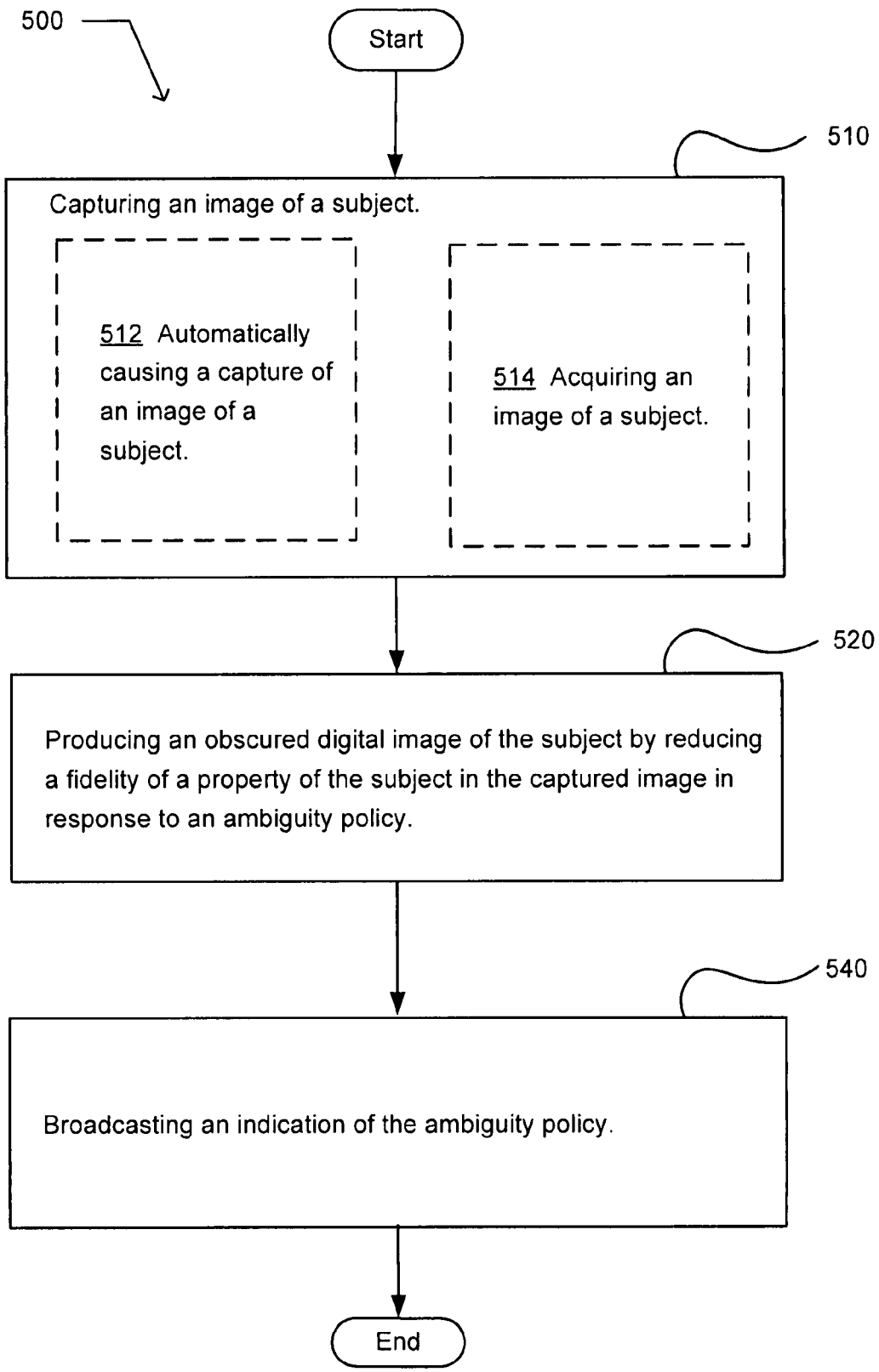
FIG. 7 illustrates an alternative embodiment of the exemplary operational flow of FIG. 6.

FIG. 7 illustrates an alternative embodiment of the exemplary operational flow 500. The depiction operation 510 may include at least one additional operation. The at least one additional operation may include an operation 512 and/or an operation 514. The operation 512 automatically causes a capture of an image of a subject. The automatically causing may include causing a capture of an image of a subject in response to at least one of time, movement, and/or event. For example, the capture of an image may be caused once each minute. By way of further example, the capture of an image may be caused in response to a detected movement of a subject in a monitored area, such a detected car movement. In another example, the capture of an image may be caused in response to a detected audible event in a monitored area, such as a car collision. The operation 514 acquires an image of a subject.

Figure 8:
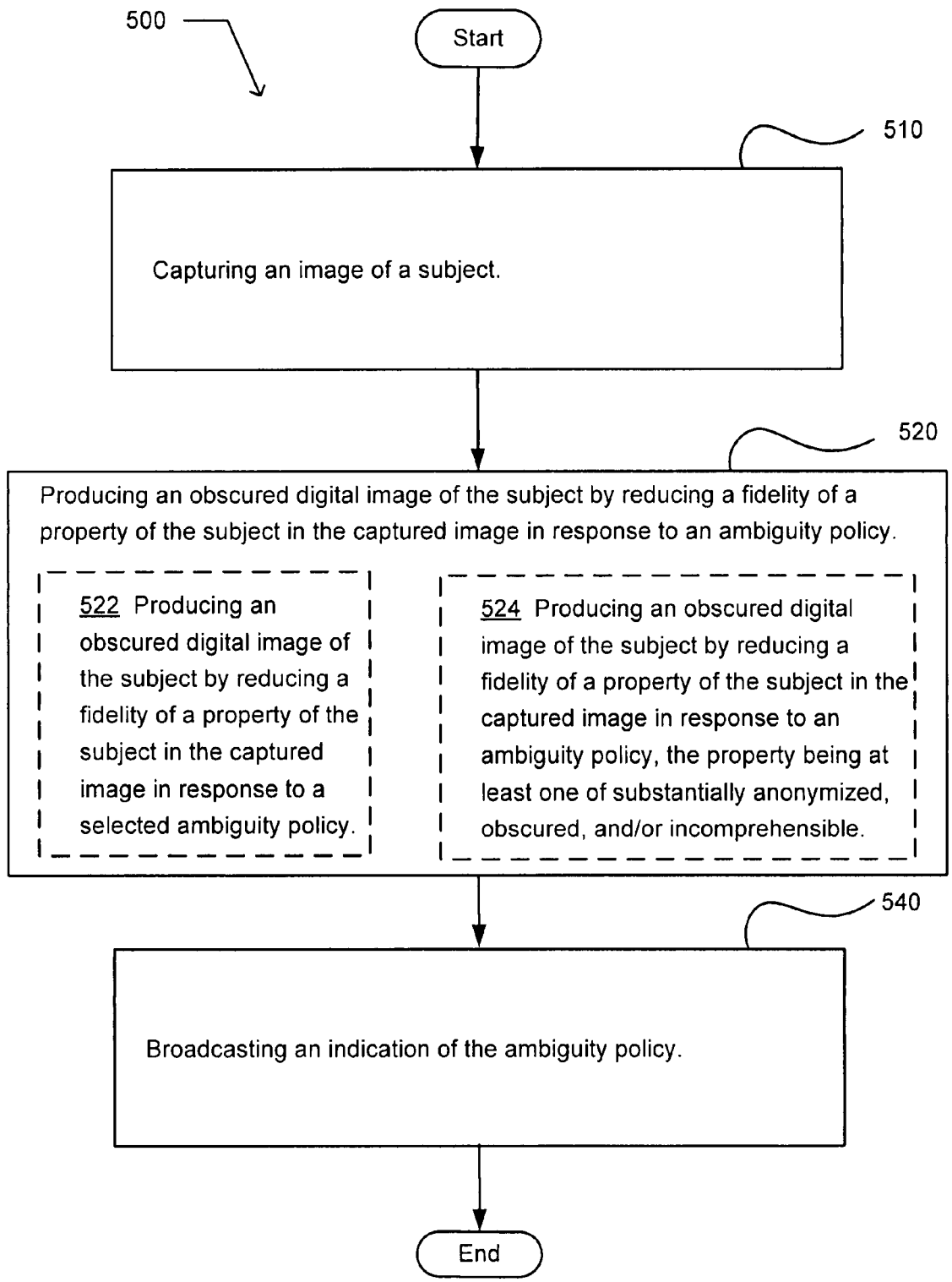
FIG. 8 illustrates another alternative embodiment of the exemplary operational flow of FIG. 6.

FIG. 8 illustrates another alternative embodiment of the exemplary operational flow 500. The masking operation 520 may include at least one additional operation. The at least one additional operation may include an operation 522 and/or an operation 524. The operation 522 produces an obscured digital image of the subject by reducing a fidelity of a property of the subject in the captured image in response to a selected ambiguity policy. The operation 524 produces an obscured digital image of the subject by reducing a fidelity of a property of the subject in the captured image in response to an ambiguity policy. The property being at least one of substantially anonymized, obscured, and/or incomprehensible.

Figure 9:
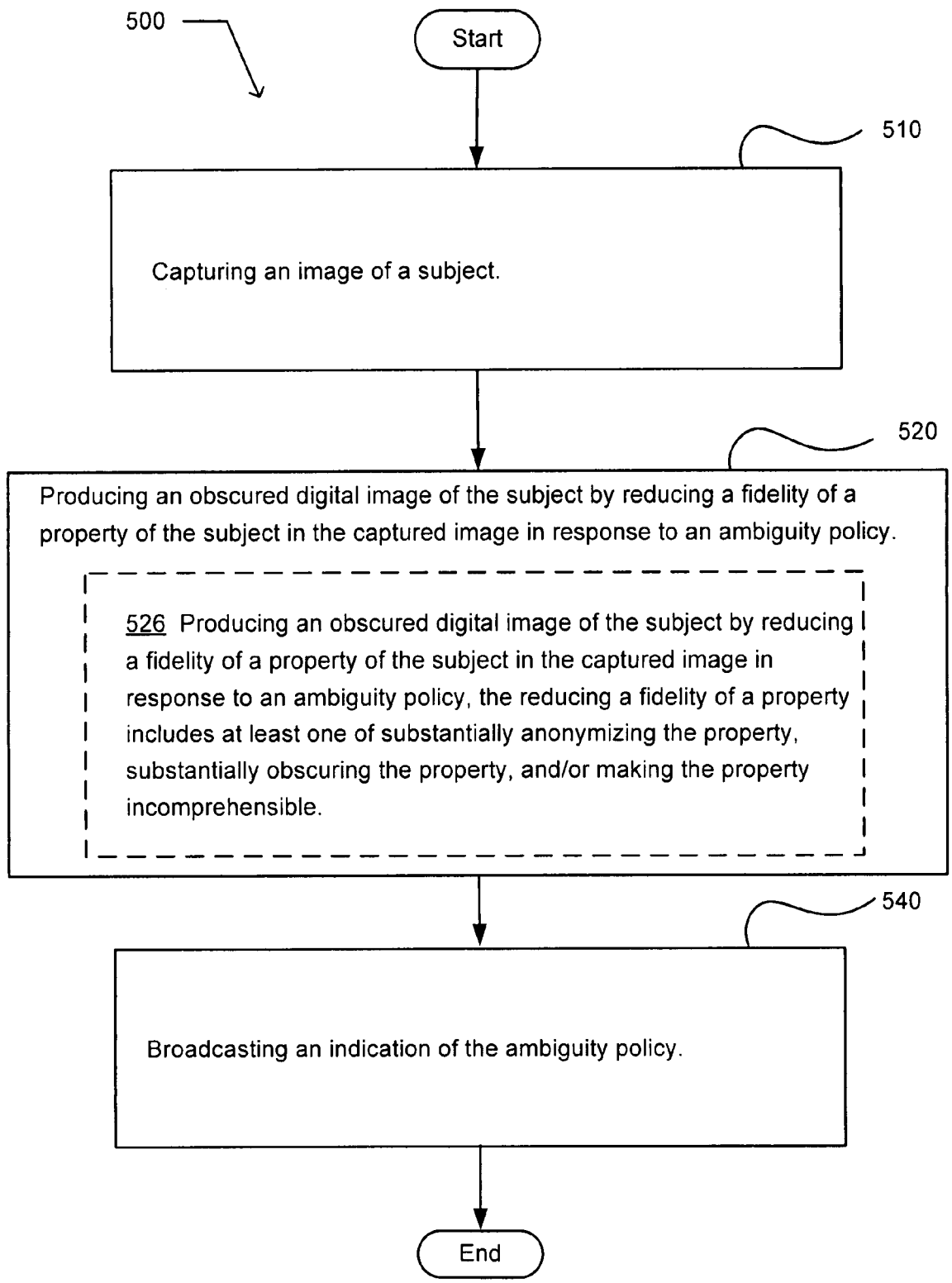
FIG. 9 illustrates a further alternative embodiment of the exemplary operational flow of FIG. 6.

FIG. 9 illustrates a further alternative embodiment of the exemplary operational flow 500. The masking operation 520 may include at least one additional operation, such as an operation 526. The operation 526 produces an obscured digital image of the subject by reducing a fidelity of a property of the subject in the captured image in response to an ambiguity policy. The reducing a fidelity of a property includes at least one of substantially anonymizing the property, substantially obscuring the property, and/or making the property incomprehensible.

Figure 10:
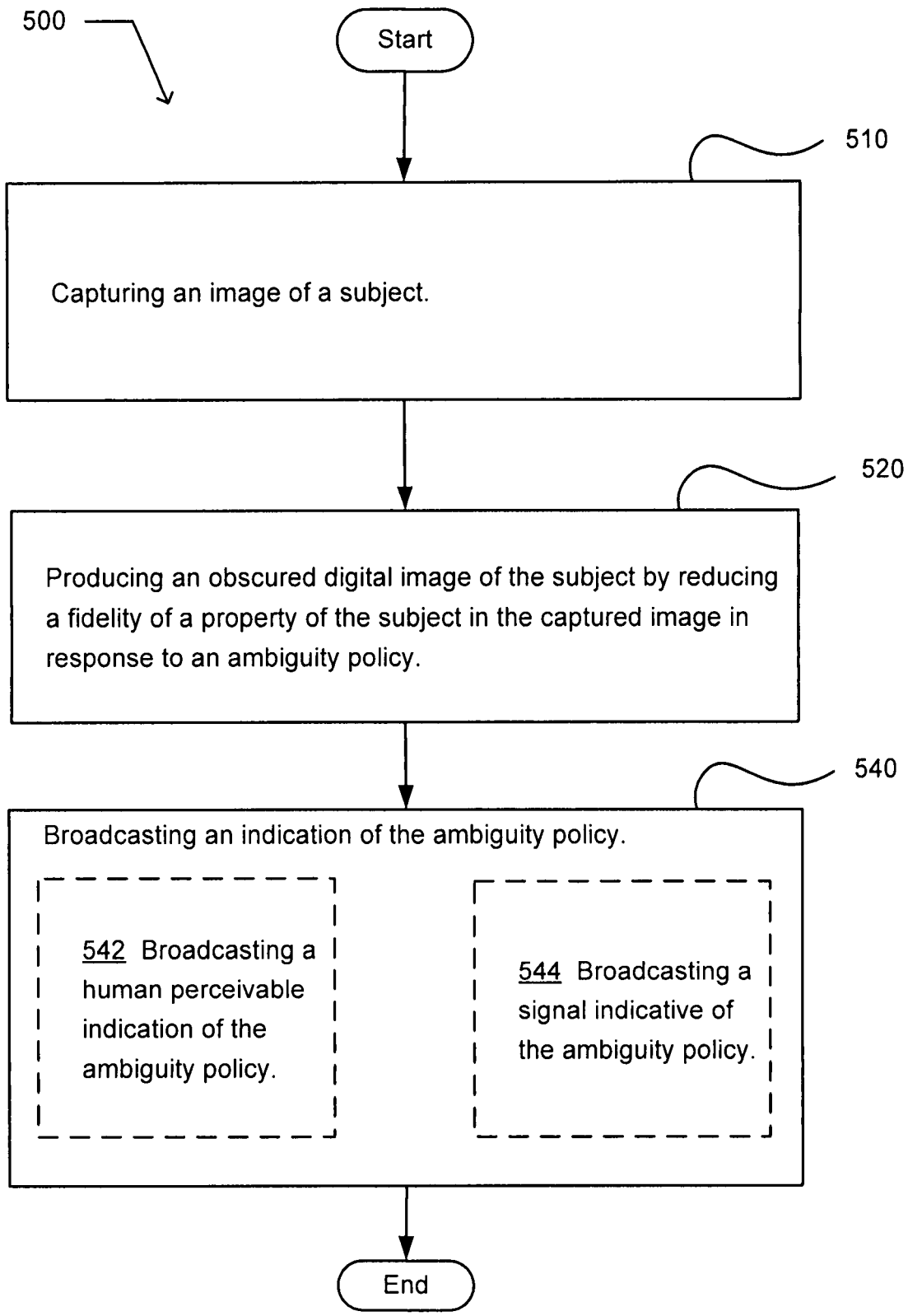
FIG. 10 illustrates an alternative embodiment of the exemplary operational flow of FIG. 6.

FIG. 10 illustrates an alternative embodiment of the exemplary operational flow 500. The dissemination operation 540 may include at least one additional operation. The at least one additional operation may include an operation 542 and/or an operation 544. The operation 542 broadcasts a human perceivable indication of the ambiguity policy. The operation 544 broadcasts a signal indicative of the ambiguity policy.

Figure 11:
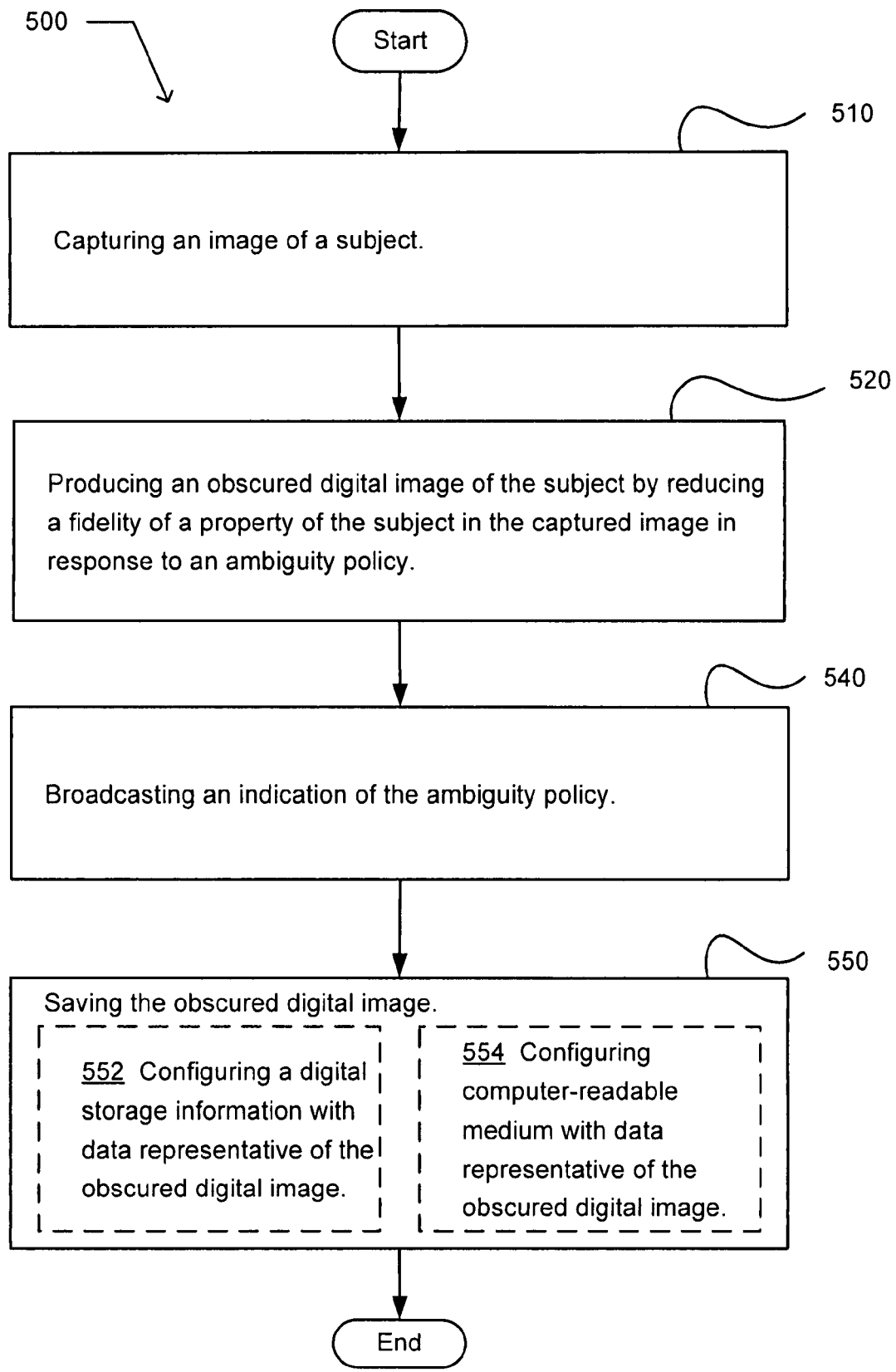
FIG. 11 illustrates another alternative embodiment of the exemplary operational flow of FIG. 6.

FIG. 11 illustrates another alternative embodiment of the exemplary operational flow 500. The operational flow may include at least one additional operation, such as an operation 550. The operation 550 saves the obscured digital image. The operation 550 may include an operation 552 and/or an operation 554. The operation 552 configures a digital storage information with data representative of the obscured digital image. The operation 554 configures a computer-readable medium with data representative of the obscured digital image.

Figure 12:
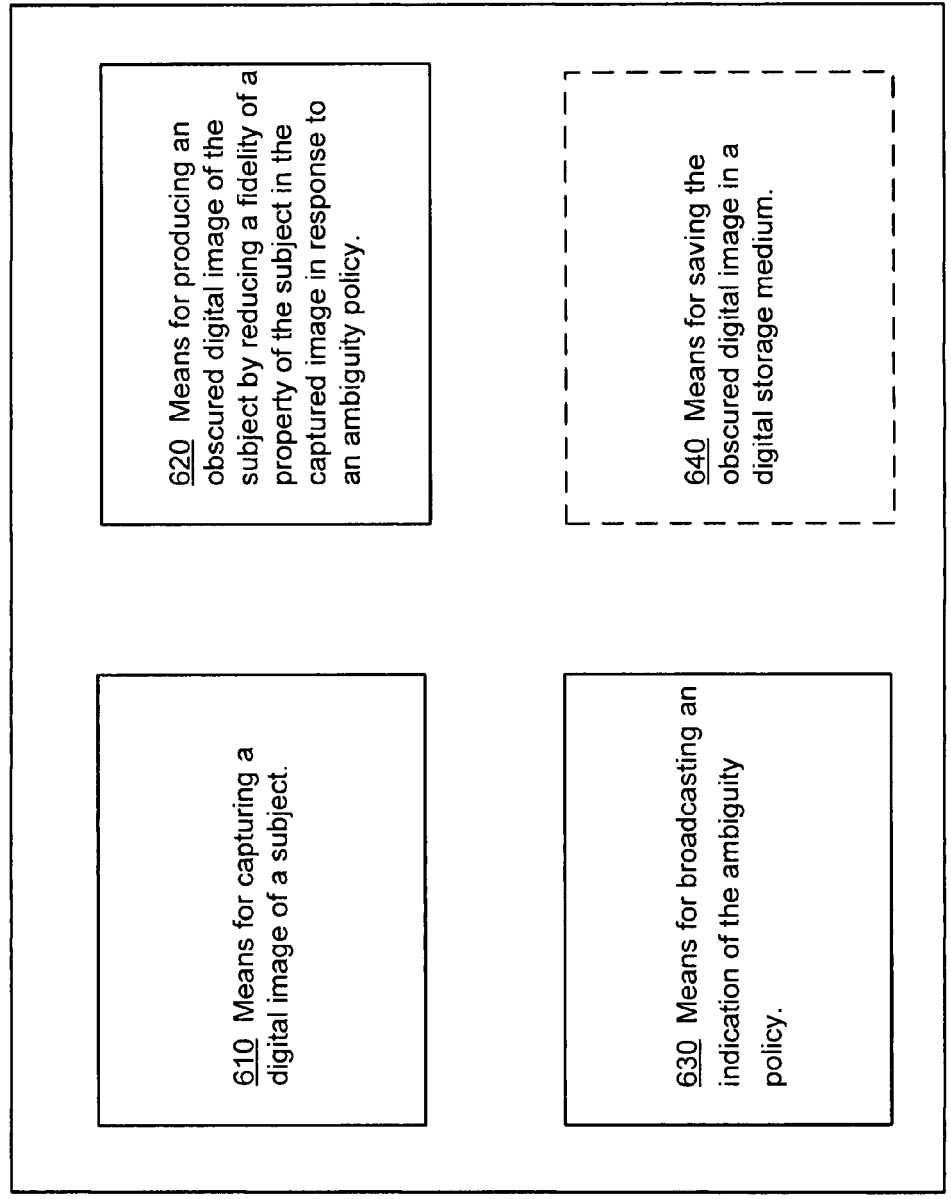
FIG. 12 illustrates an exemplary embodiment of an device.

FIG. 12 illustrates an exemplary embodiment of a device 600. The device includes means 610 for capturing a digital image of a subject. The device further includes means 620 for producing an obscured digital image of the subject by reducing a fidelity of a property of the subject in the captured image in response to an ambiguity policy. The device also includes means 630 for broadcasting an indication of the ambiguity policy. In an alternative embodiment, the device includes means 640 for saving the obscured digital image in a digital storage medium.

FIG. 13 illustrates an exemplary embodiment of a computer program product 700. The computer program product includes a computer-readable signal bearing medium 710 bearing program instructions 720. The program instructions are operable to perform a process in a computing device. The process includes receiving an image of a subject. The process further includes reducing a fidelity of a property of the subject in the captured image in response to an ambiguity policy. The process also includes broadcasting an indication of the ambiguity policy.

In an alternative embodiment, the process of the program instruction 720 further includes saving data representative of the received image of a subject having the reduced fidelity of the property. In a further embodiment, the computer-readable signal bearing medium 710 further includes a computer storage medium 712. In another embodiment, the computer-readable signal bearing medium further includes a communications medium 714.

FIG. 14 illustrates an exemplary embodiment of a system 800. The system includes an imaging device operable to capture an image of a subject 805 in an area 803. An embodiment of the imaging device is illustrated as a camera 820. The system also includes an alteration circuit 830 operable to generate an anonymized image(s) 844 by obscuring a property of the subject in the captured image in response to a privacy policy 842. The system further includes a computer-readable storage media 840 configurable by the anonymized image. The system additionally includes a display operable to provide a human-perceivable indication of the privacy policy. An embodiment of the display is illustrated as a screen 850.

Figure 15:
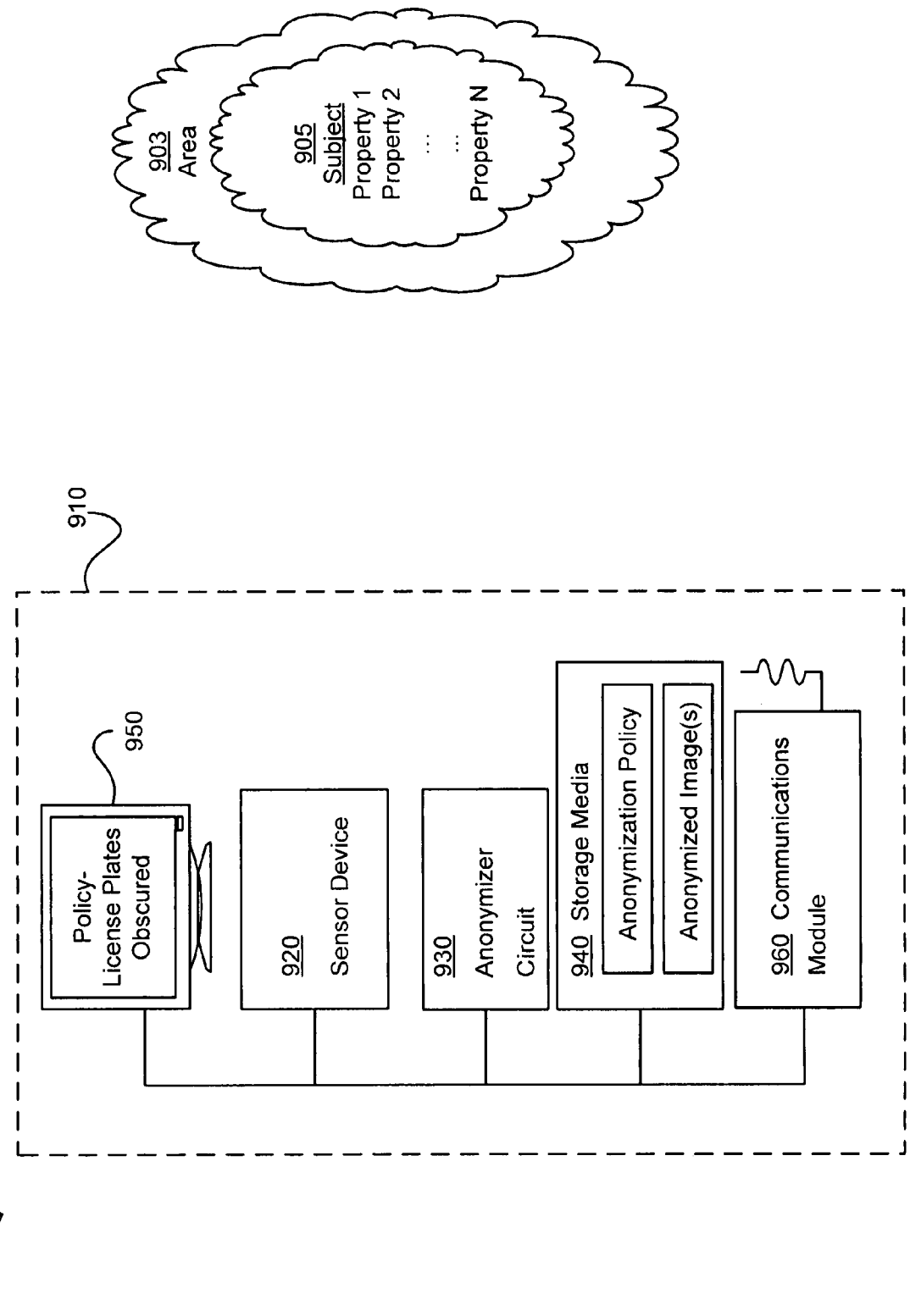
FIG. 15 illustrates an exemplary embodiment of a system.

FIG. 15 illustrates an exemplary embodiment of a system 900. The system includes a sensor device 920 operable to capture from a subject 905 information corresponding to the subject. For example, in an embodiment, the information is captured by acquiring imaging information directly from the subject, such as with a camera acquiring a visible light, an infrared light, and/or another portion of the light spectrum and/or radio spectrum. In another embodiment, the information corresponding to a subject may be captured by acquiring information from radio frequencies passing through or reflecting from the subject, such as x-ray and/or computer aided tomography. In a further embodiment, the information corresponding to a subject may be captured by a radiation sensor, and/or a chemical sniffer.

The system 900 also includes an anonymizer circuit 930 operable to generate an anonymized image that includes a decreased fidelity of a property of the subject 905 of the captured information in response to an anonymization policy. The anonymized image may include a visual image of the subject, a graphical image of the subject, and/or an image of the subject embodied in data. In an embodiment, the anonymization policy may be a single policy implementable by the anonymization circuit. In another embodiment, the anonymization policy may include an anonymization policy selected from at least two anonymization policies. The selection may be in response to a human input and/or a machine input. The anonymizer circuit is also operable to inform a display device 950 of the anonymization policy. The system further includes the display device operable to broadcast an indication of the anonymization policy perceivable by a human at least nearby the subject. The indication may be broadcast before, during, and/or after the capture of information corresponding to a subject.

In an embodiment, the sensor device 920 operable to capture from a subject information corresponding to the subject further includes a sensor device operable to capture at least one of optical, acoustical, x-ray, radiation, chemical, and/or ultrasound information corresponding to a subject from the subject. In another embodiment, the sensor device further includes a sensor device operable to capture information corresponding to at least one of a human subject and/or object subject. In a further embodiment, the sensor device further includes a sensor device operable to capture information corresponding to a subject from a signal emitted by and/or reflected from the subject. In another embodiment, the sensor device further includes a sensor device operable to capture information corresponding to a subject from at least one of a light, an electromagnetic, and/or an acoustical spectrum signal.

In an embodiment, the system 900 further includes a non-volatile computer storage media 940 configurable by data corresponding to the anonymized image.

Figure 16:
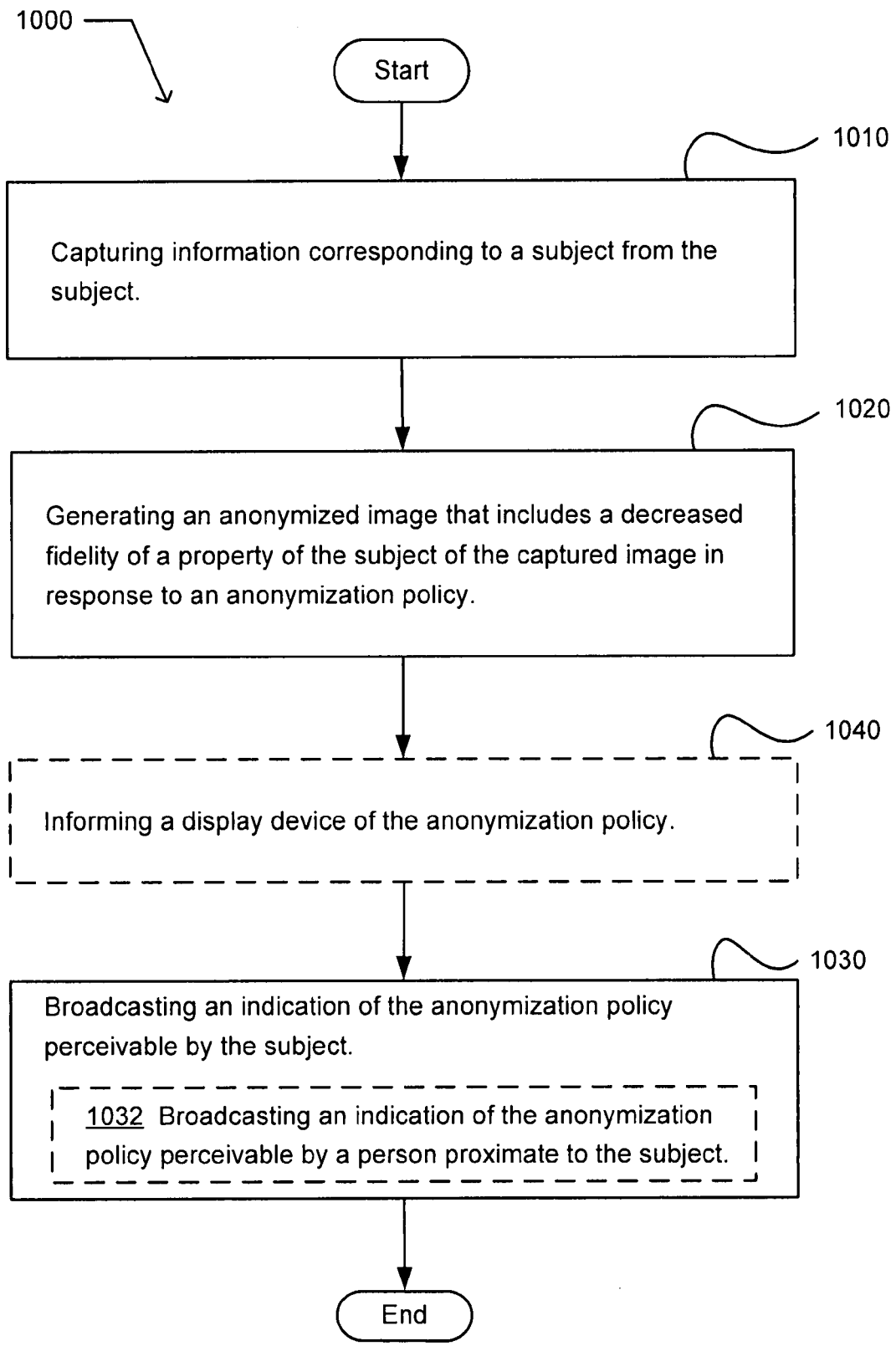
FIG. 16 illustrates an exemplary embodiment of an operational flow.

FIG. 16 illustrates an exemplary embodiment of an operational flow 1000. After a start operation, the flow moves to an acquiring operation 1010. The acquiring operation captures information corresponding to a subject from the subject. An obscuring operation 1020 generates an anonymized image that includes a decreased fidelity of a property of the subject of the captured information in response to an anonymization policy. A communication operation 1030 broadcasts an indication of the anonymization policy perceivable by the subject. In an embodiment, the indication of the anonymization is broadcast from a display device, such as the display device 340 described in conjunction with FIG. 3, and/or the display device 800 described in conjunction with FIG. 14.

In an embodiment, the communication operation 1030 broadcasting an indication of the anonymization policy perceivable by the subject further includes broadcasting an indication of the anonymization policy perceivable by a person proximate to the subject 1032. In another embodiment, the operational flow 1000 further includes a transmission operation 1040 informing a display device of the anonymization policy.

Figure 17:
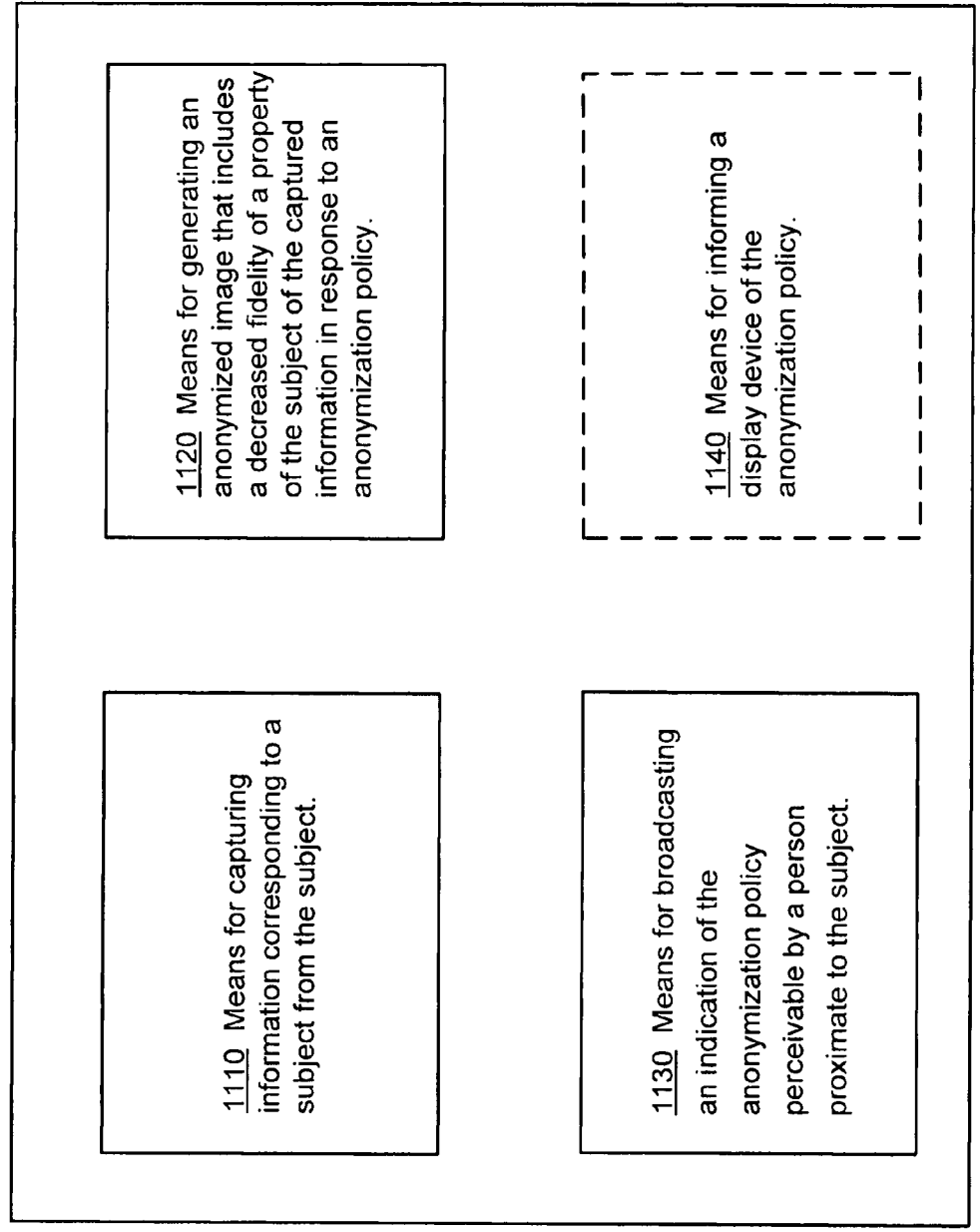
FIG. 17 illustrates an exemplary embodiment of a device.

FIG. 17 illustrates an exemplary embodiment of a device 1100. The device includes means 1110 for capturing information corresponding to a subject from the subject. The device also includes means 1120 for generating an anonymized image that includes a decreased fidelity of a property of the subject of the captured information in response to an anonymization policy. The device further includes means 1130 for broadcasting an indication of the anonymization policy perceivable by a person proximate to the subject. In another embodiment, the device further includes means 1140 for informing a display device of the anonymization policy.

Figure 18:
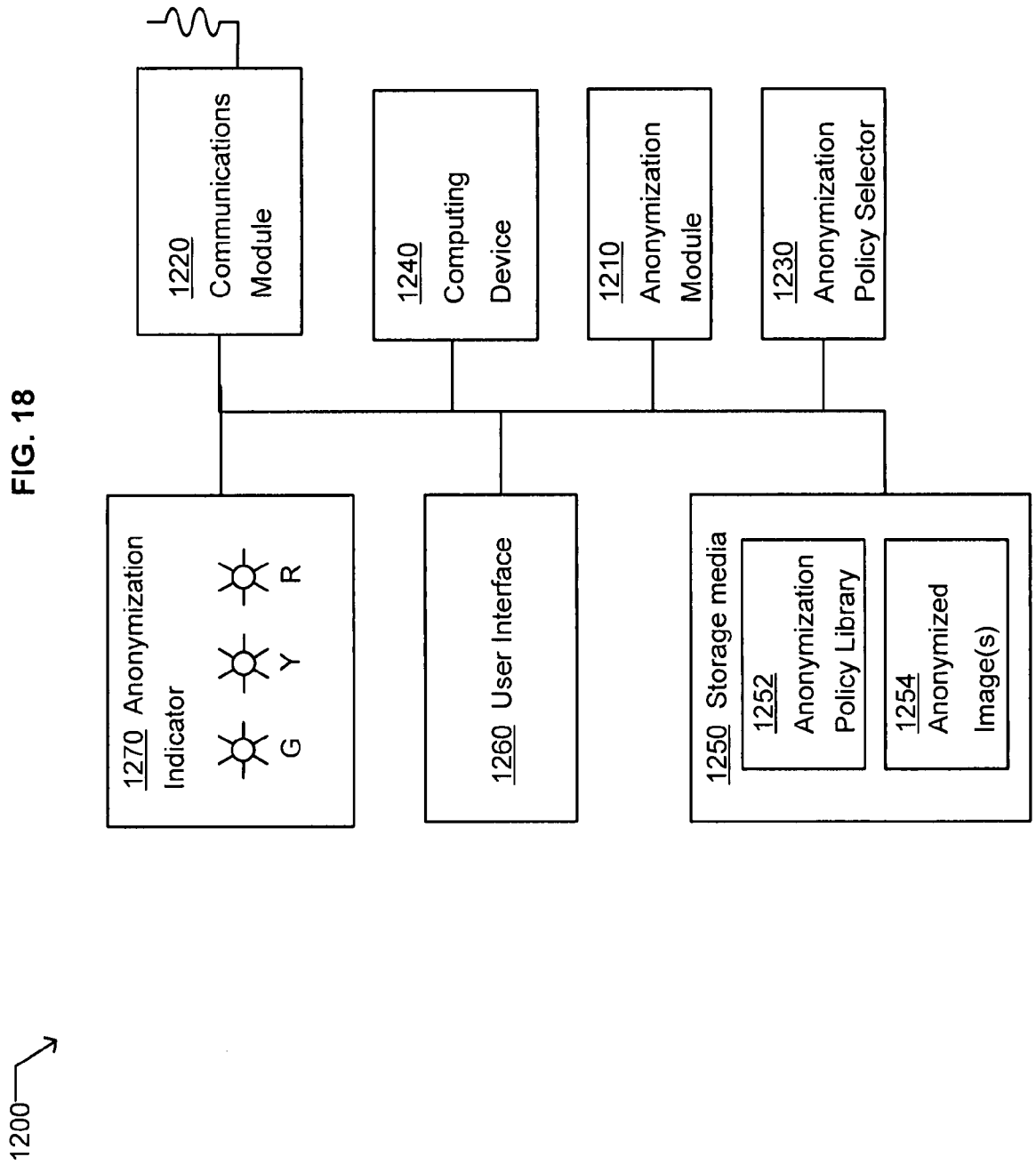
FIG. 18 illustrates an exemplary embodiment of a device.

FIG. 18 illustrates an exemplary embodiment of a device 1200. The device includes an anonymization module 1210 operable to produce in response to an anonymization policy an anonymized image by causing a reduction in fidelity of a feature of a subject depicted in a received image. The device also includes a communications module 1220 operable to send a signal indicative of the anonymization policy.

In an embodiment, the anonymization module 1210 further includes an anonymization module operable to produce in response to an anonymization policy an anonymized image by causing a reduction in fidelity of at least one of a distinguishing part, aspect, and/or characteristic of a subject depicted in a received image. In another embodiment, the anonymization module further includes an anonymization module operable to produce, in response to an anonymization policy, an anonymized image by causing a reduction in fidelity of at least one of a person, face, article, license plate, and/or label associated with a subject depicted in a received image. In a further embodiment, the anonymization module further includes an anonymization module operable to produce, in response to an anonymization policy, an anonymized image by causing, a reduction in fidelity of a feature of a subject depicted in a received digital and/or analog image.

In an embodiment, the anonymization module 1210 further includes an anonymization module operable to produce in response to an anonymization policy an anonymized image by causing a reduction in fidelity of a feature of a subject represented in a received digital signal. In a further embodiment, the anonymization module further includes an anonymization module operable to produce an anonymized image by at least one of initiating, triggering, instigating, bringing about, and/or affecting a reduction in fidelity of a feature of a subject depicted in a received image in response to an anonymization policy.

In an embodiment, the communications module 1220 operable to send a signal indicative of the anonymization policy further includes a communications module operable to send a signal indicative of the anonymization policy and receivable by a local image capture device. In another embodiment, the communications module further includes a communications module operable to send a signal indicative of the anonymization policy and receivable by a remotely located image capture device. In a further embodiment, the communications module further includes a communications module operable to send a signal indicative of the anonymization policy and receivable by an anonymization indicator located at a location physically removed from the anonymization module.

In an embodiment, the communications module 1220 further includes a communications module operable to send a signal indicative of the anonymization policy and receivable by a remotely located anonymization indicator that is coupled with an image capture system operable to capture and transmit the image. In another embodiment, the communications module further includes a communications module operable to send a signal indicative of the anonymization policy and to receive the image depicting a subject. In another embodiment, the device 1200 further includes an anonymization policy selector module 1230 operable to designate the anonymization policy.

In an embodiment, the device 1200 further includes an anonymization policy selector module 1230 operable to choose the anonymization policy from at least two anonymization policies. In another embodiment, the an anonymization policy selector module operable to choose the anonymization policy from at least two anonymization policies further includes a selector module operable to implement the anonymization policy from at least two anonymization policies. In a further embodiment, the an anonymization policy selector module operable to choose the anonymization policy from at least two anonymization policies further includes a selector module operable to designate the anonymization policy in response to at least one of a received human input, a selection received from an anonymization controller, and/or a selection algorithm. In an embodiment, the anonymization policy selector module operable to choose the anonymization policy from at least two anonymization policies further includes a selector module operable to choose the anonymization policy from a library of at least two anonymization policies. In another embodiment, the anonymization policy selector module operable to choose the anonymization policy from at least two anonymization policies further includes a selector module operable to choose the anonymization policy from at least two anonymization policies, the selected policy persisting as the selected policy for a time.

In an embodiment, the anonymization module 1210 further includes the anonymization policy selector module 1230 operable to designate the anonymization policy. In another embodiment, the anonymization module further includes an anonymization policy selector module operable to choose the anonymization policy from at least two anonymization policies.

In an embodiment, the device 1200 further includes a digital storage media 1250 configurable by the anonymized image. In another embodiment, the device further includes a computing device 1240. In a further embodiment, the device further includes a computing device that includes the anonymization module.

In use, an embodiment of the device 1200 may be operationally combined with an image capture device, such as the image capture device 420 and a display, such as the display 440A and/or the display 440B as described in conjunction with the exemplary environment 400 of FIG. 4. The device and the display 440A and/or the display 440B may be both present within the area 403. Alternatively, the device 1200 may be remote to the area. In use, the communications module 1220 of the device 1200 sends a signal indicative of an anonymization policy to the display 440A and/or the display 440B. At least one of the anonymization indicator 1270, the display 440A, and/or the display 440B displays an indication of an anonymization policy in effect for the area in a manner that is perceivable by humans in the area. This display provides persons in the area with information about what degree of anonymization if any will be applied to pictures taken of them and/or their property by an image capture device, such as the image capture device 420. In an embodiment, the anonymization may apply only to pictures acquired by the image capture device, and/or the anonymization policy may apply to pictures acquired by the image capture device and personal cameras used by others in the area. In response to such information about the anonymization policy in effect, persons may make a decision whether to remain in the area or not, and/or whether to allow their cars to remain in the area or not. The anonymization module 1210 produces in response to the anonymization policy an anonymized image by causing a reduction in fidelity of a feature of a subject depicted in a received image from the device. Any persistent image saved on the device is also anonymized. The anonymized image may be persistently stored in digital storage media 1250 configurable by the anonymized image.

Figure 19:
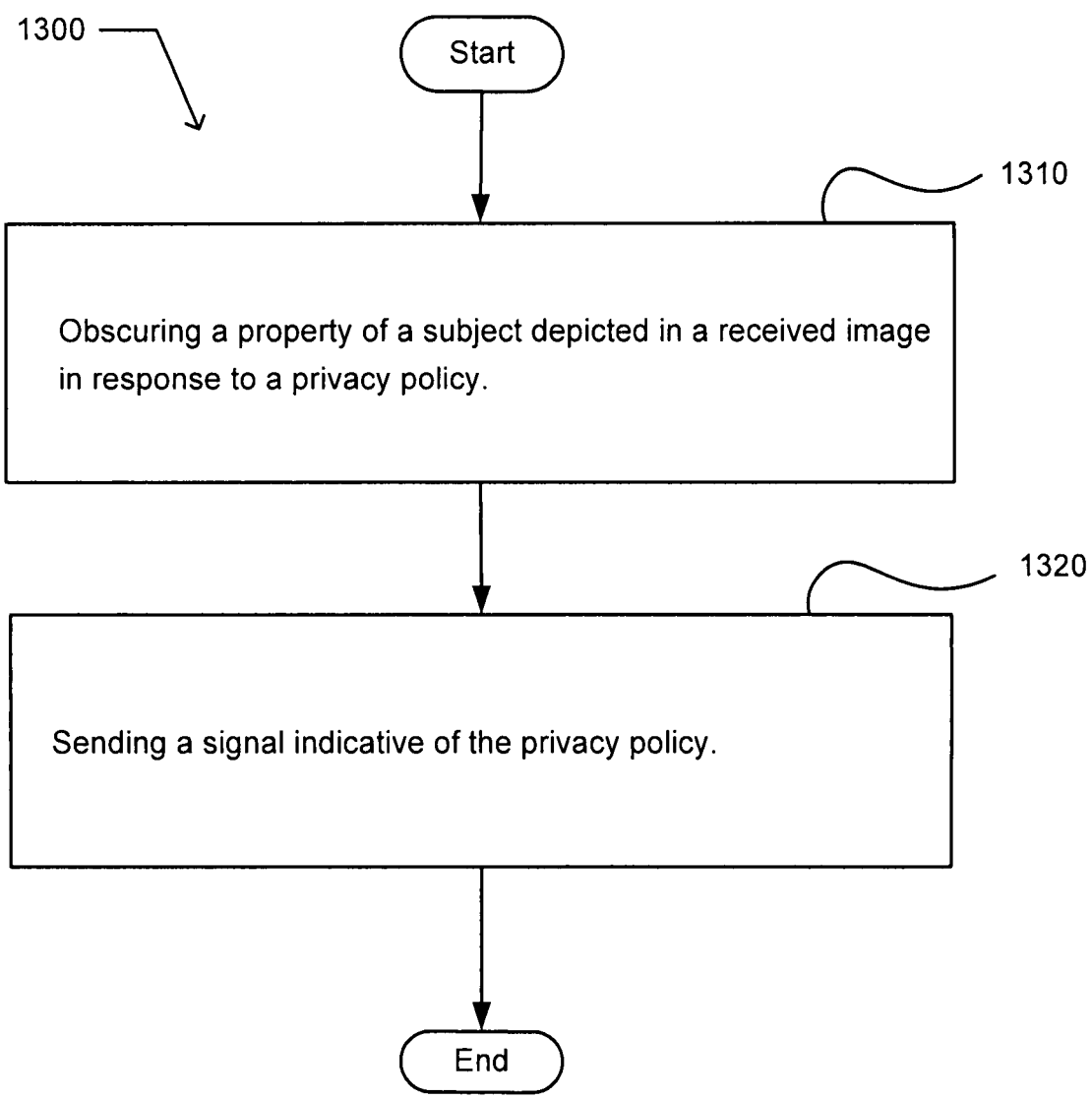
FIG. 19 illustrates an exemplary embodiment of an operational flow.

FIG. 19 illustrates an exemplary embodiment of an operational flow 1300. After a start operation, the operational flow moves to an ambiguation operation 1310. The ambiguation operation obscures a property of a subject depicted in a received image in response to a privacy policy. A communication operation 1320 sends a signal indicative of the privacy policy. The operational flow then moves to an end operation.

Figure 20:
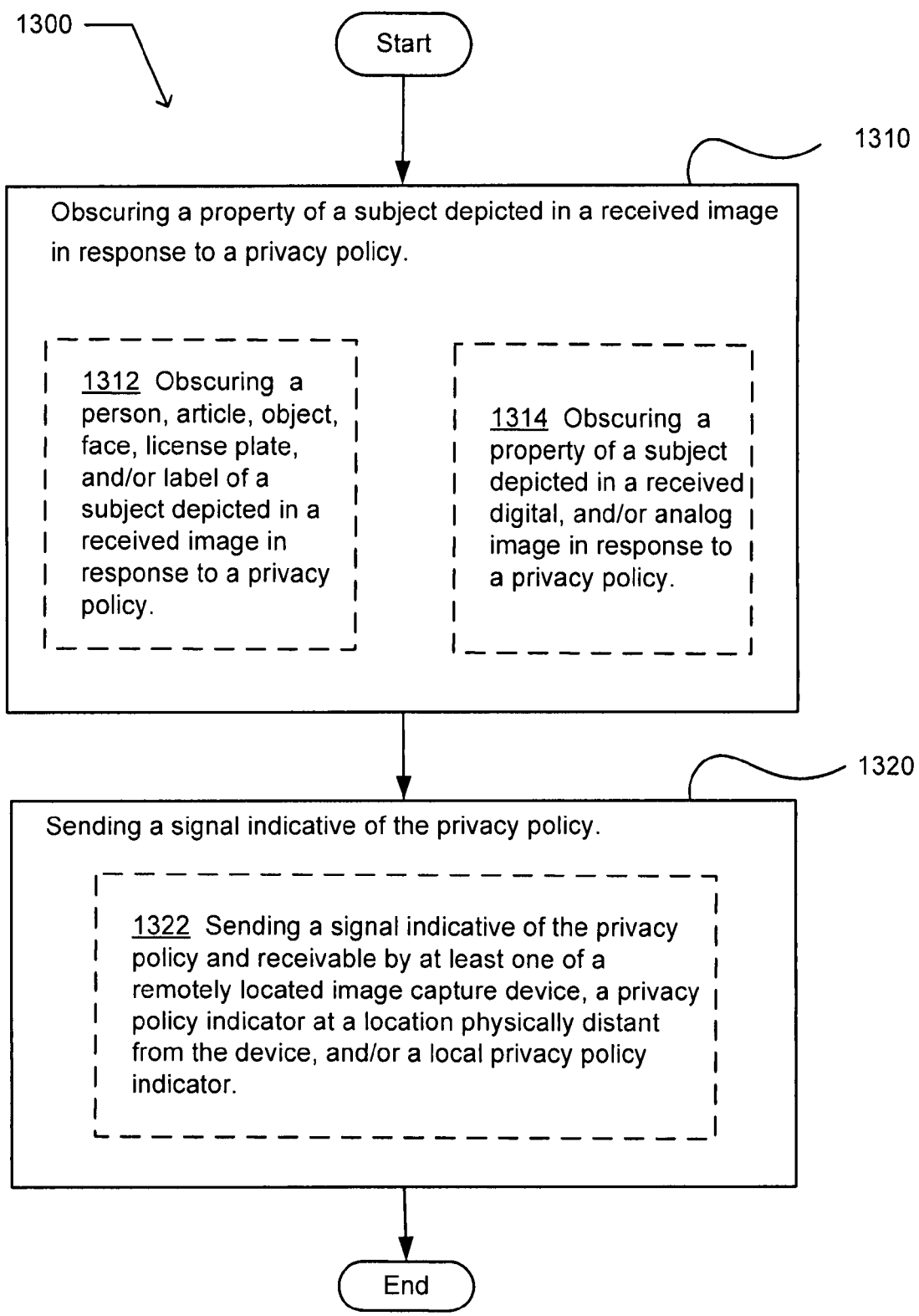
FIG. 20 illustrates an alternative embodiment of the exemplary operational flow of FIG. 19.

FIG. 20 illustrates an alternative embodiment of the exemplary operational flow 1300 of FIG. 19. The ambiguation operation 1310 may include at least one additional operation. The at least one additional operation may include an operation 1312 and/or an operation 1314. The operation 1312 obscures a person, article, object, face, license plate, and/or label of a subject depicted in a received image in response to a privacy policy. The operation 1314 obscures a property of a subject depicted in a received digital, and/or analog image in response to a privacy policy. The communication operation 1320 may include at least one additional operation, such as the operation 1322. The operation 1322 sends a signal indicative of the privacy policy and is receivable by at least one of a remotely located image capture device, a privacy policy indicator at a location physically distant from the device, and/or a local privacy policy indicator.

Figure 21:
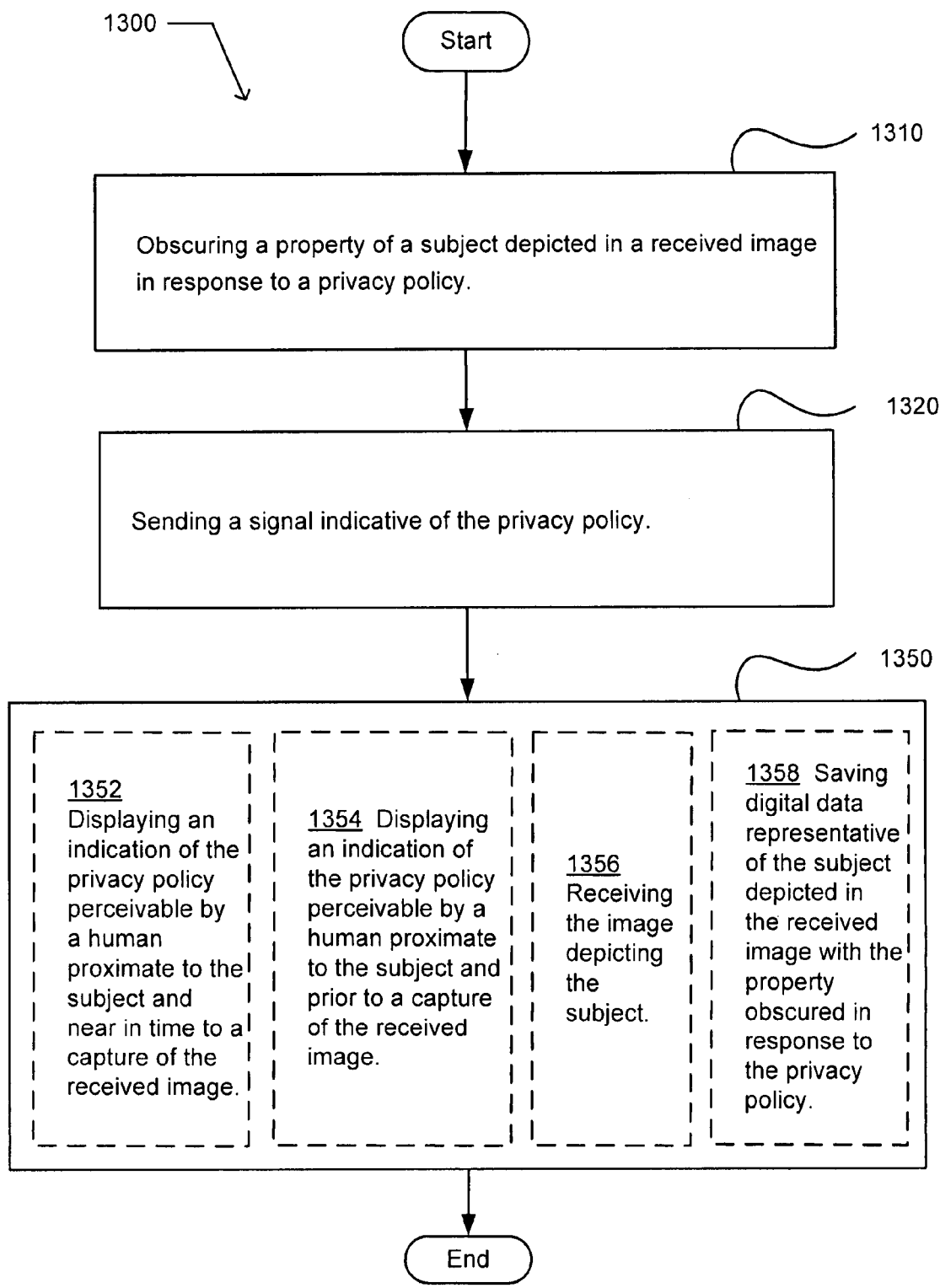
FIG. 21 illustrates an alternative embodiment of the exemplary operational flow of FIG. 19.

FIG. 21 illustrates an alternative embodiment of the exemplary operational flow 1300 of FIG. 19. The operational flow may include at least one additional operation 1350. The at least one additional operation may include an operation 1352, an operation 1354, an operation 1356, and/or an operation 1358. The operation 1352 displays an indication of the privacy policy perceivable by a human proximate to the subject and near in time to a capture of the received image. The operation 1354 displays an indication of the privacy policy perceivable by a human proximate to the subject and prior to a capture of the received image. The operation 1356 receives the image depicting the subject. The operation 1358 saves digital data representative of the received image having an aspect of the subject obscured in response to the privacy policy.

Figure 22:
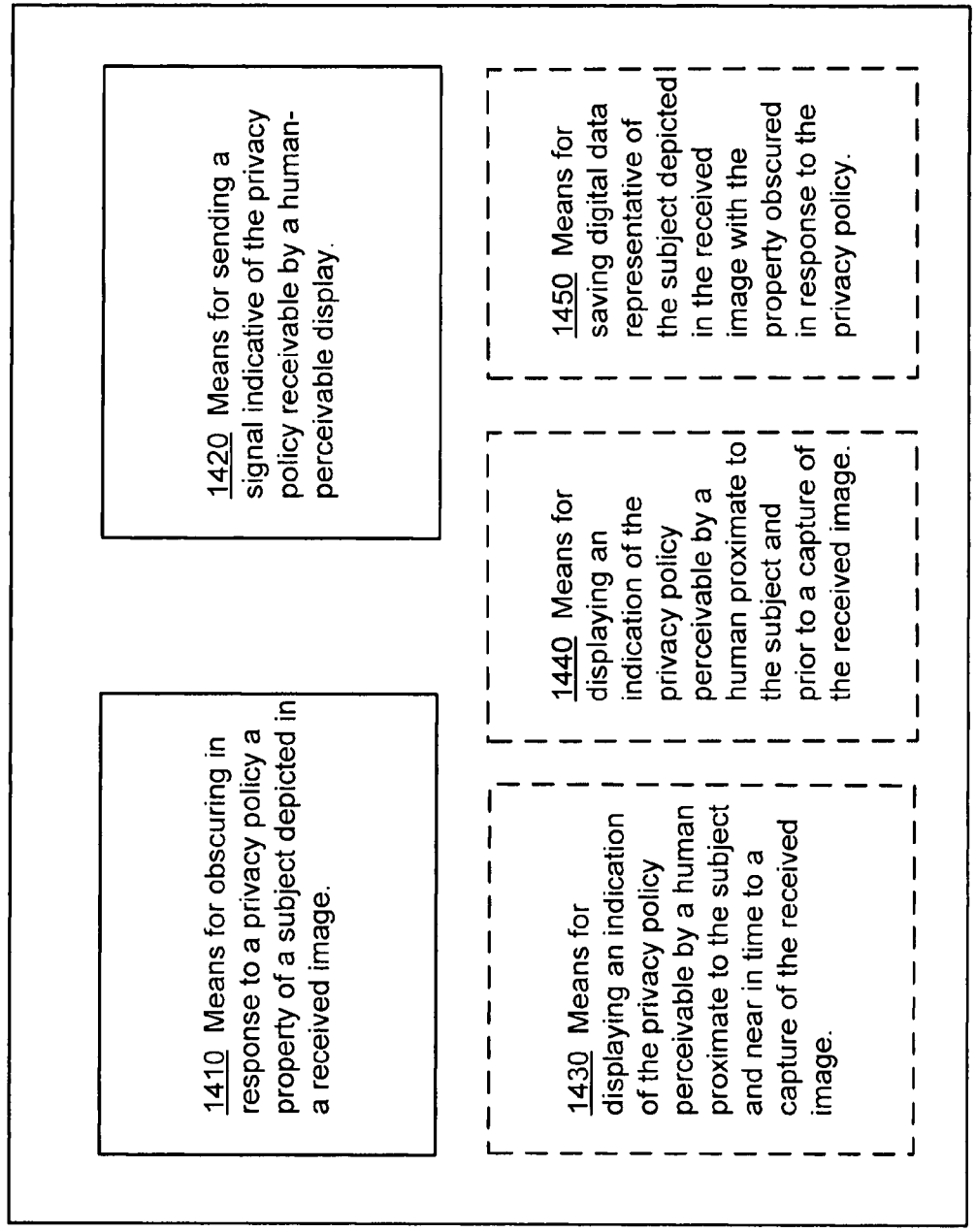
FIG. 22 illustrates an exemplary embodiment of a device.

FIG. 22 illustrates an exemplary embodiment of a device 1400. The device includes means 1410 for obscuring in response to a privacy policy a property of a subject depicted in a received image. The device also includes means 1420 for sending a signal indicative of the privacy policy receivable by a human-perceivable display.

In an embodiment, the device further includes means 1430 for displaying an indication of the privacy policy perceivable by a human proximate to the subject and near in time to a capture of the received image. In another embodiment, the device further includes means 1440 for displaying an indication of the privacy policy perceivable by a human proximate to the subject and prior to a capture of the received image. In a further embodiment, the device includes means 1450 for saving digital data representative of the subject depicted in the received image with the property obscured in response to the privacy policy.

FIG. 23 illustrates an exemplary embodiment of a computer-program product 1500. The computer program product includes a computer-readable signal bearing medium 1510 bearing program instructions 1520. The program instructions are operable to perform a process in a computing device. The process includes sending a signal indicative of a privacy policy. In an embodiment, the signal indicative of a privacy policy is receivable by a device operable to indicate the privacy policy, and/or receivable by an image capture device. The process also includes obscuring a property of a subject depicted in a received image in response to the privacy policy.

In another embodiment, the process of the program instructions 1520 further includes causing a displayed indication of the privacy policy perceivable by a human proximate to the subject and near in time to a capture of the received image 1522. In a further embodiment, the process of the program instructions further includes receiving the image depicting the subject 1524. In another embodiment, the process of the program instructions further includes saving digital data representative of the subject depicted in the received image with the property obscured in response to the privacy policy 1526.

In an embodiment, the computer-readable signal bearing medium 1510 further includes a computer storage medium. In another embodiment, the computer-readable signal bearing medium further includes a communications medium 1514.

Figure 24:
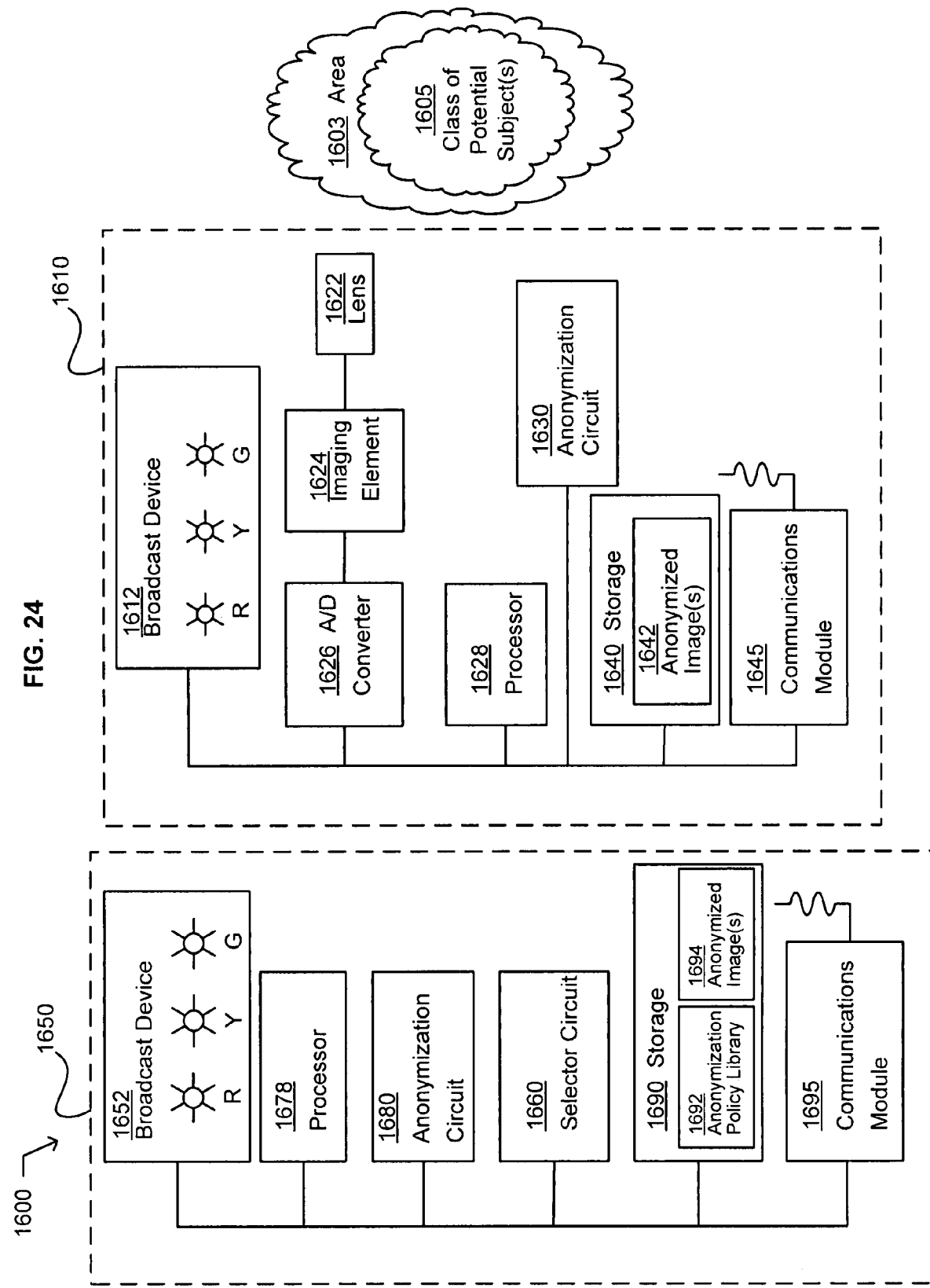
FIG. 24 illustrates an exemplary embodiment of a system.

FIG. 24 illustrates an exemplary embodiment of a system 1600. The system includes an imaging device 1610, an anonymization device 1650, and a broadcast device. The imaging device is operable to capture an image depicting a class of subjects 1605 that may have a temporal presence in an area 1603. The broadcast device is operable to display a human-perceivable indication of a selected anonymization policy to at least a portion of the area. The anonymization policy includes obscuring a property of the class of subjects depicted in the captured image. In an embodiment, the broadcast device includes a broadcast device 1612 that is physically coupled with the imaging device. In another embodiment, the broadcast device includes a broadcast device 1652 that is physically coupled with the anonymization device. In another embodiment, the broadcast device includes a broadcast device physically separated from both the imaging device and the anonymization device, such as the display 440A of FIG. 4. The anonymization device includes an anonymization circuit 1680 operable to generate an anonymized image by applying the selected anonymization policy to an image captured by the imaging device and depicting a member of the class of subjects.

In an embodiment, the imaging device 1610 operable to capture an image depicting a class of subjects 1605 that may have a temporal presence in an area 1603 further includes an imaging device operable to capture an image depicting at least one instance of a class of subjects that may have a temporal presence in an area. In another embodiment, the imaging device further includes an imaging device operable to capture an image depicting a class of humans, adults, children, patrons, animals, objects, inanimate objects, cars, boats, airplanes, and/or vessels that may have a temporal presence in an area. In a further embodiment, the imaging device further includes an imaging device operable to capture an image depicting a class of subjects that may have a temporal presence in a room, a building, a geographic locale, a mall, a park, an intersection, two or more spaced apart intersections, and/or a stadium.

In an embodiment, the imaging device 1610 further includes the anonymization circuit, illustrated as an anonymization circuit 1630. In another embodiment, the anonymization device 1650 further includes the anonymization circuit, illustrated as an anonymization circuit 1680.

In an embodiment, the anonymization device 1650 having a selector circuit 1660 operable to select an anonymization policy further includes an anonymization device having a selector circuit operable to select the anonymization policy from at least two anonymization policies. The at least two anonymization policies may include at least two anonymization policies of an anonymization policy library 1692. In another embodiment, the anonymization device further includes an anonymization device having a selector circuit operable to select an anonymization policy in response to a received human originated input, and/or a selection methodology. The human originated input may be received from any human user interface, such as for example, the screen input detector 33, hardware buttons 44, and/or microphone 34 described in conjunction with FIG. 1, and/or the user input interface 160 and devices coupled thereto described in conjunction with FIG. 2.

In an embodiment, the anonymization device 1650 having a selector circuit 1660 operable to select an anonymization policy further includes an anonymization device having a selector circuit operable to select an anonymization policy, where the selected anonymization policy includes decreasing a fidelity of a property of the class of subjects 1605 depicted in the captured image. In a further embodiment, the anonymization device further includes an anonymization device having a selector circuit operable to select an anonymization policy, where the anonymization policy includes obscuring at least one of a variable, a recognizable, a distinguishable, and/or a unique aspect of a property of the class of subjects depicted in the captured image. In another embodiment, the anonymization device further includes an anonymization device having a selector circuit operable to select an anonymization policy, where the anonymization policy includes obscuring at least one of a variable, a recognizable, a distinguishable, and/or a unique aspect of a property of each instance of the class of subjects depicted in the captured image. In a further embodiment, the anonymization device further includes an anonymization device having a selector circuit operable to select an anonymization policy, where the anonymization policy includes obscuring at least one of a face, an age, and/or a racial aspect of at least one person depicted in the captured image. For example, if the anonymization includes decreasing a fidelity of a face of a member of the class of subjects, a fidelity is reduced of each human face depicted in the captured image. An example of such decreased fidelity includes the decreased fidelity of human faces 408A-408C illustrated in conjunction with FIG. 5. In another embodiment, the anonymization device further includes an anonymization device having a selector circuit operable to select an anonymization policy, where the anonymization policy includes obscuring a property of the class of subjects depicted in the captured image before at least one of a persistent storage of the captured image, and/or a transmission of the captured image. For example, the anonymization policy may be applied to the class of subjects depicted in the captured image before the captured image is saved in a storage device, such as before an anonymized captured image 1642 is saved in a storage device 1640 of the imaging device 1610 and/or before an anonymized captured image 1694 is saved in a storage device 1690 of the anonymization device 1650. In another example, a captured image may be transitorily saved in a volatile memory (not shown) before the anonymization policy is applied and the image persistently saved in a more permanent memory and/or non-volatile media, such as the storage 1640 and/or the storage 1690.

In an embodiment, the broadcast device (1612, 1652) operable to display a human-perceivable indication of the selected anonymization policy to at least a portion of the area 1603 further includes a broadcast device operable to display at least one of an audio, a visual, and/or a tactile human-perceivable indication of the selected anonymization policy to at least a portion of the area. In a further embodiment, the imaging device 1610 further includes the broadcast device 1612 operable to display a human-perceivable indication of the selected anonymization policy to at least a portion of the area. In another embodiment, the anonymization device further includes the broadcast device 1652 operable to display a human-perceivable indication of the selected anonymization policy to at least a portion of the area.

In an embodiment, the anonymization circuit (1630, 1680) operable to generate an anonymized image by applying the selected anonymization policy to an image captured by the imaging device 1610 and depicting a member of the class of subjects further includes an anonymization circuit operable to generate an anonymized image by applying the selected anonymization policy to an image captured by the imaging device and depicting a member of the class of subjects. The anonymization policy is applied before the image is persistently saved. In another embodiment, the anonymization policy is applied after the image is persistently saved. In a further embodiment, the anonymization policy is applied contemporaneously with a saving the image to a persistently storage. In another embodiment, the anonymization circuit further includes an anonymization circuit operable to generate an anonymized image by applying the selected anonymization policy to a semi-permanently or permanently saved image captured by the imaging device and depicting a member of the class of subjects.

In an embodiment, the system 1600 further includes a persistent storage media configurable by a digital file representative of the anonymized image. In another embodiment, the imaging device 1610 further includes a persistent storage media 1640 configurable by a digital file representative of the anonymized image 1642. In a further embodiment, the anonymization device 1650 further includes a persistent storage media 1690 configurable by a digital file representative of the anonymized image 1694.

A use of an embodiment of the system 1600 may be illustrated in conjunction with FIGS. 4 and 5. For example, one or more instances of the imaging device 1610 may be located in the area 403 in a manner similar to the image capture device 420, and coupled with the anonymization device 1650, which may be remote to the area 403. The broadcast device may be physically associated with a structure in the area, such as illustrated in FIG. 3 as the display 440A, and/or may be the broadcast device 1612 associated with the imaging device. In this example, the anonymizer circuit is associated with the anonymization device. The selector circuit 1660 selects an anonymization policy for application to the area. The anonymization policy includes obscuring a property of the class of subjects depicted in a captured image. An indication of the selected anonymization policy is transmitted by a communications module 1695 of the anonymization device to a communications module 1645 of the imaging device and/or a communications module (not shown) associated with the display 440A. The broadcast device is then activated and displays a human-perceivable indication of the selected anonymization policy to at least a portion of the area.

An image captured by the imaging device 1610 is subjected to the selected anonymization policy. For example, the selected anonymization policy may be applied to the captured image by the anonymization circuit 1630, and then may be saved in the storage 1640 of the imaging device. FIG. 5 illustrates a possible result of an application of the selected anonymization policy. Alternatively, the captured image may be communicated via the communications modules 1645 and 1695 to the anonymization device 1650 without an unanonymized version being persistently saved at the imaging device 1610. The selected anonymization policy is then applied to the captured image by the anonymization circuit 1680 and then may saved to the storage 1690 or communicated to another storage device.

Figure 25:
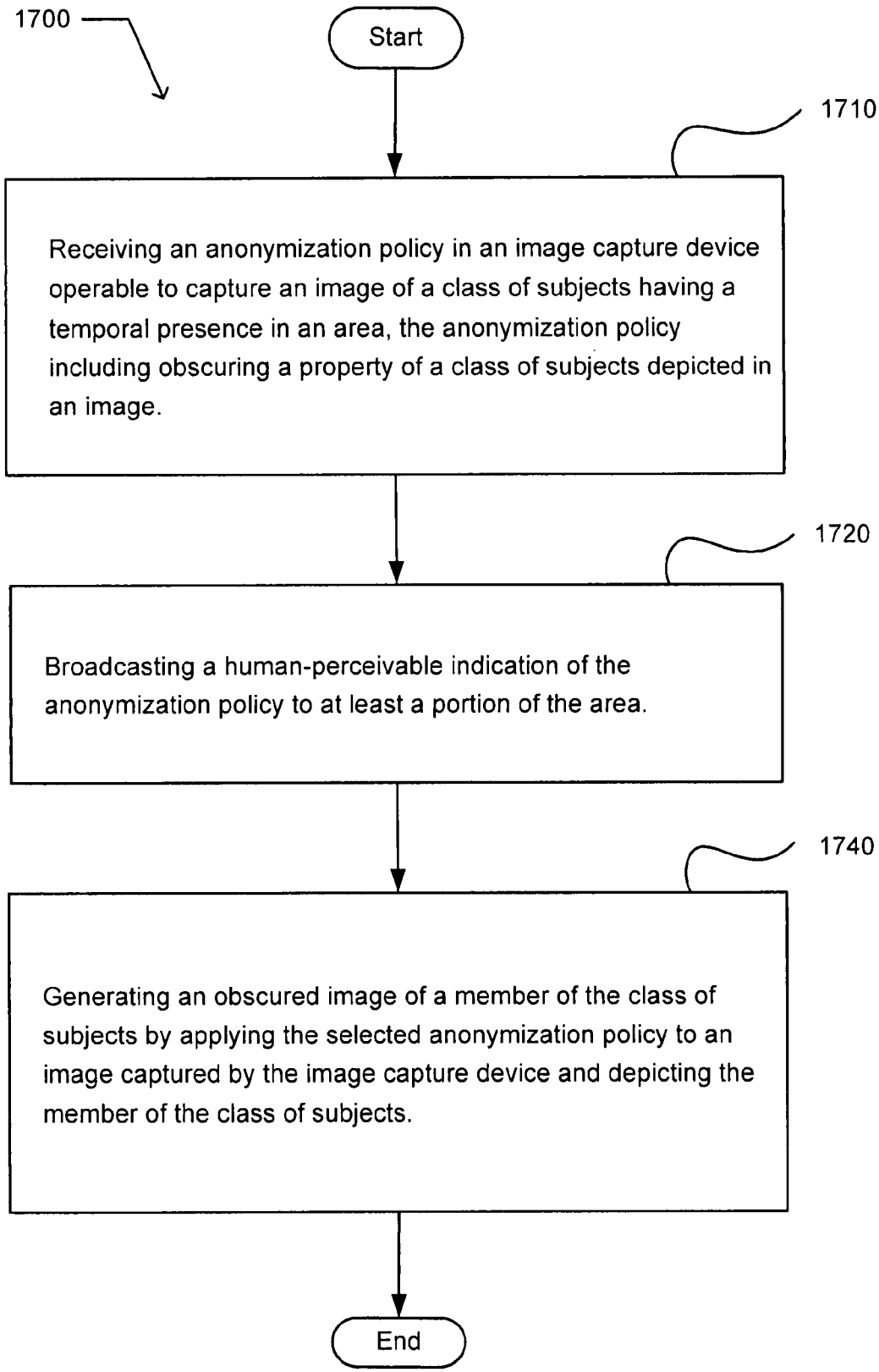
FIG. 25 illustrates an exemplary operational flow.

FIG. 25 illustrates an exemplary operational flow 1700. After a start operation, the operational flow moves to a dissemination operation 1710. The dissemination operation receives an anonymization policy in an image capture device operable to capture an image of a class of subjects having a temporal presence in an area. In a further embodiment, the dissemination operation wirelessly receives an anonymization policy in an image capture device operable to capture an image of a class of subjects having a temporal presence in an area. In an alternative embodiment, the dissemination operation receives an anonymization policy in at least one image capture device operable to capture an image of a class of subjects having a temporal presence in an area. In another embodiment, the dissemination operation receives via a wired coupling an anonymization policy in at least one image capture device operable to capture an image of a class of subjects having a temporal presence in an area. The anonymization policy includes obscuring a property of a class of subjects depicted in an image. A notification operation 1720 broadcasts a human-perceivable indication of the anonymization policy to at least a portion of the area. A de-personalizing operation 1740 generates an obscured image of a member of the class of subjects by applying the selected anonymization policy to an image captured by the image capture device and depicting the member of the class of subjects. The operational flow then moves to an end operation.

Figure 26:
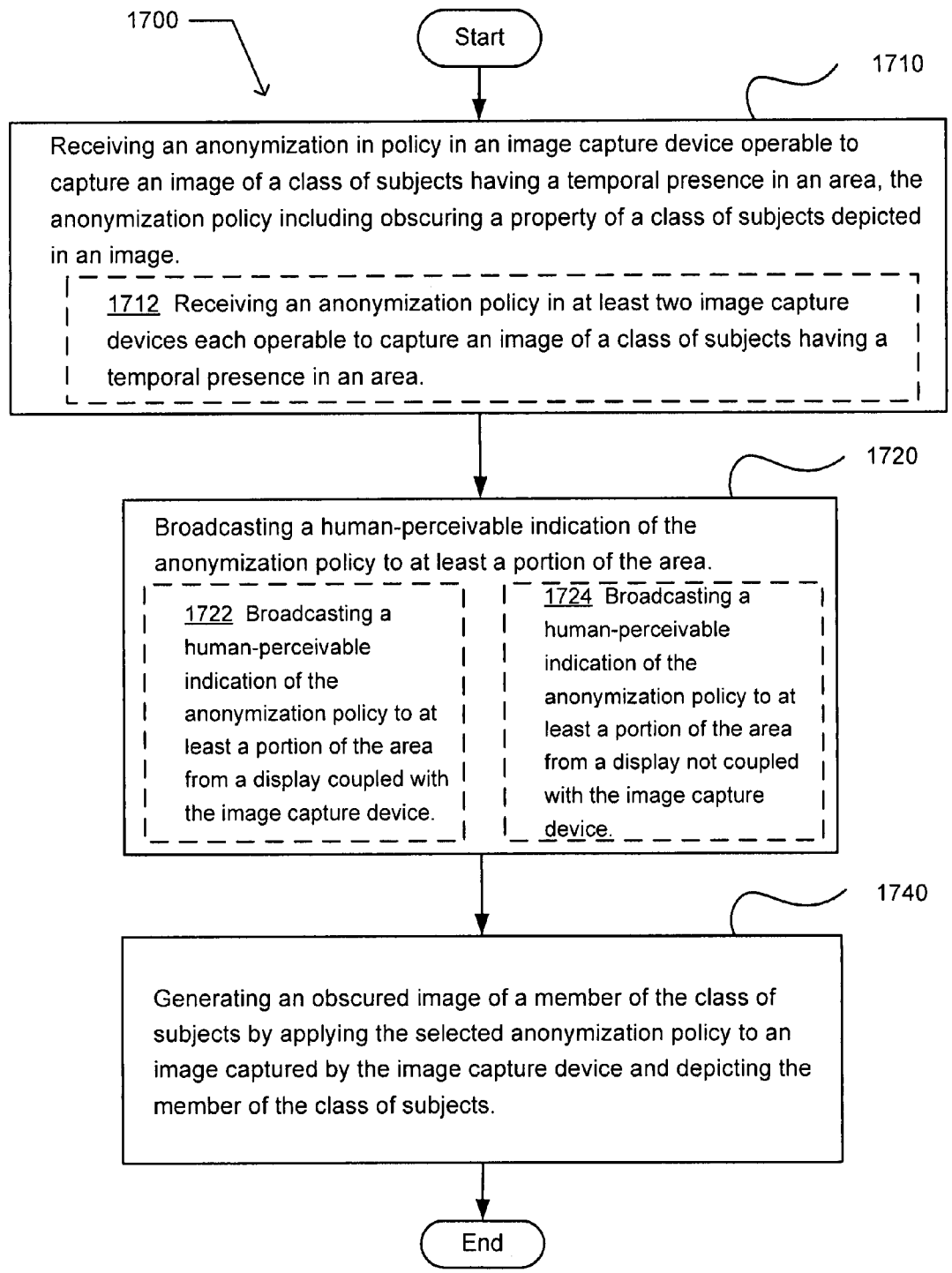
FIG. 26 illustrates an alternative embodiment of the exemplary operational flow of FIG. 25.

FIG. 26 illustrates an alternative embodiment of the exemplary operational flow 1700 of FIG. 25. The dissemination operation 1710 may include at least one additional operation, such as the operation 1712. The operation 1712 receives an anonymization policy in at least two image capture devices each operable to capture an image of a class of subjects having a temporal presence in an area. In an alternative embodiment, the dissemination operation may include wirelessly receiving an anonymization policy in at least two image capture devices each operable to capture an image of a class of subjects having a temporal presence in an area (not shown). The notification operation 1720 may include at least one additional operation. The at least one additional operation may include an operation 1722, and/or the operation 1724. The operation 1722 broadcasts a human-perceivable indication of the anonymization policy to at least a portion of the area from a display coupled with the image capture device. The operation 1724 broadcasts a human-perceivable indication of the anonymization policy to at least a portion of the area from a display not coupled with the image capture device.

Figure 27:
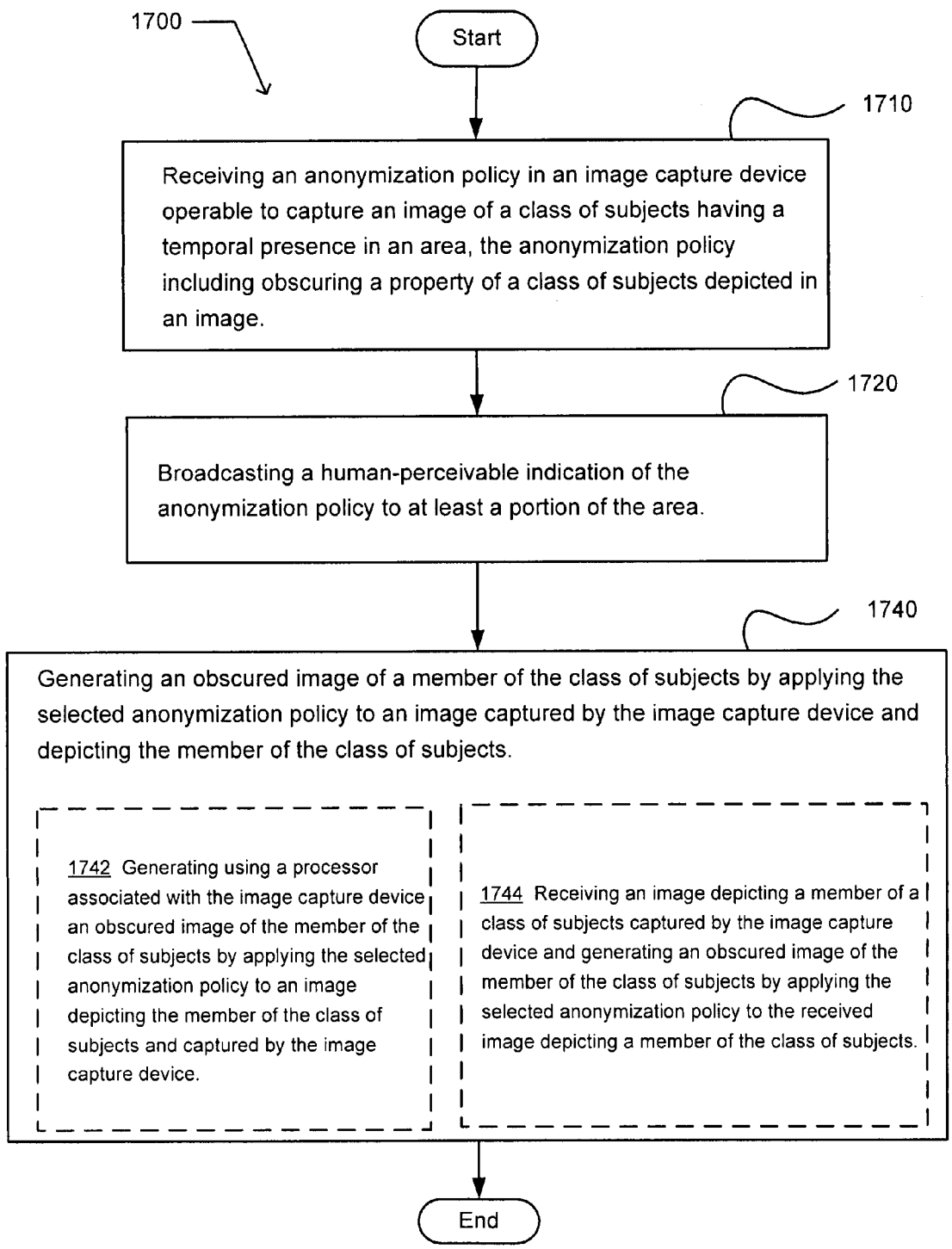
FIG. 27 illustrates another alternative embodiment of the exemplary operational flow of FIG. 25.

FIG. 27 illustrates another alternative embodiment of the exemplary operational flow 1700 of FIG. 25. The de-personalizing operation 1740 may include at least one additional operation. The at least one additional operation may include an operation 1742, and/or the operation 1744. The operation 1742 generates using a processor associated with the image capture device an obscured image of a member of the class of subjects by applying the selected anonymization policy to an image captured by the image capture device and depicting the member of the class of subjects. The operation 1744 receives an image depicting a member of a class of subjects captured by the image capture device and generating an obscured image of the member of the class of subjects by applying the selected anonymization policy to the received image depicting a member of the class of subjects. In an alternative embodiment, the operation 1744 wirelessly receives an image depicting a member of a class of subjects captured by the image capture device and generating an obscured image of the member of the class of subjects by applying the selected anonymization policy to the received image depicting a member of the class of subjects.

Figure 28:
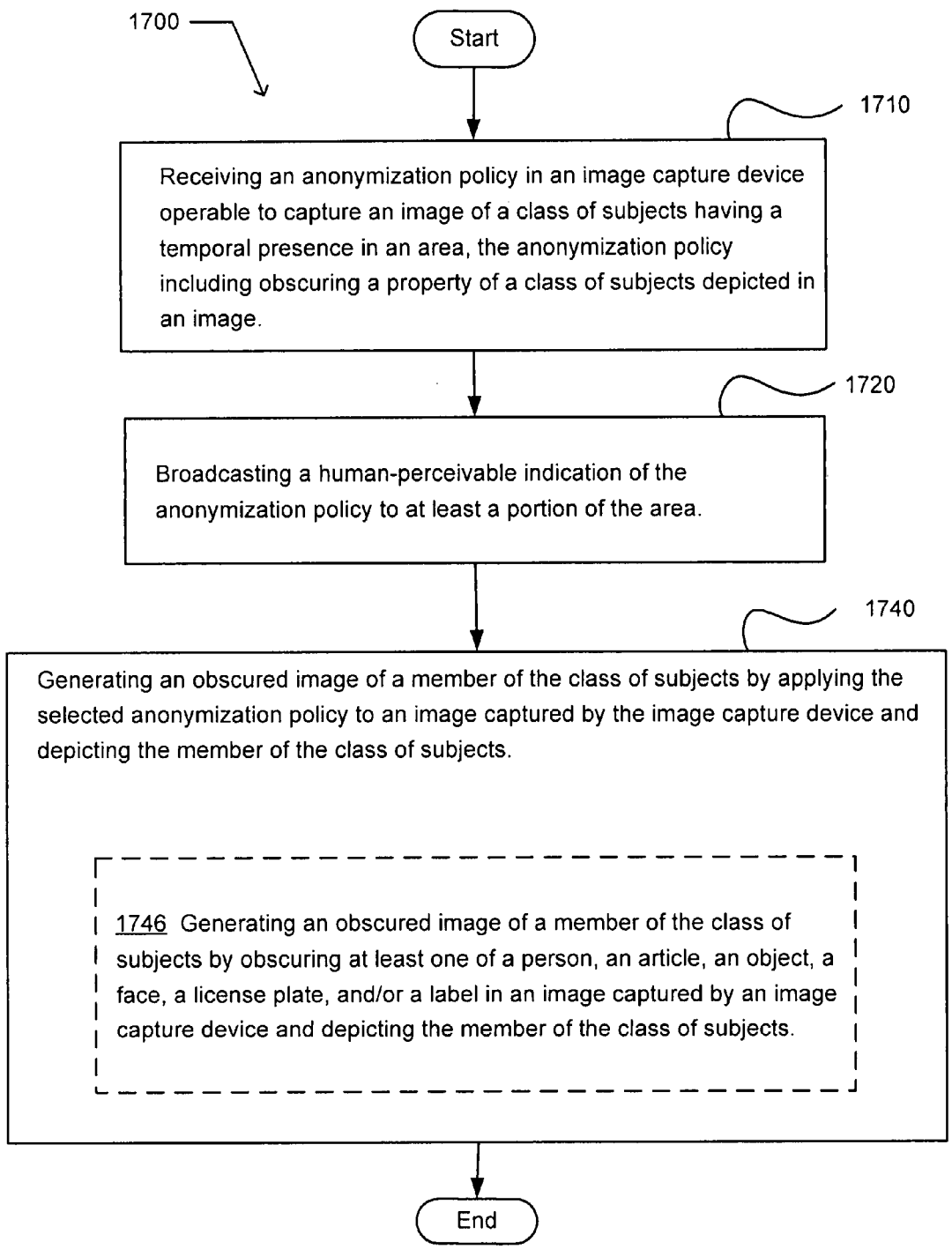
FIG. 28 illustrates a further alternative embodiment of the exemplary operational flow of FIG. 25.

FIG. 28 illustrates a further alternative embodiment of the exemplary operational flow 1700 of FIG. 25. The de-personalizing operation 1740 may include at least one additional operation. The at least one additional operation may include an operation 1746. The operation 1746 generates an obscured image of a member of the class of subjects by obscuring at least one of a person, an article, an object, a face, a license plate, and/or a label in an image captured by the image capture device and depicting the member of the class of subjects.

Figure 29:
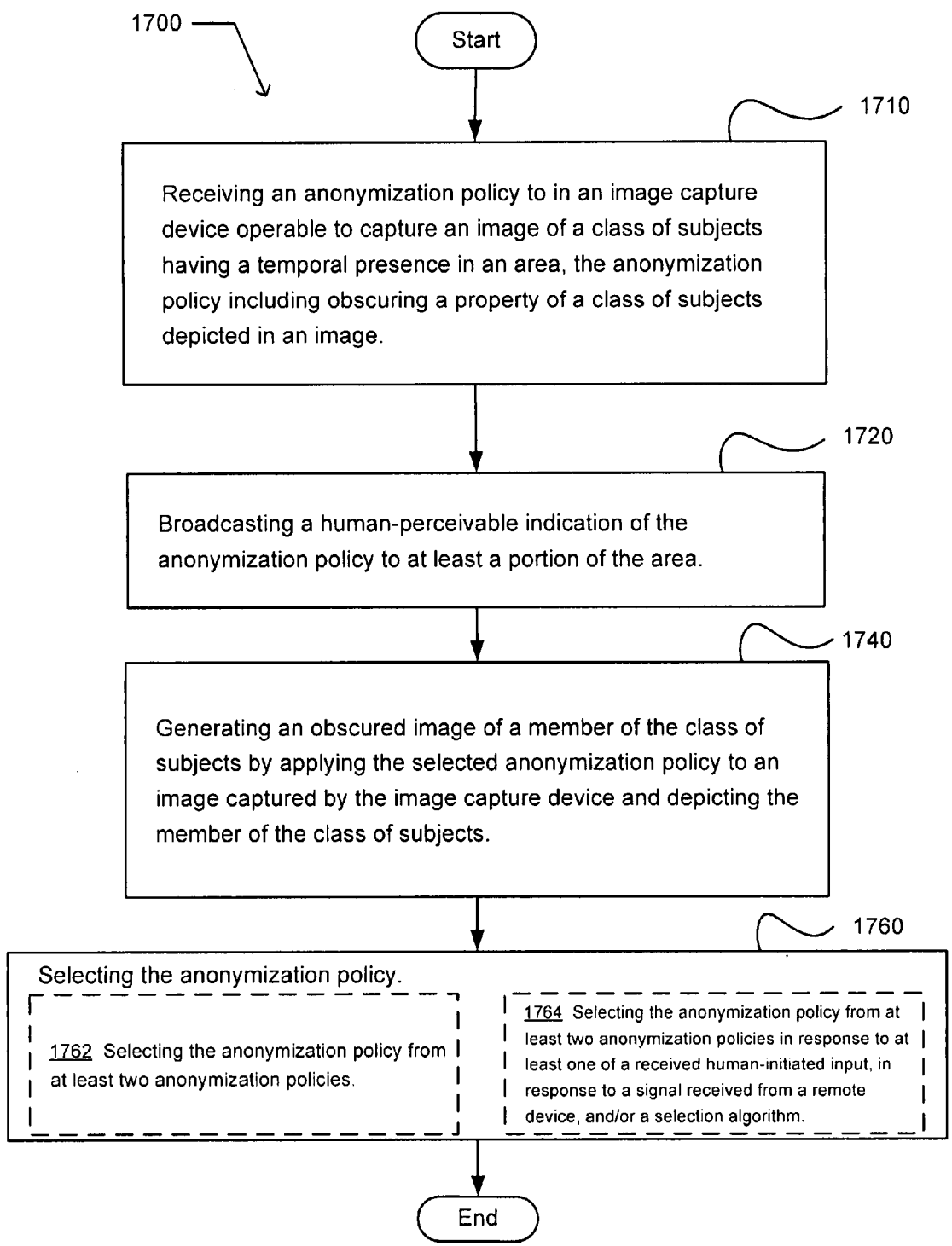
FIG. 29 illustrates a further alternative embodiment of the exemplary operational flow of FIG. 25.

FIG. 29 illustrates a further alternative embodiment of the exemplary operational flow 1700 of FIG. 25. The operational flow may include at least one additional operation, such as a choosing operation 1760. The choosing operation selects the anonymization policy. The choosing operation may include at least one additional operation. The at least one additional operation may include an operation 1762, and/or the operation 1764. The operation 1762 selects the anonymization policy from at least two anonymization policies. The operation 1764 selects the anonymization policy from at least two anonymization policies in response to at least one of a received human-initiated input, in response to a signal received from a remote device, and/or a selection algorithm.

Figure 30:
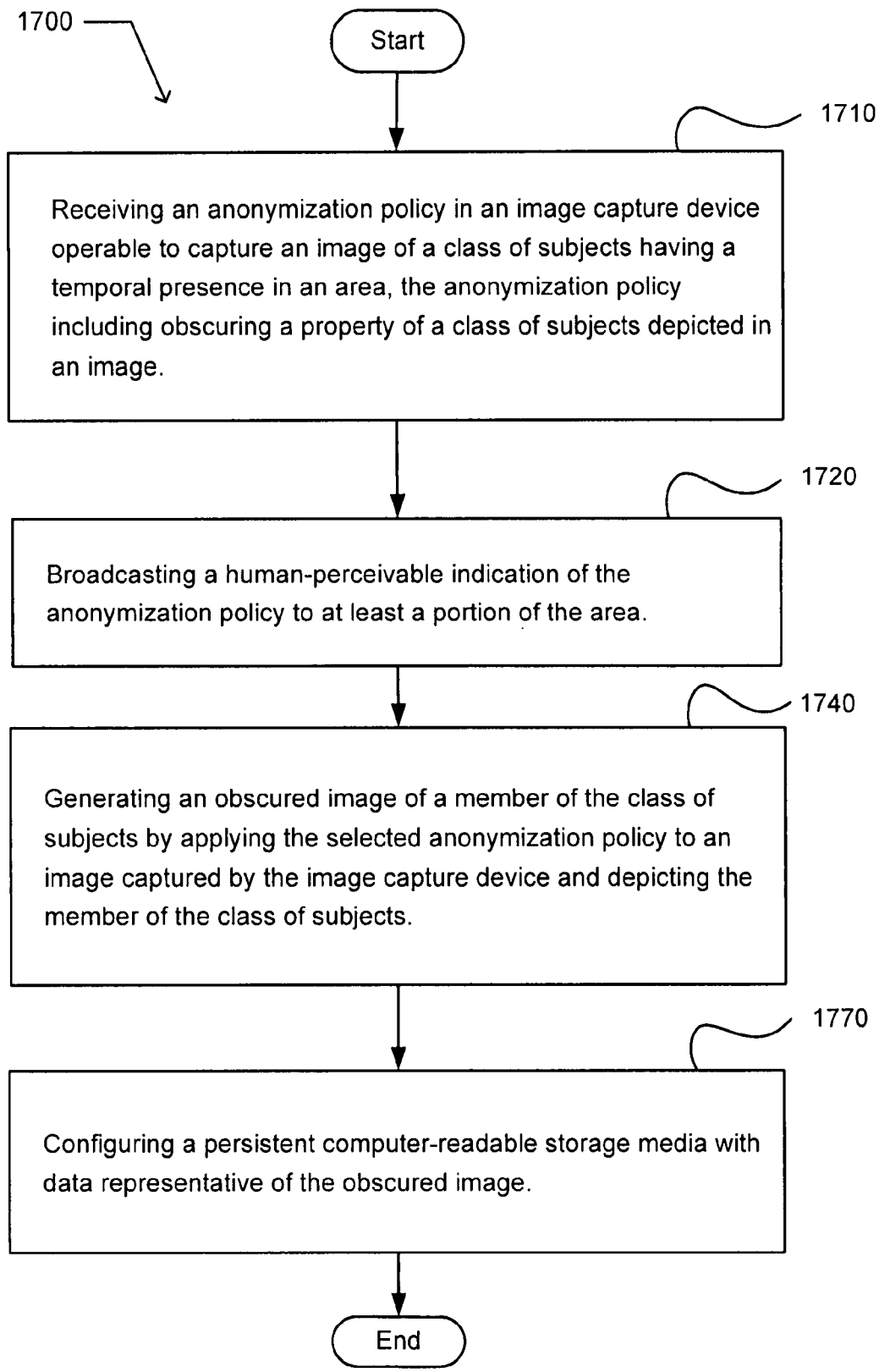
FIG. 30 illustrates a further alternative embodiment of the exemplary operational flow of FIG. 25.

FIG. 30 illustrates a further alternative embodiment of the exemplary operational flow 1700 of FIG. 25. The operational flow may include at least one additional operation, such as a storage operation 1770. The storage operation configures a persistent computer-readable storage media with data representative of the obscured image. A persistent computer-readable storage media may include a non-volatile computer storage media, which may include a removable and/or a non-removable media. The persistent computer-readable storage media may be implemented in any method or technology for storage of information such as computer-readable instructions, data structures, program modules, or other data, such as CD-ROM, digital versatile disks (DVD), or other optical disk storage, magnetic cassettes, magnetic tape, magnetic disk storage, or other magnetic storage devices, or any other medium which can be used to store the desired information and which can be accessed by a computing device. Combinations of any of the above may also be included within the scope of computer-readable media. A persistent computer-readable storage media may include a group of persistent computer-readable storage. In another embodiment, a persistent computer-readable storage may include a quantum memory, a photonic quantum memory, and/or atomic quantum memory.

Figure 31:
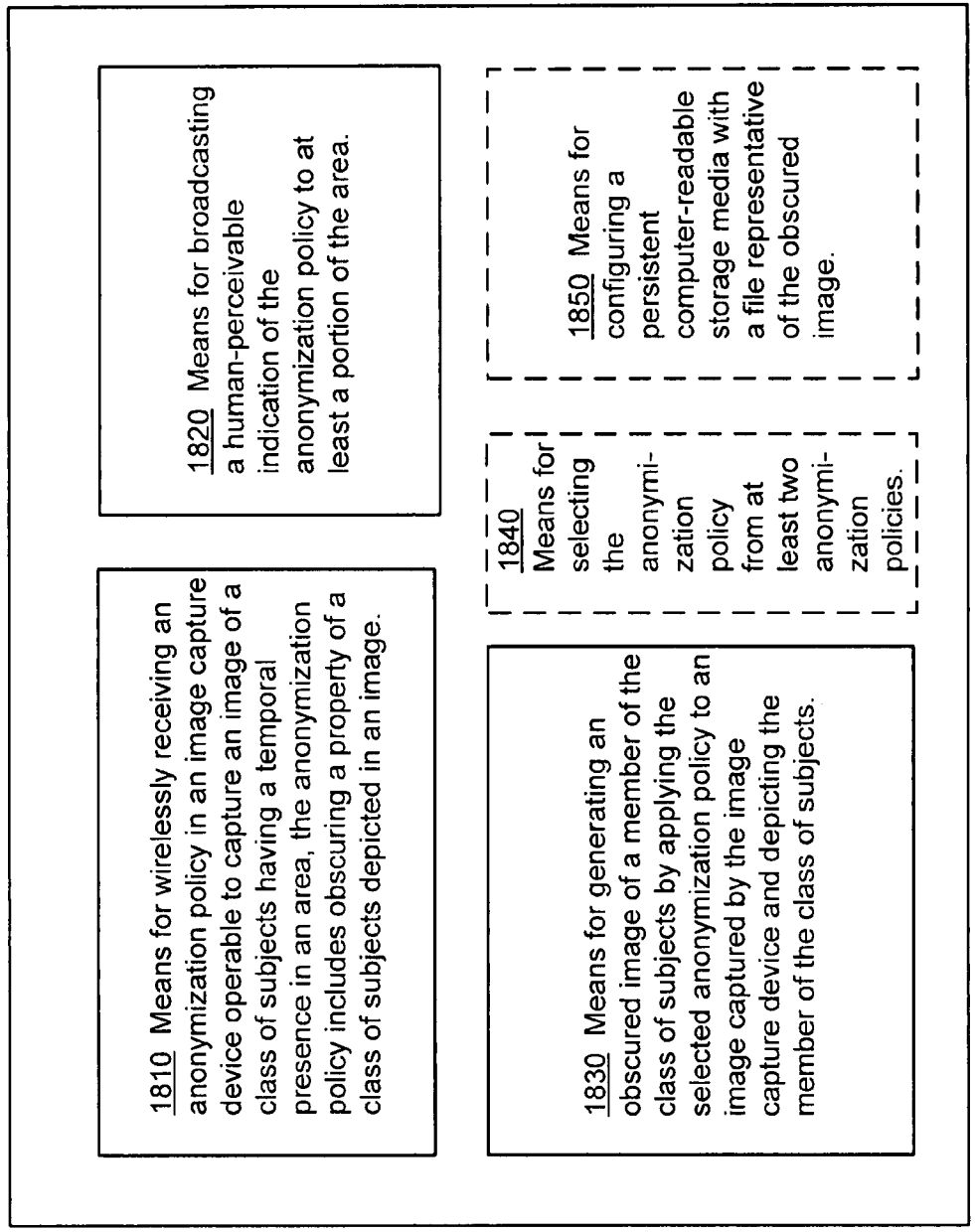
FIG. 31 illustrates an embodiment of an exemplary system.

FIG. 31 illustrates an embodiment of an exemplary system 1800. The system includes means 1810 for wirelessly receiving an anonymization policy to an image capture device operable to capture an image of a class of subjects having a temporal presence in an area. The anonymization policy includes obscuring a property of a class of subjects depicted in an image. The system also includes means 1820 for broadcasting a human-perceivable indication of the anonymization policy to at least a portion of the area. The system further includes means 1830 for generating an obscured image of a member of the class of subjects by applying the selected anonymization policy to an image captured by the image capture device and depicting the member of the class of subjects.

In an alternative embodiment, the system further includes means 1840 for selecting the anonymization policy from at least two anonymization policies. In another embodiment, the system further includes means 1850 for configuring a persistent computer-readable storage media with a file representative of the obscured image.

Figure 32:
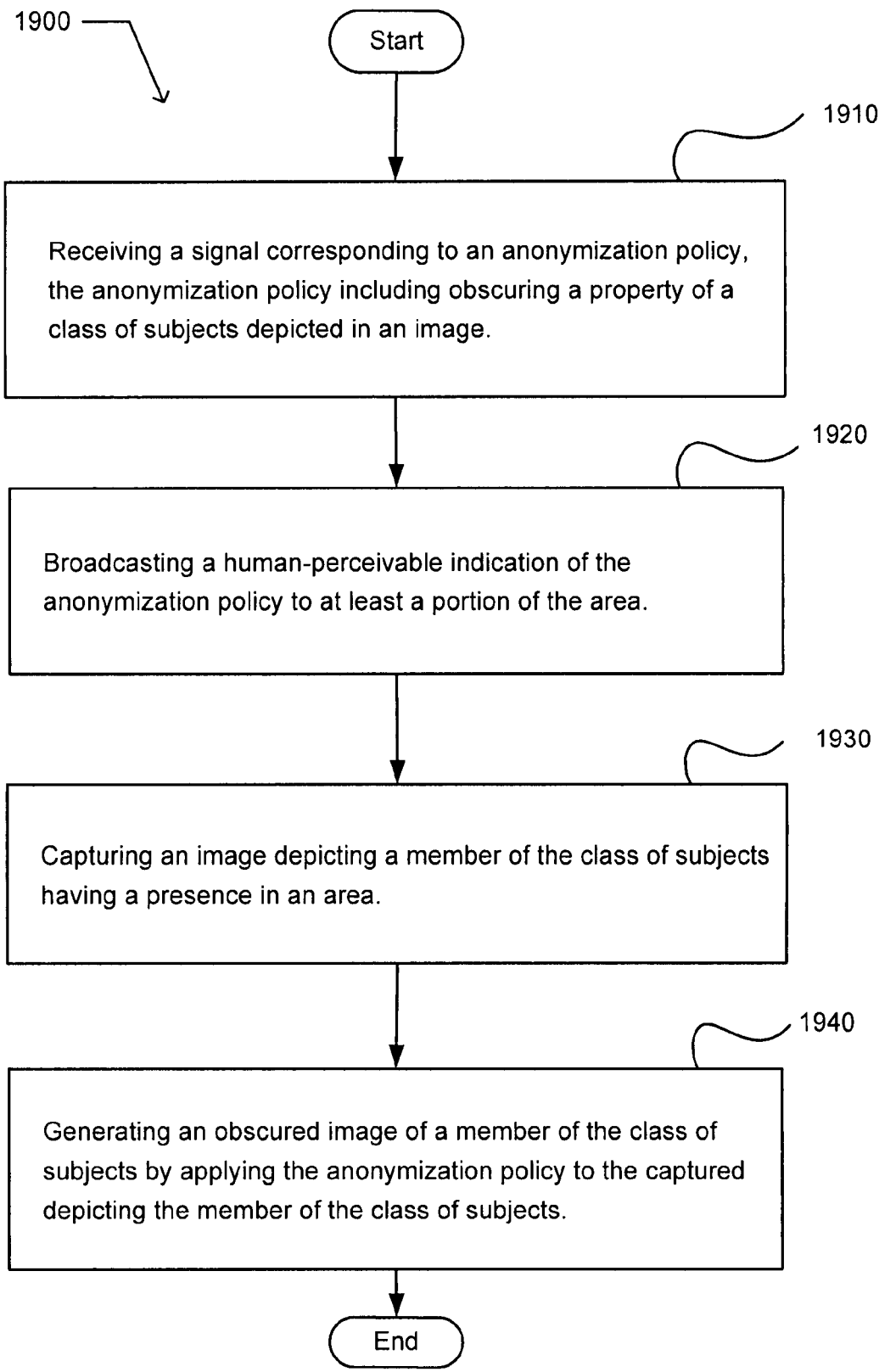
FIG. 32 illustrates an exemplary operational flow.

FIG. 32 illustrates an exemplary operational flow 1900. After a start operation, the operational flow moves to an operation 1910. The operation 1910 receives a signal corresponding to an anonymization policy. The anonymization policy includes obscuring a property of a class of subjects depicted in an image. An operation 1920 broadcasts a human-perceivable indication of the anonymization policy to at least a portion of an area. An operation 1930 captures an image depicting a member of the class of subjects having a presence in an area. An operation 1940 generates an obscured image of the member of the class of subjects by applying the anonymization policy to the captured image depicting the member of the class of subjects. The operational flow then moves to an end operation.

In an alternative embodiment, the operation 1910 further includes wirelessly receiving a signal corresponding to an anonymization policy. In a further embodiment, the operation 1910 further includes receiving a signal corresponding to an anonymization policy in a communications device operable to broadcast the human-perceivable indication of the anonymization policy to at least a portion of an area. In another embodiment, the operation 1920 further includes broadcasting a human-perceivable indication of the anonymization policy to at least a portion of an area from a communications device.

It will be understood by those skilled in the art that the various components and elements disclosed herein and in the drawings, as well as the various steps and substeps disclosed herein and in the drawings, may be incorporated together in different combinations to implement embodiments and enhance possible benefits and advantages. The exemplary system, apparatus, and device embodiment disclosed herein, including FIGS. 1-5, 12, 14-15, 17-18, 22-24, and 31, along with other components, devices, know-how, skill, and techniques that are known in the art may be individually or in a combination to implement and/or practice one or more methods and processes illustrated in FIGS. 6-11, 13, 16, 19-21, 25-30, and 32. It is to be understood that the methods and processes can be incorporated in one or more different types of computer program products with a carrier medium having program instructions encoded thereon. However, it is to be further understood by those skilled in the art that other systems, apparatus, and technology may be used to implement and practice such methods and processes.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
capturing an image of a subject located in a particular area, wherein the particular area includes at least an intersection for vehicles, wherein the subject includes at least a vehicle, a license plate on the vehicle, and at least one face of a driver in the vehicle;
indicating a selection of an anonymization policy, wherein the indication of the selection is shown by a green, yellow, or red optical display;
applying the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized; and
transmitting at least one of the resulting first image or the resulting second image for display operable to provide a human-perceivable image.

2. One or more non-transitory media comprising one or more computer-readable instructions for executing a process comprising:
capturing an image of a subject located in a particular area, wherein the particular area includes at least an intersection for vehicles, wherein the subject includes at least a vehicle, a license plate on the vehicle, and at least one face of a driver in the vehicle;
indicating a selection of an anonymization policy, wherein the indication of the selection is shown by a green, yellow, or red optical display;
applying the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized; and
transmitting at least one of the resulting first image or the resulting second image for display operable to provide a human-perceivable image.

3. A system comprising:
one or more imaging devices operable to acquire an image of a subject located in a particular area, wherein the particular area includes at least an intersection for vehicles, wherein the subject includes at least a vehicle, a license plate on the vehicle, and at least one face of a driver in the vehicle;
a selector circuit operable to indicate a selection of an anonymization policy, wherein the indication of the selection is shown by a green, yellow, or red optical display;
an anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized; and
circuitry for transmitting at least one of the resulting first image or the resulting second image for a display operable to provide a human-perceivable image.

4. The system of claim 3, wherein the one or more imaging devices operable to acquire an image of a subject located in a particular area further includes:
a digital imaging device operable to acquire the image of the subject.

5. The system of claim 3, wherein the one or more imaging devices operable to acquire an image of a subject located in a particular area further includes:
a digital camera operable to acquire the image of the subject.

6. The system of claim 3, wherein the one or more imaging devices operable to acquire an image of a subject located in a particular area further includes:
an imaging device operable to capture the image of the subject.

7. The system of claim 3, wherein the one or more imaging devices operable to acquire an image of a subject located in a particular area further includes:
an imaging device operable to receive the image of the subject.

8. The system of claim 3, wherein the one or more imaging devices operable to acquire an image of a subject located in a particular area further includes:
an imaging device operable to acquire at least one of a digital and/or an analog image of the subject.

9. The system of claim 3, wherein the one or more imaging devices operable to acquire an image of a subject located in a particular area further includes:
an imaging device operable to acquire a digital image of the subject, the digital image including a representation of a dimensional image as a finite set of digital values called picture elements or pixels.

10. The system of claim 3, wherein the one or more imaging devices operable to acquire an image of a subject located in a particular area further includes:
    an imaging device operable to acquire at least one of a still and/or a video of the subject.

11. The system of claim 3, wherein the one or more imaging devices operable to acquire an image of a subject located in a particular area further includes:
    an imaging device operable to acquire an image of at least one of a person, a patron, a shopper, a spectator, a car, a truck, a ship, and/or an aircraft.

12. The system of claim 3, wherein the one or more imaging devices operable to acquire an image of a subject located in a particular area further includes:
    an imaging device operable to capture an image of a subject and to create a digital signal representative of the acquired image.

13. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to at least restrict a dissemination of the acquired image.

14. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized digital image that includes at least a decreased fidelity of the driver of the vehicle in response to the anonymization policy.

15. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least a decreased at least one of accuracy in describing or reporting facts or details, and/or faithfulness in a depiction of the driver of the vehicle in response to the anonymization policy.

16. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least one of a decreased resolution, an obscuring, a blackout, and/or a removal of the feature of the driver of the vehicle in response to the anonymization policy.

17. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least a decreased fidelity of an aspect, a property, and/or an attribute of the driver of the vehicle in response to the anonymization policy.

18. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least a decreased fidelity of at least one of a face, a license plate, a label, and/or a recognizable property associated with the driver of the vehicle in response to the anonymization policy.

19. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least a decreased fidelity of a feature of the driver of the vehicle in response to the anonymization policy, the anonymization policy selected from among at least two anonymization policies.

20. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
    an anonymizer circuit operable to generate an anonymized image that includes at least a decreased fidelity of the feature of a driver of the vehicle in response to the anonymization policy, the anonymization policy selected in response to at least one of a received human-initiated input, in response to a signal received from a remote device, and/or a selection algorithm.

21. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
an anonymizer circuit operable to generate an anonymized image that includes at least a decreased fidelity of a feature of the driver of the vehicle in response to the anonymization policy, the anonymization policy persisting for a predetermined time.

22. The system of claim 3, wherein the anonymizer circuit operable to apply the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
an anonymizer circuit operable to generate an anonymized image that includes at least a decreased fidelity of a feature of the driver of the vehicle in response to the anonymization policy, the decreased fidelity including a non-storage, a temporary storage, and/or other rule or behavior that results in a property not being savable or transmittable.

23. The system of claim 3, wherein the circuitry for transmitting at least one of the resulting first image or the resulting second image for a display operable to provide a human-perceivable image includes:
the display operable to provide the human-perceivable visual indication of at least one of an anonymized image or the anonymization policy.

24. The system of claim 3, wherein the circuitry for transmitting at least one of the resulting first image or the resulting second image for a display operable to provide a human-perceivable image includes:
the display operable to provide the human-perceivable indication of at least one of an anonymized image or the anonymization policy at least close in time to the acquisition of the image.

25. The system of claim 3, wherein the circuitry for transmitting at least one of the resulting first image or the resulting second image for a display operable to provide a human-perceivable image includes:
the display operable to provide a color-based visual indication of the anonymization policy.

26. The system of claim 3, wherein the circuitry for transmitting at least one of the resulting first image or the resulting second image for a display operable to provide a human-perceivable image includes:
the display operable to provide a human-perceivable audio indication of the anonymization policy.

27. The system of claim 3, further comprising:
a storage media configurable by data corresponding to the anonymized image.

28. The system of claim 27, wherein the storage media configurable by data corresponding to the anonymized image further includes:
at least one of a quantum, an atomic, a magnetic, and/or an optical storage media configurable by digital data corresponding to an anonymized image.

29. The method of claim 1, wherein capturing an image of a subject located in a particular area includes:
automatically causing a capture of an image of a subject located in a particular area.

30. The method of claim 1, wherein capturing an image of a subject located in a particular area includes:
acquiring an image of a subject located in a particular area.

31. The method of claim 1, wherein applying the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
producing an obscured digital image of the subject by reducing a fidelity of a feature of the driver of the vehicle in response to a selected ambiguity policy.

32. The method of claim 1, wherein applying the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
producing an obscured digital image of the subject by reducing a fidelity of a feature of the driver of the vehicle in response to an ambiguity policy, a property being at least one of substantially anonymized, obscured, and/or incomprehensible.

33. The method of claim 1, wherein applying the selected anonymization policy to the acquired image based on the green, the yellow, or the red optical display, wherein the indication of the green optical display or the yellow optical display causes generation of a resulting first image with at least a decreased fidelity of the driver of the vehicle, and wherein the indication of the red optical display causes generation of a resulting second image with the at least one face of the driver in the vehicle not being anonymized includes:
producing an obscured digital image of the subject by reducing a fidelity of a feature of the driver of the vehicle in response to an ambiguity policy, the reducing a fidelity of the feature includes at least one of substantially anonymizing a property, substantially obscuring the property, and/or making the property incomprehensible.

34. The method of claim 1, wherein transmitting at least one of the resulting first image or the resulting second image for display operable to provide a human-perceivable image includes:
broadcasting a human perceivable indication of an ambiguity policy.

35. The method of claim 1, wherein transmitting at least one of the resulting first image or the resulting second image for display operable to provide a human-perceivable image includes:
broadcasting a signal indicative of an ambiguity policy.

36. The method of claim 1, further comprising:
    saving at least one of the resulting first image or the resulting second image.

37. The method of claim 36, wherein saving at least one of the resulting first image or the resulting second image includes:
    configuring a digital storage information with data representative of at least one of the resulting first image or the resulting second image.

38. The method of claim 36, wherein saving at least one of the resulting first image or the resulting second image includes:
    configuring a computer-readable medium with data representative of at least one of the resulting first image or the resulting second image.

39. The one or more non-transitory media of claim 2, wherein the process further includes:
    saving data representative of at least one of the resulting first image or the resulting second image.

40. The one or more non-transitory media of claim 2, wherein the one or more non-transitory media includes:
    a computer storage medium.

41. The one or more non-transitory media of claim 2, wherein the one or more non-transitory media includes:
    a communications medium.

* * * * *